(12) United States Patent
Kim et al.

(10) Patent No.: US 11,223,841 B2
(45) Date of Patent: Jan. 11, 2022

(54) APPARATUS AND METHOD FOR PERFORMING ARTIFICIAL INTELLIGENCE ENCODING AND ARTIFICIAL INTELLIGENCE DECODING ON IMAGE

(71) Applicant: SAMSUNG ELECTRONICS CO., LTD., Suwon-si (KR)

(72) Inventors: Jaehwan Kim, Suwon-si (KR); Youngo Park, Suwon-si (KR); Chaeeun Lee, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/333,541

(22) Filed: May 28, 2021

(65) Prior Publication Data

US 2021/0377554 A1    Dec. 2, 2021

(30) Foreign Application Priority Data

May 29, 2020  (KR) .................. 10-2020-0065182
Oct. 14, 2020  (KR) .................. 10-2020-0132976

(51) Int. Cl.
*H04N 19/00* (2014.01)
*H04N 19/44* (2014.01)
(Continued)

(52) U.S. Cl.
CPC .............. *H04N 19/44* (2014.11); *G06N 3/04* (2013.01); *H04N 19/124* (2014.11); *H04N 19/85* (2014.11)

(58) Field of Classification Search
CPC ...... H04N 19/44; H04N 19/124; H04N 19/85; G06N 3/04
See application file for complete search history.

(56) References Cited

U.S. PATENT DOCUMENTS 10,817,985 B2    10/2020    Kim et al.
10,825,203 B2    11/2020    Kim et al.
(Continued)

FOREIGN PATENT DOCUMENTS

KR    10-2011-0100170 A    9/2011
KR    10-2018-0035760 A    4/2018
(Continued)

OTHER PUBLICATIONS

Kim et al. "Dynamic frame resizing with convolutional neural network for efficient video compression". (Year: 2017).*
(Continued)

*Primary Examiner* — Zhihan Zhou
(74) *Attorney, Agent, or Firm* — Sughrue Mion, PLLC

(57) ABSTRACT

An artificial intelligence (AI) decoding apparatus includes at least one processor configured to execute one or more instructions to: obtain a second image corresponding to a first image by performing first decoding on image data included in a main bitstream, obtain AI upscaling activation flag information included in AI data of a sub-bitstream, determine whether to perform AI upscaling on the second image, based on the AI upscaling activation flag information, when it is determined that AI upscaling is to be performed on the second image, obtain a third image by performing AI upscaling on the second image, through an upscaling deep neural network (DNN) set according to upscaling DNN information, the upscaling DNN information selected from among a plurality of pieces of pre-stored upscaling DNN information based on at least a portion of the image data and/or at least a portion of AI sub-data.

18 Claims, 32 Drawing Sheets

(51) Int. Cl.
*G06N 3/04* (2006.01)
*H04N 19/85* (2014.01)
*H04N 19/124* (2014.01)

(56) References Cited

U.S. PATENT DOCUMENTS

| | | | |
|---|---|---|---|
| 10,958,919 | B2 | 3/2021 | Kang et al. |
| 2011/0026819 | A1* | 2/2011 | Lee .................. H04N 19/147 |
| | | | 382/166 |
| 2012/0002947 | A1 | 1/2012 | Rhyu et al. |
| 2017/0347061 | A1* | 11/2017 | Wang .................. H04N 19/154 |
| 2019/0042884 | A1* | 2/2019 | Guim Bernat ......... G06N 3/063 |
| 2019/0166379 | A1 | 5/2019 | Navarrete Michelini et al. |
| 2020/0053362 | A1 | 2/2020 | Fu et al. |
| 2020/0211157 | A1* | 7/2020 | Pohl .................. G06T 5/005 |
| 2021/0281852 | A1 | 9/2021 | Alshina et al. |

FOREIGN PATENT DOCUMENTS

| | | |
|---|---|---|
| KR | 10-2019-0018673 A | 2/2019 |
| KR | 10-2020-0044666 A | 4/2020 |
| KR | 10-2166337 B1 | 10/2020 |
| KR | 10-20166337 B1 | 10/2020 |
| WO | 2020/080873 A1 | 4/2020 |

OTHER PUBLICATIONS

Communication dated Oct. 28, 2021, issued by the Korean Patent Office in counterpart Korean Patent Application No. 10-2020-0132976.
Communication dated Septembers, 2021, issued by the International Searching Authority in counterpart International Application No. PCT/KR2021/006735 (PCT/ISA/220, 210, 237).

* cited by examiner

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

| aid_main(payloadSize) { | Descriptor |
|---|---|
| aid_flag { | u(1) |
| if(aid_flag ) { | |
| aid_average_qp | ue(v) |
| aid_qp_selection | ue(v) |
| aid_multiplication | ue(v) |
| aid_codec_information | ue(v) |
| aid_resolution_information | ue(v) |
| aid_meta_flag | u(1) |
| if(aid_meta_flag ) { | |
| ⋮ | |
| } | |
| } | |
| } | |

FIG. 26

| IMAGE-RELATED INFORMATION | DNN SETTING INFORMATION |
|---|---|
| SD, 10Mbps, 1.5x, AV1, Sports, QP Level 5 | A DNN SETTING INFORMATION |
| SD, 10Mbps, 1.5x, AV1, Movie, QP Level 5 | B DNN SETTING INFORMATION |
| SD, 15Mbps, 1.5x, AV1, Movie, QP Level 5 | C DNN SETTING INFORMATION |
| SD, 10Mbps, 2.0x, AV1, Sports, QP Level 5 | D DNN SETTING INFORMATION |
| SD, 10Mbps, 2.0x, AV1, Sports, QP Level 4 | E DNN SETTING INFORMATION |
| HD, 15Mbps, 1.5x, AV1, General, QP Level 3 | F DNN SETTING INFORMATION |
| HD, 15Mbps, 1.5x, H.264, General, QP Level 3 | G DNN SETTING INFORMATION |
| Full HD, 15Mbps, 1.5x, AV1, General, QP Level 3 | H DNN SETTING INFORMATION |
| Full HD, 20Mbps, 1.5x, HEVC, Movie, QP Level 2 | I DNN SETTING INFORMATION |
| 4K, 25Mbps, 1.5x, VVC, Sports, QP Level 2 | J DNN SETTING INFORMATION |
| 4K, 25Mbps, 1.5x, VVC, Movie, QP Level 2 | K DNN SETTING INFORMATION |
| ⋮ | ⋮ |

FIG. 28

DETERMINATION OF DNN SETTING INFORMATION BY
USING QP INDICATOR (QP LEVEL) OF AI DATA

| QUANTIZATION GROUP # | QP INDICATOR VALUE | DNN SETTING INFORMATION |
|---|---|---|
| #1 | 0 | A DNN SETTING INFORMATION |
| #2 | 1 | B DNN SETTING INFORMATION |
| #3 | 2 | C DNN SETTING INFORMATION |
| #4 | 3 | D DNN SETTING INFORMATION |
| #5 | 4 | F DNN SETTING INFORMATION |
| #6 | 5 | G DNN SETTING INFORMATION |

DETERMINATION OF DNN SETTING INFORMATION BY USING QP AVERAGE
VALUE OF AI DATA OR QP VALUE OF IMAGE ENCODING INFORMATION

| QP VALUE RANGE | DNN SETTING INFORMATION |
|---|---|
| 0~17 | A DNN SETTING INFORMATION |
| 18~24 | B DNN SETTING INFORMATION |
| 25~31 | C DNN SETTING INFORMATION |
| 32~38 | D DNN SETTING INFORMATION |
| 39~45 | F DNN SETTING INFORMATION |
| 46~51 | G DNN SETTING INFORMATION |

APPARATUS AND METHOD FOR PERFORMING ARTIFICIAL INTELLIGENCE ENCODING AND ARTIFICIAL INTELLIGENCE DECODING ON IMAGE

CROSS-REFERENCE TO RELATED APPLICATIONS

This application is based on and claims priority under 35 U.S.C. § 119 to Korean Patent Application Nos. 10-2020-0065182, filed on May 29, 2020, and 10-2020-0132976, filed on Oct. 14, 2020, in the Korean Intellectual Property Office, the disclosures of which are incorporated by reference herein in their entireties.

BACKGROUND

1. Field

The disclosure relates to the field of image encoding and decoding, and more particularly, to an apparatus and method for performing artificial intelligence (AI) encoding/decoding on an image.

2. Description of the Related Art

Images are encoded by a codec following a designated data compression standard, e.g., a moving picture expert group (MPEG) compression standard, and are then stored in a recording medium or are transmitted via a communication channel in the form of bitstreams.

As hardware for reproducing and storing high-resolution/high-quality images is being developed and supplied, a need for a codec capable of effectively encoding and decoding high-resolution/high-quality images is increasing.

SUMMARY

Provided are an apparatus and method for performing artificial intelligence (AI) encoding on an image, and an apparatus and method for performing AI decoding on an image, by which an image is encoded and decoded based on AI (model or algorithm) to attain a low bitrate.

Additional aspects will be set forth in part in the description which follows and, in part, will be apparent from the description, or may be learned by practice of the presented embodiments.

In accordance with an aspect of the disclosure, an AI decoding apparatus includes at least one processor configured to execute one or more instructions to: obtain a bitstream including a main bitstream including image data obtained by performing first encoding on a first image, and a sub-bitstream including AI data, obtain a second image corresponding to the first image by performing first decoding on the image data, determine whether to perform AI upscaling on the second image, based on AI upscaling activation flag information included in the AI data, based on determining that the AI upscaling is to be performed on the second image, obtain a third image by performing AI upscaling on the second image, through an upscaling deep neural network (DNN) set according to upscaling DNN information selected from among a plurality of pieces of pre-stored upscaling DNN information based on at least a portion of the image data and/or at least a portion of AI sub-data included in the sub-bitstream, and output the third image, and based on determining that the AI upscaling is not to be performed on the second image, output the second image.

The AI upscaling activation flag information may represent whether to perform AI upscaling on the second image.

The AI sub-data included in the sub-bitstream may include at least one of image genre information representing the genre of an image, average quantization parameter information representing an average quantization value of the first image, quantization parameter indicator information representing a quantization degree of at least a portion of the first image, image resolution information representing resolution of at least one of an original image or the first image, image ratio information representing a ratio between the original image and the first image, codec information representing a codec used during encoding of the first image, metadata flag information representing whether AI-upscaling related additional metadata is included, or AI-upscaling related additional metadata information.

The at least one processor may be configured to execute the one or more instructions to set the upscaling DNN with upscaling DNN information from among a plurality of pieces of upscaling DNN information, based on at least one of the image genre information, the average quantization parameter information, the quantization parameter indicator information, the image resolution information, the image ratio information, or the AI-upscaling related additional metadata information.

The quantization parameter indicator information may be index information representing one of a plurality of pre-determined quantization parameter groups.

The at least one processor may be configured to execute the one or more instructions to set the upscaling DNN with upscaling DNN information corresponding to a quantization parameter group indicated by the index information from among the plurality of pieces of upscaling DNN information.

The quantization parameter indicator information may be index information representing a quantization parameter group including an average value of the quantization parameter of at least one of a sub-group within a frame, the frame, a frame group, or a video sequence.

The one or more processors may be configured to execute one or more instructions to set the upscaling DNN with upscaling DNN information selected from among a plurality of pieces of upscaling DNN information, based on quantization parameter information obtained from the image data of the main bitstream.

The main bitstream may be included in a predetermined main bitstream region within a video bitstream defined in a predetermined codec, and the sub-bitstream may be included in a predetermined sub-bitstream region within the video bitstream defined in the predetermined codec.

The sub-bitstream may be a supplemental enhancement information (SEI) message.

The SEI message may be an SEI message including user data registered by a predetermined standard or including unregistered user data that is identified by a Universally Unique Identifier (UUID).

The sub-bitstream may be a metadata open bitstream unit (OBU).

In accordance with another aspect of the disclosure, an AI encoding apparatus includes at least one processor configured to execute one or more instructions to determine whether to perform AI downscaling on an original image, obtain a first image by AI-downscaling the original image by using a downscaling DNN, based on a result of the determination, obtain image data by performing first encoding on the first image, generate AI upscaling activation flag information representing performing or non-performing of AI upscaling corresponding to performing or non-performing of AI downscaling of the original image, based on determining that the AI downscaling is performed on the original image, generate AI sub-data related to AI upscaling corresponding to the AI downscaling, generate AI data including the AI upscaling activation flag information and the AI sub-data, generate a video bitstream including a main bitstream including the image data and a sub-bitstream including the AI data, and transmit the video bitstream.

At least a portion of the image data and/or at least a portion of the AI sub-data related to the AI upscaling may be information used to select upscaling DNN setting information from among a plurality of pieces of pre-stored upscaling DNN setting information.

An upscaling DNN used in AI upscaling may be set with the selected upscaling DNN setting information.

In accordance with another aspect of the disclosure, an AI encoding method includes determining whether to perform AI downscaling on an original image; obtaining a first image by AI-downscaling the original image by using a downscaling DNN, based on a result of the determination; obtaining image data by performing first encoding on the first image; generating AI upscaling activation flag information representing performing or non-performing of AI upscaling corresponding to performing or non-performing of AI downscaling of the original image, and, when it is determined that the AI downscaling is performed on the original image, generating AI sub-data related to AI upscaling corresponding to the AI downscaling; generating AI data including the AI upscaling activation flag information and the AI sub-data; generating a video bitstream including a main bitstream including the image data and a sub-bitstream including the AI data, and transmitting the video bitstream.

At least a portion of the image data and/or at least a portion of the AI sub-data related to the AI upscaling may be information used to select upscaling DNN setting information from among a plurality of pieces of pre-stored upscaling DNN setting information.

An upscaling DNN used in AI upscaling may be set with the selected upscaling DNN setting information.

In accordance with another aspect of the disclosure, an AI decoding method includes obtaining a video bitstream including a main bitstream including image data obtained by performing first encoding on a first image and a sub-bitstream including AI data; obtaining a second image corresponding to the first image by performing first decoding on the image data included in the main bitstream obtaining AI upscaling activation flag information included in the AI data of the sub-bitstream determining whether to perform AI upscaling on the second image, based on the AI upscaling activation flag information; based on determining that AI upscaling is to be performed on the second image, obtaining a third image by performing AI upscaling on the second image, through an upscaling DNN set according to upscaling DNN information selected from among a plurality of pieces of pre-stored upscaling DNN information based on at least a portion of the image data and/or at least a portion of AI sub-data included in the sub-bitstream; when the third image is obtained, and outputting the third image; and based on determining that the AI upscaling is not to be performed on the second image, outputting the second image.

The AI upscaling activation flag information may represent whether to perform AI upscaling on the second image.

In accordance with another aspect of the disclosure, an AI decoding apparatus includes at least one processor configured to execute one or more instructions to obtain a bitstream including image data obtained by performing first encoding on a first image and AI data, obtain a second image corresponding to the first image by performing first decoding on the image data, obtain AI upscaling activation flag information included in the AI data and determine whether to perform AI upscaling on the second image, based on the AI upscaling activation flag information, based on determining that AI upscaling is to be performed on the second image, obtain a third image by performing AI upscaling on the second image, through an upscaling DNN set according to upscaling DNN information selected from among a plurality of pieces of pre-stored upscaling DNN information based on at least a portion of the image data and/or at least a portion of AI sub-data, and output the third image, and based on determining that the AI upscaling is not to be performed on the second image, output the second image.

The AI upscaling activation flag information may represent whether to perform AI upscaling on the second image, and the AI data may be included in a header of a predetermined data unit including an encoding parameter related to the image data.

In accordance with another aspect of the disclosure, an AI decoding apparatus includes at least one processor configured to execute one or more instructions to obtain a video file including AI encoding data, the AI encoding data including image data obtained by performing first encoding on a first image and AI data, obtain a second image corresponding to the first image by performing first decoding on the image data, obtain AI upscaling activation flag information included in the AI data and determine whether to perform AI upscaling on the second image, based on the AI upscaling activation flag information, based on determining that AI upscaling is to be performed on the second image, obtain a third image by performing AI upscaling on the second image, through an upscaling DNN set according to upscaling DNN information selected from among a plurality of pieces of pre-stored upscaling DNN information based on at least a portion of the image data and/or at least a portion of AI sub-data, and output the third image, and based on determining that the AI upscaling is not to be performed on the second image, output the second image.

The AI upscaling activation flag information may represent whether to perform AI upscaling on the second image, and the video file may include: a media data box including the image data; and a metadata box including metadata about the image data, and the metadata box includes the AI data.

In accordance with another aspect of the disclosure, an AI encoding apparatus includes at least one processor configured to execute one or more instructions to determine whether to perform AI downscaling on an original image, obtain a first image by AI-downscaling the original image by using a downscaling DNN, based on a result of the determination, obtain image data by performing first encoding on the first image, generate AI upscaling activation flag information representing performing or non-performing of AI upscaling corresponding to performing or non-performing of AI downscaling of the original image, based on determining that the AI downscaling is performed on the original image, generate AI sub-data related to AI upscaling corresponding to the AI downscaling, generate AI data including the AI upscaling activation flag information and the AI sub-data, and transmit a video file including AI encoding data, the AI encoding data including the image data and the AI data.

At least a portion of the image data and/or at least a portion of the AI sub-data related to the AI upscaling may be information used to select upscaling DNN setting information from among a plurality of pieces of pre-stored upscaling DNN setting information.

An upscaling DNN used in AI upscaling may be set with the selected upscaling DNN setting information.

The video file may include a media data box including the image data; and a metadata box including metadata about the image data, and the metadata box includes the AI data.

In accordance with another aspect of the disclosure, a non-transitory computer-readable recording medium has recorded thereon a video bitstream including AI encoding data.

The video bitstream may include a main bitstream including encoding information of a first image obtained by AI-downscaling an original image; and a sub-bitstream including AI data about AI upscaling of a second image, wherein the second image is a corresponding image of the first image, obtained by decoding the encoding information of the first image included in the main bitstream.

The sub-bitstream may include AI upscaling activation flag information representing whether to perform AI upscaling on the second image; and when AI upscaling is performed on the second image, AI sub-data used to select upscaling DNN information from among a plurality of pieces of pre-stored upscaling DNN information.

In accordance with another aspect of the disclosure, a non-transitory computer-readable recording medium may have recorded thereon a computer program for executing any of the above-described methods.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 24 is a syntax structure table including AI data, according to an embodiment;

FIG. 26 is a table showing a mapping relationship between several pieces of image-related information and several pieces of DNN setting information according to an embodiment;

FIG. 28 illustrates tables showing mapping relationships between QP values and several pieces of DNN setting information according to an embodiment.

DETAILED DESCRIPTION

Figure 1:
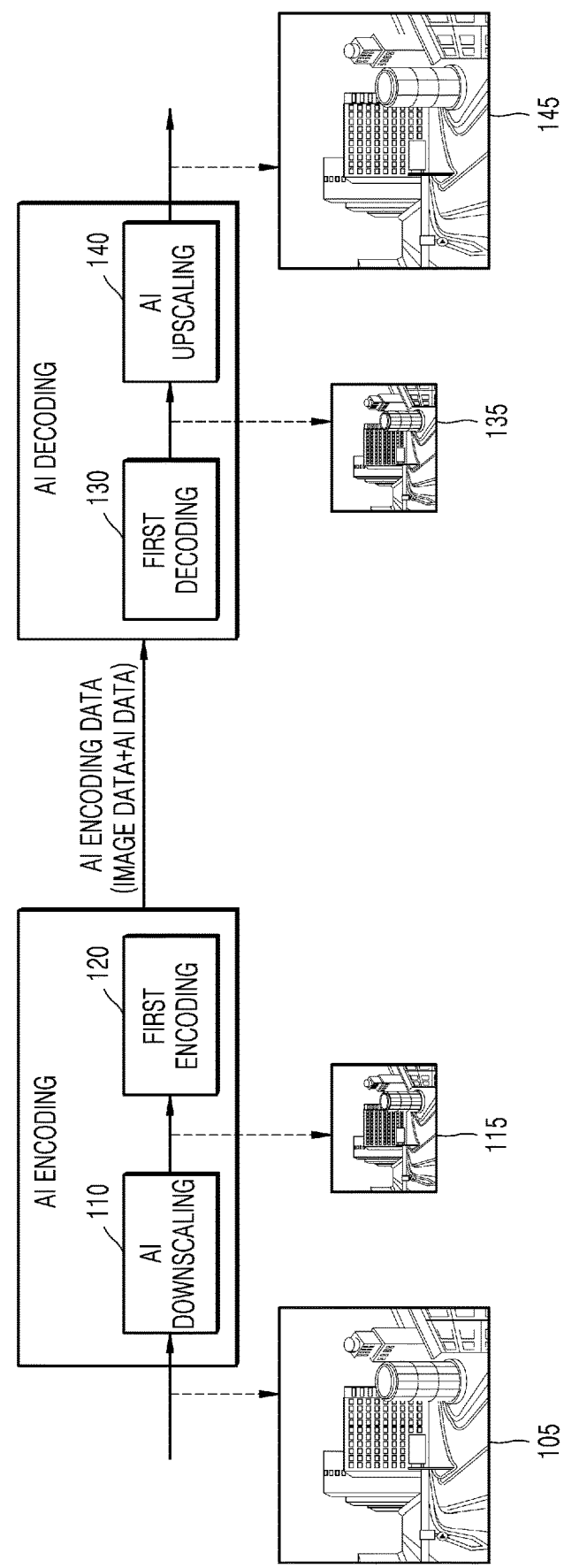
FIG. 1 is a diagram for describing an artificial intelligence (AI) encoding process and an AI decoding process, according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art may be omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the disclosure, expressions such as "at least one of a, b or c" indicates only a, only b, only c, both a and b, both a and c, both b and c, all of a, b, and c, or variations thereof.

Also, in the present specification, an "image" or a "picture" may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a "parameter" is a value used in an operation process of each layer forming a neural network, and for example, may include a weight used when an input value is applied to a certain operation expression. Here, the parameter may be expressed in a matrix form. The parameter is a value set as a result of training, and may be updated by using separate training data, e.g., when necessary.

Also, in the present specification, a "first DNN" indicates a DNN used for artificial intelligence (AI) downscaling an image, and a "second DNN" indicates a DNN used for AI upscaling an image.

Also, in the present specification, "DNN setting information" includes the parameter described above as information related to the element constituting the DNN. The first DNN or the second DNN may be set by using the DNN setting information.

Also, in the present specification, an "original image" denotes an image that is an object of AI encoding, and a "first image" denotes an image obtained as a result of performing AI downscaling on the original image during an AI encoding process. A "second image" denotes an image obtained via first decoding during an AI decoding process, and a "third image" denotes an image obtained by AI upscaling the second image during the AI decoding process.

Also, in the present specification, "AI downscale" denotes a process of decreasing resolution of an image, based on AI, and "first encoding" denotes an encoding process according to an image compression method based on frequency transformation. Also, "first decoding" denotes a decoding process according to an image reconstruction method based on frequency transformation, and "AI up-scale" denotes a process of increasing resolution of an image, based on AI.

FIG. 1 is a diagram for describing an AI encoding process and an AI decoding process, according to an embodiment.

As described above, as a resolution of an image remarkably increases, the throughput of information for encoding/decoding the image is increased, and accordingly, a method for improving efficiency of encoding and decoding of an image is required.

As shown in FIG. 1, according to an embodiment, a first image 115 is obtained by performing AI downscaling 110 on an original image 105 having an original resolution (e.g., high resolution, 1920×1080 resolution or higher, 3840×2160 resolution or higher, 7680×4320 resolution, etc.). Then, first encoding 120 and first decoding 130 are performed on the first image 115 having relatively low resolution (i.e., lower than the original resolution), and thus a bitrate may be largely reduced as compared to when the first encoding 120 and the first decoding 130 are performed on the original image 105.

In detail, referring to FIG. 1, the first image 115 is obtained by performing the AI downscaling 110 on the original image 105 and the first encoding 120 is performed on the first image 115 during the AI encoding process, according to an embodiment. During the AI decoding process, AI encoding data including AI data and image data, which are obtained as a result of AI encoding, is received, a second image 135 is obtained via the first decoding 130, and a third image 145 is obtained by performing AI upscaling 140 on the second image 135.

Referring to the AI encoding process in detail, when the original image 105 is received, the AI downscaling 110 is performed on the original image 105 to obtain the first image 115 of certain resolution or certain quality. The AI downscaling 110 is performed based on AI, and AI for the AI downscaling 110 is trained jointly with AI for the AI upscaling 140 with respect to the second image 135. This is because, when the AI for the AI downscaling 110 and the AI for the AI upscaling 140 are separately trained, a difference between the original image 105, which is an object of AI encoding, and the third image 145 reconstructed through AI decoding increases.

In an embodiment, the AI data may be used to maintain such a joint relationship during the AI encoding process and the AI decoding process. Accordingly, the AI data obtained through the AI encoding process includes information indicating an upscaling target, and during the AI decoding process, the AI upscaling 140 is performed on the third image 135 according to the upscaling target verified based on the AI data.

The AI for the AI downscaling 110 and the AI for the AI upscaling 140 may be embodied as a DNN. As will be described below with reference to FIG. 11, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI upscaling 140 on the second image 135 to target quality and/or resolution based on the received target information.

Regarding the first encoding 120 and the first decoding 130 of FIG. 1, an information amount of the first image 115 obtained by performing the AI downscaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, AOMedia Video 1 (AV1), etc.

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Various modifications may be incorporated to the reconstructing process. For example, according to another embodiment, prediction (e.g., intra frame prediction) may be performed in the frequency domain rather than the spatial domain. Such first decoding 130 may be performed via an image reconstruction method corresponding to one of the image compression methods using frequency transformation, such as MPEG-2, H.264 AVC, MPEG-4, HEVC, VC-1, VP8, VP9, AV1, etc., which is used in the first encoding 132.

The AI encoding data obtained through the AI encoding process may include the image data obtained as a result of performing the first encoding 120 on the first image 115, and the AI data related to the AI downscaling 110 of the original image 105. The image data may be used during the first decoding 130 and the AI data may be used during the AI upscaling 140.

The image data may be transmitted in a form of a bitstream. The image data may include data obtained based on pixel values in the first image 115, for example, residual data that is a difference between the first image 115 and prediction data of the first image 115. Also, the image data includes pieces of information used during the first encoding 120 performed on the first image 115. For example, the image data may include prediction mode information, motion information, and information related to a quantization parameter used during the first encoding 120. The image data may be generated according to a rule, for example, according to a syntax, of an image compression method used during the first encoding 120, from among the image compression methods using frequency transformation, such as MPEG-2, H.264 AVC, MPEG-4, HEVC, VC-1, VP8, VP9, AV1, etc.

The AI data is used in the AI upscaling 140 based on the second DNN. As described above, because the first DNN and the second DNN are jointly trained, the AI data includes information enabling the AI upscaling 140 to be performed accurately on the second image 135 through the second DNN. During the AI decoding process, the AI upscaling 140 may be performed on the second third image 135 to have targeted resolution and/or quality, based on the AI data.

The AI data may be transmitted together with the image data in a form of a bitstream. According to another embodiment, the AI data may be transmitted separately from the image data, in a form of a frame or a packet. Alternatively, according to another embodiment, the AI data may be included in the image data and transmitted. The image data and the AI data may be transmitted through a same type of network or different types of networks.

Figure 2:
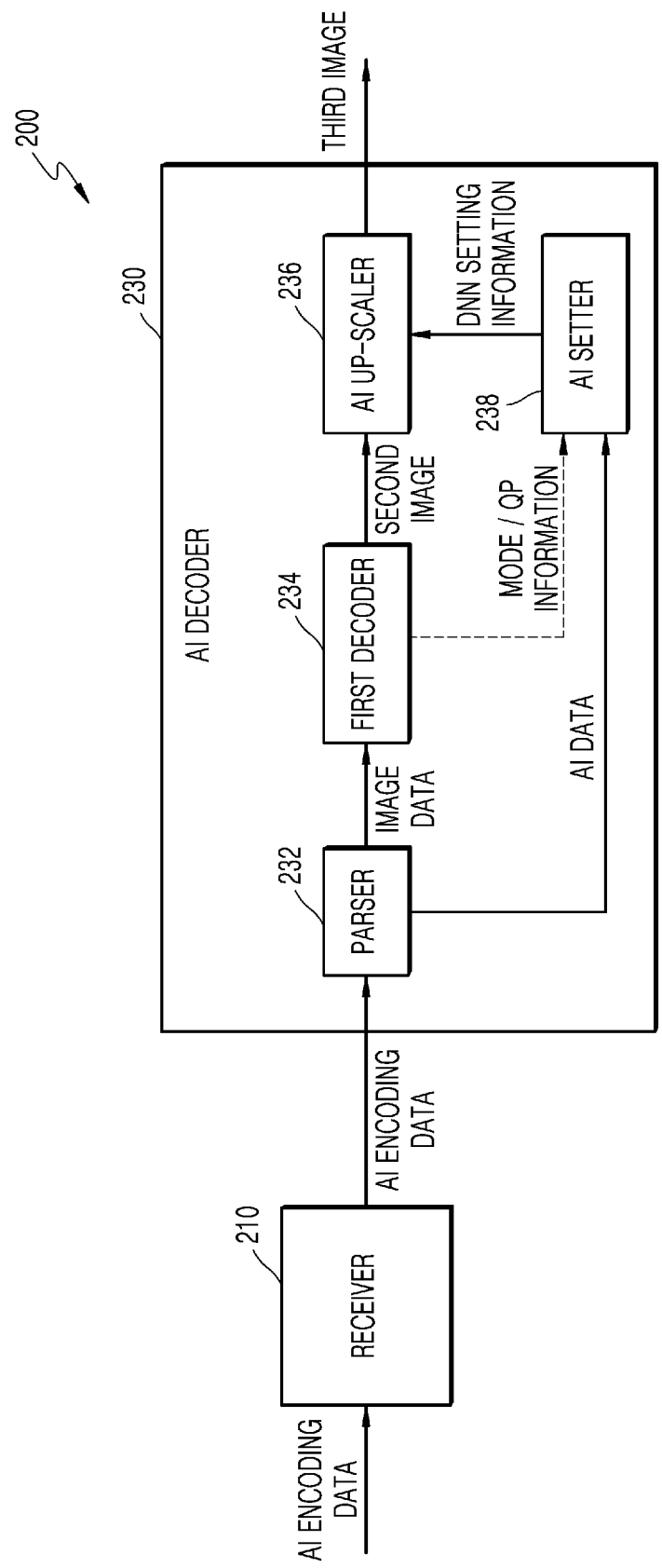
FIG. 2 is a block diagram of a structure of an AI decoding apparatus according to an embodiment.

FIG. 2 is a block diagram of a configuration of an AI decoding apparatus 200 according to an embodiment.

Referring to FIG. 2, the AI decoding apparatus 200 may include a receiver 210 and an AI decoder 230. The AI decoder 230 may include a parser 232, a first decoder 234, an AI up-scaler 236, and an AI setter 238.

In FIG. 2, the receiver 210 and the AI decoder 230 are illustrated as separate devices, but the receiver 210 and the AI decoder 230 may be implemented through one processor. In this case, the receiver 210 and the AI decoder 230 may be implemented through a dedicated processor or through a combination of software and a general-purpose processor such as an application processor (AP), a central processing unit (CPU), or a graphic processing unit (GPU). The dedicated processor may include a memory for implementing an embodiment (e.g., for storing instructions executable by the processor to perform a method according to an embodiment) or may include a memory processor for using an external memory.

The receiver 210 and the AI decoder 230 may be configured by a plurality of processors. In this case, the receiver 210 and the AI decoder 230 may be implemented through a combination of dedicated processors or through a combination of software and a plurality of general-purpose processors such as an AP, a CPU, or a GPU. According to an embodiment, the receiver 210 may be implemented using a first processor, the first decoder 234 may be implemented using a second processor different from the first processor, and the parser 232, the AI up-scaler 236, and the AI setter 238 may be implemented using a third processor different from the first and second processors. It is understood that this is just an example, and one or more other embodiments may implement the various components via any combination of one or more processors.

The receiver 210 receives AI encoding data obtained as a result of AI encoding. For example, the AI encoding data may be a video file having a file format such as mp4 or mov.

The receiver 210 may receive AI encoding data transmitted through a network. The receiver 210 outputs the AI encoding data to the AI decoder 230.

According to an embodiment, the AI encoding data may be obtained from a data storage medium including a magnetic medium (such as a hard disk, a floppy disk, or a magnetic tape), an optical recording medium (such as CD-ROM or DVD), or a magneto-optical medium (such as a floptical disk).

The parser 232 parses the AI encoding data to transmit image data obtained through first encoding on the first image 115 to the first decoder 234 and transmit AI data to the AI setter 238.

According to an embodiment, the parser 232 may parse the AI encoding data including the image data and the AI data separate from each other. The parser 232 may distinguish the AI data from the image data by reading a header within the AI encoding data. For example, the AI data may be included in a Vendor Specific InfoFrame (VSIF) within an HDMI stream. A structure of the AI encoding data including the AI data and the image data separate from each other will be described below with reference to FIG. 9.

According to another embodiment, the parser 232 may parse the AI encoding data to obtain image data, may extract AI data from the image data, and then may transmit the AI data to the AI setter 238 and the remaining image data to the first decoder 234. In other words, the AI data may be included in the image data. For example, the AI data may be included in supplemental enhancement information (SEI) that is an additional information region of a bitstream corresponding to the image data. A structure of the AI encoding data including the image data including the AI data will be described below with reference to FIG. 10.

According to another embodiment, the parser 232 may split the bitstream corresponding to the image data into a bitstream to be processed by the first decoder 234 and a bitstream corresponding to the AI data, and may output the split two bitstreams to the first decoder 234 and the AI setter 238, respectively.

The parser 232 may verify that the image data included in the AI encoding data is image data obtained via a predetermined codec (for example, MPEG-2, H.264 AVC, MPEG-4, HEVC, VC-1, VP8, VP9, AV1, etc.). In this case, the parser 232 may transmit corresponding information to the first decoder 234 such that the image data is processed via the verified codec.

The first decoder 234 reconstructs the second image 135 corresponding to the first image 115, based on the image data received from the parser 232. The second image 135 obtained by the first decoder 234 is provided to the AI up-scaler 236.

According to embodiments, first decoding related information, such as prediction mode information, motion information, and quantization parameter information may be provided by the first decoder 234 to the AI setter 238. The first decoding related information may be used to obtain DNN setting information.

The AI data provided to the AI setter 238 includes pieces of information enabling the second image 135 to undergo AI upscaling. Here, an upscaling target of the second image 135 corresponds to a downscaling target of a first DNN. Accordingly, the AI data includes information for verifying the downscaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is ascertained through the resolution of the reconstructed second image 135 and the resolution conversion degree can be verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of the resolution of the first image 115, a bitrate of the image data obtained as the result of performing first encoding on the first image 115, or a codec type used during the first encoding on the first image 115.

The AI setter 238 may determine the upscaling target of the second image 135, based on at least one of the difference information or the information related to the first image 115, which are included in the AI data. The upscaling target may indicate, for example, to what degree resolution is to be upscaled for the second image 135.

When the upscaling target is determined, the AI up-scaler 236 performs AI upscaling on the second image 135 through a second DNN to obtain the third image 145 corresponding to the upscaling target.

Before describing a method, performed by the AI setter 238, of determining the upscaling target based on the AI data, an AI upscaling process through the second DNN will now be described with reference to FIGS. 3 and 4.

Figure 3:
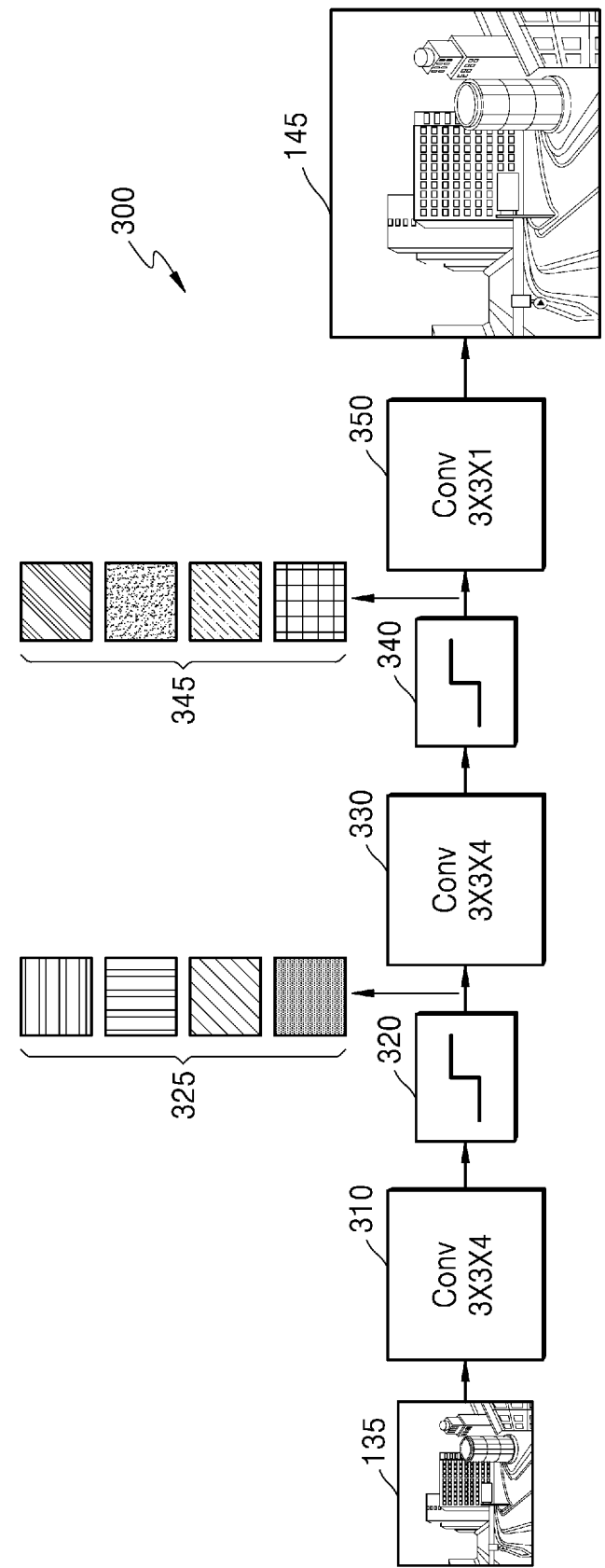
FIG. 3 is a diagram showing a second deep neural network (DNN) for performing AI upscaling on a second image according to an embodiment.
Figure 4:
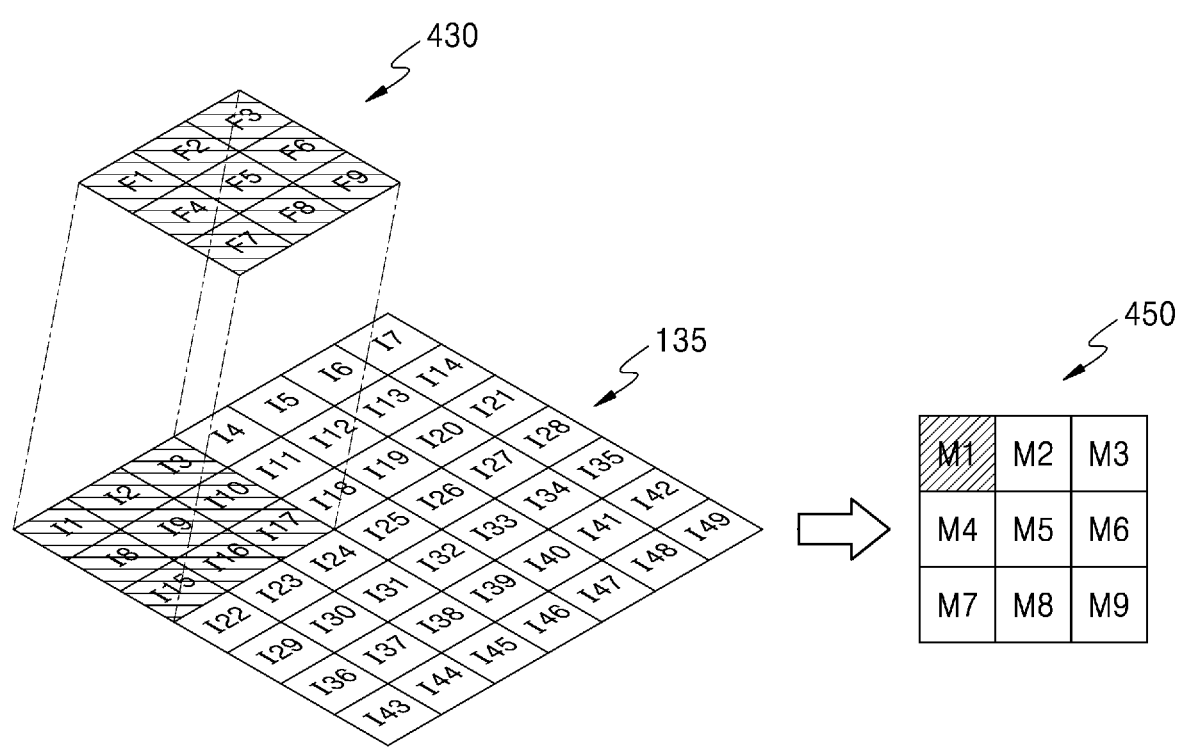
FIG. 4 is a diagram for describing a convolution operation in a convolution layer according to an embodiment.

FIG. 3 is a diagram showing a second DNN 300 for performing AI upscaling on the second image 135, and FIG. 4 is a diagram illustrating a convolution operation in a first convolution layer 310 of FIG. 3.

As shown in FIG. 3, the second image 135 is input to the first convolution layer 310. 3X3X4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic of the second image 135.

A convolution operation in the first convolution layer 310 is described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example. When the second image 135 has a resolution of 4K, the second image 155 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplications may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplications may be assigned as a value of M2 of the feature map 450.

While the filter kernel 430 is moving along the stride to the last pixel of the second image 135, the convolution operation is performed between the pixel values in the second image 135 and the parameters of the filter kernel 430, and thus the feature map 450 having a certain size may be generated.

According to the disclosure, values of parameters of a second DNN, for example, values of parameters of a filter kernel used in convolution layers of the second DNN (for example, F1 through F9 of the filter kernel 430), may be optimized through joint training of a first DNN and the second DNN. The AI setter 238 may determine an upscaling target corresponding to a downscaling target of the first DNN, based on AI data, and determine parameters corresponding to the determined upscaling target as the parameters of the filter kernel used in the convolution layers of the second DNN.

Convolution layers included in the first DNN and the second DNN may perform processes according to the convolution operation process described with reference to FIG. 4, although it is understood that this convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that some sample values of the feature map, which is an output of the first convolution layer 310, is changed. Here, the change is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3X3X4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3X3X1 indicated in the third convolution layer 350 shown in FIG. 3 indicates that a convolution process is performed to generate one output image by using one filter kernel having a size of 3×3. The third convolution layer 350 is a layer for outputting a final image, and generates one output by using one filter kernel. According to an embodiment, the third convolution layer 350 may output the third image 145 through a convolution operation.

There may be a plurality of pieces of DNN setting information indicating the numbers of filter kernels of the first, second, and third convolution layers 310, 330, and 350 of the second DNN 300, parameters of the filter kernels of the first, second, and third convolution layers 310, 330, and 350 of the second DNN 300, and the like, as will be described below, and the plurality of pieces of DNN setting information are connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers, namely, the first, second, and third convolution layers 310, 330, and 350, and two activation layers, namely, the first and second activation layers 320 and 340, but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment is changed to an RNN structure.

According to an embodiment, the AI up-scaler 236 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

A method in which the AI setter 238 determines the upscaling target of the second image 135 and the AI up-scaler 236 performs the AI upscaling on the second image 135 according to the upscaling target will now be described.

According to an embodiment, the AI setter 238 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel.

The plurality of pieces of DNN setting information may respectively correspond to various upscaling targets, and the second DNN may operate based on DNN setting information corresponding to a certain upscaling target. The second DNN may have different structures based on the DNN setting information. For example, the second DNN may include three convolution layers according to any piece of DNN setting information, or may include four convolution layers according to another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI setter 238 may obtain the DNN setting information for performing AI upscaling on the second image 135, among the plurality of pieces of DNN setting information. Each of the plurality of pieces of DNN setting information used at this time is information for obtaining the third image 145 of a pre-determined resolution and/or pre-determined quality, and is trained jointly with a first DNN.

For example, one piece of DNN setting information among the plurality of pieces of DNN setting information may include pieces of information for obtaining the third image 145 of resolution twice as high as the resolution of the second image 135, for example, the third image 145 of 4K (4096×2160) twice as high as 2K (2048×1080) of the second image 135, and another piece of DNN setting information may include pieces of information for obtaining the third image 145 of resolution four times higher than the resolution of the second image 135, for example, the third image 145 of 8K (8192×4320) four times higher than 2K (2048×1080) of the second image 135.

Figure 7:
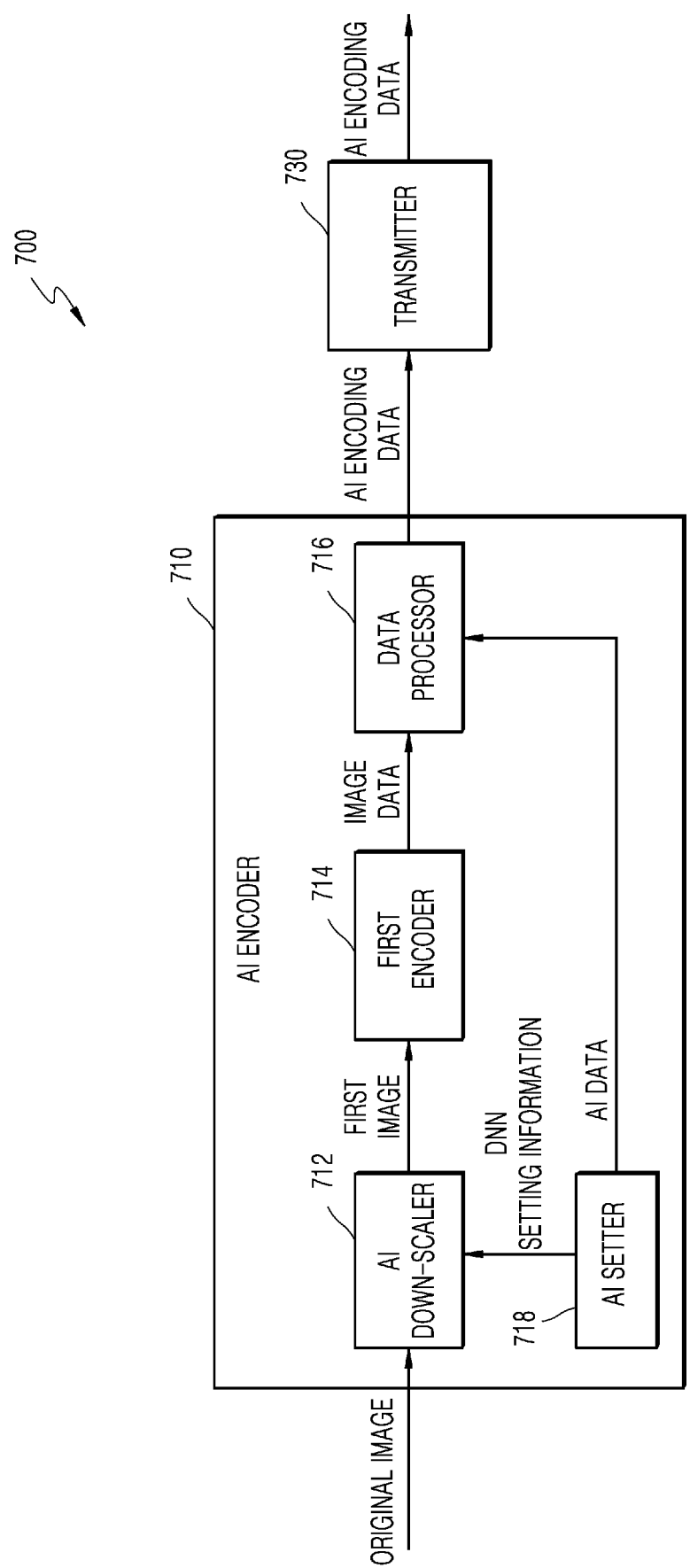
FIG. 7 is a block diagram of a structure of an AI encoding apparatus according to an embodiment.

Each of the plurality of pieces of DNN setting information is obtained jointly with DNN setting information of the first DNN of an AI encoding apparatus 700 of FIG. 7, and the AI setter 238 obtains one piece of DNN setting information among the plurality of pieces of DNN setting information according to an enlargement ratio corresponding to a reduction ratio of the DNN setting information of the first DNN. To this end, the AI setter 238 verifies information of the first DNN. In order for the AI setter 238 to verify the information of the first DNN, the AI decoding apparatus 200 according to an embodiment receives AI data including the information of the first DNN from the AI encoding apparatus 700.

In other words, the AI setter 238 may verify information targeted by DNN setting information of the first DNN used to obtain the first image 115 and obtain the DNN setting information of the second DNN trained jointly with the DNN setting information of the first DNN, by using pieces of information received from the AI encoding apparatus 700.

When DNN setting information for performing the AI upscaling on the second image 135 is obtained from among the plurality of pieces of DNN setting information, the DNN setting information may be transmitted to the AI up-scaler 236, and input data may be processed based on the second DNN operating according to the DNN setting information.

For example, when any one piece of DNN setting information is obtained, the AI up-scaler 236 sets the number of filter kernels included in each of the first, second, and third convolution layers 310, 330, and 350 of the second DNN 300 of FIG. 3, and the parameters of the filter kernels, as values included in the obtained DNN setting information.

In detail, when parameters of a filter kernel of 3×3 used in any one convolution layer of the second DNN 300 of FIG. 3 are {1, 1, 1, 1, 1, 1, 1, 1, 1} and DNN setting information is changed, the AI up-scaler 236 may replace the parameters of the filter kernel with {2, 2, 2, 2, 2, 2, 2, 2, 2} that are parameters included in the changed DNN setting information.

The AI setter 238 may obtain the DNN setting information for upscaling on the second image 135 from among the plurality of pieces of DNN setting information, based on information included in the AI data. The AI data used to obtain the DNN setting information will now be described.

According to an embodiment, the AI setter 238 may obtain the DNN setting information for AI upscaling on the second image 135 from among the plurality of pieces of DNN setting information, based on difference information included in the AI data. For example, when it is verified that the resolution (for example, 4K (4096×2160)) of the original image 105 is twice as high as the resolution (for example, 2K (2048×1080)) of the first image 115, based on the difference information, the AI setter 238 may obtain the DNN setting information for doubling the resolution of the second image 135.

According to another embodiment, the AI setter 238 may obtain the DNN setting information for AI upscaling on the second image 135 from among the plurality of pieces of DNN setting information, based on information related to the first image 115 included in the AI data. The AI setter 238 may pre-determine a mapping relationship between pieces of image-related information and pieces of DNN setting information, and obtain the DNN setting information mapped to the information related to the first image 115.

Figures 5, 6:
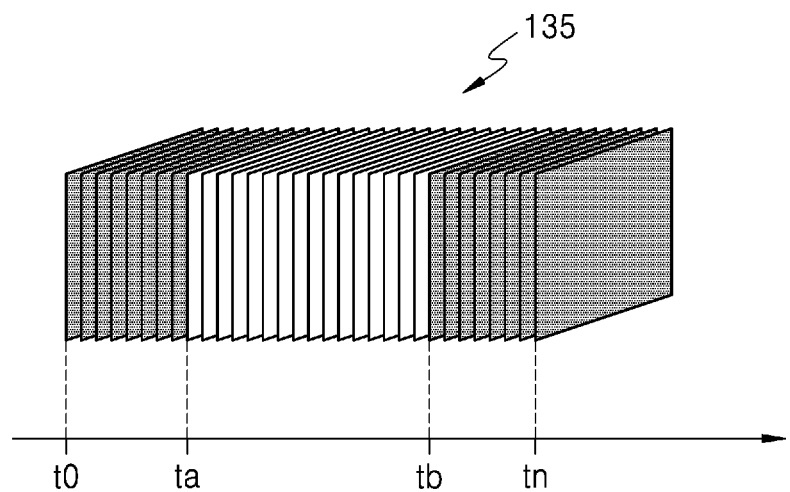
FIG. 5 is a table showing a mapping relationship between several pieces of image-related information and several pieces of DNN setting information according to an embodiment.
FIG. 6 is a diagram showing a second image including a plurality of frames according to an embodiment.

FIG. 5 is a table showing a mapping relationship between several pieces of image-related information and several pieces of DNN setting information according to an embodiment.

As shown in FIG. 5, the AI encoding and AI decoding processes according to an embodiment do not only consider a change of resolution. Rather, DNN setting information may be selected considering at least one of resolution, such as standard definition (SD), high definition (HD), or full HD, a bitrate, such as 10 Mbps, 15 Mbps, or 20 Mbps, or codec information, such as AV1, H.264, or HEVC, individually or collectively. For such consideration of the resolution, the bitrate and the codec information, training in consideration of each element is jointly performed with encoding and decoding processes during an AI training process (see FIG. 11).

Accordingly, when a plurality of pieces of DNN setting information are provided based on image-related information including a codec type, resolution of an image, and the like, as shown in FIG. 5 according to training, the DNN setting information for AI upscaling the second image 135 may be obtained based on the information related to the first image 115 received during the AI decoding process.

In other words, the AI setter 238 is capable of using DNN setting information according to image-related information by matching the image-related information at the left of a table of FIG. 5 with the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via an AV1 codec, the AI setter 238 may obtain A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed on the first image 115 via an H.264 codec, the AI setter 238 may obtain B DNN setting information among the plurality of pieces of DNN setting information.

Also, when it is verified, from the information related to the first image 115, that the resolution of the first image 115 is full HD, the bitrate of the image data obtained as the result of performing the first encoding on the first image 115 is 20 Mbps, and the first encoding is performed on the first image 115 via an HEVC codec, the AI setter 238 may obtain C DNN setting information among the plurality of pieces of DNN setting information. When it is verified, from the information related to the first image 115, that the resolution of the first image 115 is full HD, the bitrate of the image data obtained as the result of performing the first encoding on the first image 115 is 15 Mbps, and the first encoding is performed on the first image 115 via an HEVC codec, the AI setter 238 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on a certain image quality, and accordingly, the AI setter 238 may obtain DNN setting information according to a bitrate of image data indicating the quality of the second image 135.

According to another embodiment, the AI setter 238 may obtain the DNN setting information for performing AI upscaling on the second image 135 from among the plurality of pieces of DNN setting information considering both information (prediction mode information, motion information, quantization parameter information, and the like) provided from the first decoder 234 and the information related to the first image 115 included in the AI data. For example, the AI setter 238 may receive quantization parameter information used during a first encoding process of the first image 115 from the first decoder 234, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 234 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI upscaling is performed on the second image 135 to the upscaling target corresponding to the downscaling target of the first DNN. The AI setter 238 may obtain the identifier of the DNN setting information included in the AI data and then obtain DNN setting information corresponding to the identifier of the DNN setting information, and the AI up-scaler 236 may perform AI upscaling on the second image 135 by using the DNN setting information corresponding to the identifier of the DNN setting information. For example, an identifier indicating each of the plurality of DNN setting information settable in the first DNN and an identifier indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI downscaling of the original image 105. In response to the AI data, the AI setter 238 may obtain DNN setting information indicated by the identifier included in the AI data among the plurality of pieces of DNN setting information, and the AI up-scaler 236 may perform AI upscaling on the second image 135 by using the DNN setting information indicated by the identifier included in the AI data.

Also, according to an embodiment, the AI data may include the DNN setting information. The AI setter 238 may obtain the DNN setting information included in the AI data, and the AI up-scaler 236 may perform AI upscaling on the second image 135 by using the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 238 may obtain the DNN setting information by combining some values selected from the values in the lookup table, based on information included in the AI data, and the AI up-scaler 236 may perform AI upscaling on the second image 135 by using the obtained DNN setting information.

According to an embodiment, when a structure of a DNN corresponding to the upscaling target is determined, the AI setter 238 may obtain the DNN setting information, for example, parameters of a filter kernel, corresponding to the determined structure of the DNN.

As described above, the AI setter 238 obtains the DNN setting information of the second DNN through the AI data including information related to the first DNN, and the AI up-scaler 236 may perform AI upscaling on the second image 135 through the second DNN set based on the obtained DNN setting information. In this case, memory usage and throughput may be reduced compared to when features of the second image 135 are directly analyzed for upscaling.

According to an embodiment, when the second image 135 includes a plurality of frames, the AI setter 238 may independently obtain DNN setting information in units of a certain number of frames (where the certain number is one or an integer greater than one), or may obtain common DNN setting information for all of the plurality of frames.

FIG. 6 is a diagram showing the second image 135 including a plurality of frames according to an embodiment.

As shown in FIG. 6, the second image 135 may include frames t0 through tn.

According to an embodiment, the AI setter 238 may obtain DNN setting information of a second DNN through AI data, and the AI up-scaler 236 may perform AI upscaling on the frames t0 through tn based on the obtained DNN setting information. In other words, the frames t0 through tn may be processed via AI upscaling based on common DNN setting information.

According to another embodiment, the AI setter 238 may obtain DNN setting information 'A' from AI data, for some of the frames t0 through tn, for example, the frames t0 through ta, and may obtain DNN setting information 'B' from the AI data, for the frames ta+1 through tb. Also, the AI setter 238 may obtain DNN setting information 'C' from the AI data, for the frames tb+1 through tn. In other words, the AI setter 238 may independently obtain DNN setting information for each group including a certain number of frames (where the certain number is one or an integer greater than one) among the plurality of frames, and the AI up-scaler 236 may perform AI upscaling on the frames included in each group by using the independently-obtained DNN setting information.

According to another embodiment, the AI setter 238 may independently obtain DNN setting information for each frame forming the second image 135. In other words, when the second image 135 includes three frames, the AI setter 238 may obtain DNN setting information in relation to a first frame, obtain DNN setting information in relation to a second frame, and obtain DNN setting information in relation to a third frame. In other words, DNN setting information may be obtained independently for each of the first, second, and third frames. DNN setting information may be independently obtained for each frame included in the second image 135, according to a method of obtaining DNN setting information based on information (prediction mode information, motion information, quantization parameter information, or the like) provided from the first decoder 234 and information related to the first image 115 included in the AI data. This is because the mode information, the quantization parameter information, or the like may be determined independently for each frame included in the second image 135.

According to another embodiment, the AI data may include information indicating for up to which frame is DNN setting information valid, the DNN setting information being obtained based on the AI data. For example, when the AI data includes information indicating that DNN setting information is valid for up to the frame ta, the AI setter 238 may obtain DNN setting information, based on the AI data, and the AI up-scaler 236 may perform AI upscaling on the frames t0 through ta by using the obtained DNN setting information. Also, when another piece of AI data includes information indicating that DNN setting information is valid for up to the frame tn, the AI setter 238 may obtain DNN setting information, based on the other piece of AI data, and the AI up-scaler 236 may perform AI upscaling on the frames ta+1 through to by using the obtained DNN setting information.

The AI encoding apparatus 700 for performing AI encoding on the original image 105 will now be described with reference to FIG. 7.

FIG. 7 is a block diagram of a configuration of the AI encoding apparatus 700 according to an embodiment.

Referring to FIG. 7, the AI encoding apparatus 700 may include an AI encoder 710 and a transmitter 730. The AI encoder 710 may include an AI down-scaler 712, a first encoder 714, a data processor 716, and an AI setter 718.

In FIG. 7, the AI encoder 710 and the transmitter 730 are illustrated as separate devices, but the AI encoder 710 and the transmitter 730 may be implemented through one processor. In this case, the AI encoder 710 and the transmitter 730 may be implemented through a dedicated processor or through a combination of software and a general-purpose processor such as an AP, a CPU or a GPU. The dedicated processor may include a memory for implementing an embodiment (e.g., for storing instructions executable by the processor to perform a method according to an embodiment) or may include a memory processor for using an external memory.

Also, the AI encoder 710 and the transmitter 730 may be configured by a plurality of processors. In this case, the AI encoder 710 and the transmitter 730 may be implemented through a combination of dedicated processors or through a combination of software and a plurality of general-purpose processors such as an AP, a CPU, or a GPU. According to an embodiment, the first encoder 714 may be configured by a first processor, the AI down-scaler 712, the data processor 716, and the AI setter 718 may be implemented using a second processor different from the first processor, and the transmitter 730 may be implemented using a third processor different from the first and second processors. It is understood that this is just an example, and one or more other embodiments may implement the various components via any combination of one or more processors.

The AI encoder 710 performs AI downscaling on the original image 105 and first encoding on the first image 115, and transmits AI encoding data to the transmitter 730. The transmitter 730 transmits the AI encoding data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, and quantization parameter information used to perform the first encoding on the first image 115, for example.

The AI data includes pieces of information enabling the AI up-scaler 236 to perform AI upscaling on the second image 135 to an upscaling target corresponding to a downscaling target of a first DNN.

According to an embodiment, the AI data may include difference information between the original image 105 and the first image 115.

According to an embodiment, the AI data may include information related to the first image 115. The information related to the first image 115 may include information about at least one of a resolution of the first image 115, a bitrate of the image data obtained as the result of performing first encoding on the first image 115, or a codec type used during the first encoding of the first image 115.

According to an embodiment, the AI data may include an identifier of mutually agreed DNN setting information such that the AI upscaling is performed on the second image 135 to the upscaling target corresponding to the downscaling target of the first DNN.

Also, according to an embodiment, the AI data may include DNN setting information settable in a second DNN.

The AI down-scaler 712 may obtain the first image 115 obtained by performing the AI downscaling on the original image 105 through the first DNN. The AI down-scaler 712 may perform AI downscaling on the original image 105 by using DNN setting information provided by the AI setter 718.

The AI setter 718 may determine the downscaling target of the original image 105, based on a pre-determined standard.

In order to obtain the first image 115 matching the downscaling target, the AI setter 718 may store a plurality of pieces of DNN setting information settable in the first DNN. The AI setter 718 obtains DNN setting information corresponding to the downscaling target from among the plurality of pieces of DNN setting information, and provides the obtained DNN setting information to the AI down-scaler 712.

Each of the plurality of pieces of DNN setting information may be trained to obtain the first image 115 of pre-determined resolution and/or pre-determined quality. For example, any one piece of DNN setting information among the plurality of pieces of DNN setting information may include pieces of information for obtaining the first image 115 of resolution that is half resolution of the original image 105, for example, the first image 115 of 2K (2048×1080) that is half of 4K (4096×2160) of the original image 105, and another piece of DNN setting information may include information for obtaining the first image 115 of resolution that is quarter resolution of the original image 105, for example, the first image 115 of 2K (2048×1080) that is quarter of 8K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 718 may obtain the DNN setting information by combining some values selected from the values in the lookup table, based on the downscaling target, and provide the obtained DNN setting information to the AI down-scaler 712.

According to an embodiment, the AI setter 718 may determine a structure of a DNN corresponding to the downscaling target, and obtain DNN setting information corresponding to the determined structure of the DNN, for example, obtain parameters of a filter kernel.

The plurality of pieces of DNN setting information for performing the AI downscaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 712 may obtain the first image 115 of certain resolution and/or certain quality through the first DNN by setting the first DNN with the DNN setting information selected to perform the AI downscaling on the original image 105. When the DNN setting information for performing the AI downscaling on the original image 105 is obtained from the plurality of pieces of DNN setting information, each layer in the first DNN may process input data based on pieces of information included in the DNN setting information.

A method, performed by the AI setter 718, of determining the downscaling target will now be described. The downscaling target may indicate, for example, by how much the resolution is decreased from the original image 105 to obtain the first image 115.

The AI setter 718 obtains one or more pieces of input information. According to an embodiment, the input information may include at least one of target resolution of the first image 115, a target bitrate of the image data, a bitrate type of the image data (for example, a variable bitrate type, a constant bitrate type, or an average bitrate type), a color format (luminance component, chrominance component, red component, green component, and/or blue component, by way of example) to which AI downscaling is applied, a codec type for first encoding, compression history information, resolution of the original image 105, or a type of the original image 105.

The one or more pieces of input information may include information pre-stored in the AI encoding apparatus 700 or information received from a user.

The AI setter 718 controls an operation of the AI up-scaler 712, based on the input information. According to an embodiment, the AI setter 718 may determine a downscaling target according to the input information, and may provide DNN setting information corresponding to the determined downscaling target to the AI down-scaler 712.

According to an embodiment, the AI setter 718 transmits at least a part of the input information to the first encoder 714, and thus the first encoder 714 may perform first encoding on the first image 115 via a bitrate of a certain value, a bitrate of a certain type, and a certain codec.

According to an embodiment, the AI setter 718 may determine the downscaling target, based on at least one of a compression ratio (for example, a resolution difference between the original image 105 and the first image 115, a target bitrate, or the like), a compression quality (for example, a type of bitrate), compression history information, or a type of the original image 105.

For example, the AI setter 718 may determine the downscaling target, based on the compression ratio, the compression quality, or the like, which is pre-set or received from a user.

As another example, the AI setter 718 may determine the downscaling target by using the compression history information stored in the AI encoding apparatus 700. For example, according to the compression history information usable by the AI encoding apparatus 700, an encoding quality, a compression ratio, or the like preferred by the user may be determined, and the downscaling target may be determined according to the encoding quality determined based on the compression history information. For example, the resolution, quality, or the like of the first image 115 may be determined according to the encoding quality that has been used most often according to the compression history information.

As another example, the AI setter 718 may determine the downscaling target based on the encoding quality that has been used more frequently than a certain (e.g., pre-determined) threshold value (for example, an average quality of the encoding qualities that have been used more frequently than the certain threshold value), according to the compression history information.

As another example, the AI setter 718 may determine the downscaling target, based on the resolution, type (for example, a file format), or the like of the original image 105.

According to an embodiment, when the original image 105 includes a plurality of frames, the AI setter 718 may independently obtain DNN setting information in units of a certain number of frames (where the certain number is one or an integer greater than one), or may provide the independently-obtained DNN setting information to the AI down-scaler 712.

According to an embodiment, the AI setter 718 may divide the frames included in the original image 105 into a certain number of groups, and independently determine the downscaling target for each group. The same or different pieces of DNN setting information may be obtained for each group. The numbers of frames included in the groups may be the same or different according to each group.

According to another embodiment, the AI setter 718 may independently determine DNN setting information for each of the frames included in the original image 105. The same or different pieces of DNN setting information may be obtained for each frame.

An example of a structure of a first DNN 800 on which AI downscaling is based will now be described.

Figure 8:
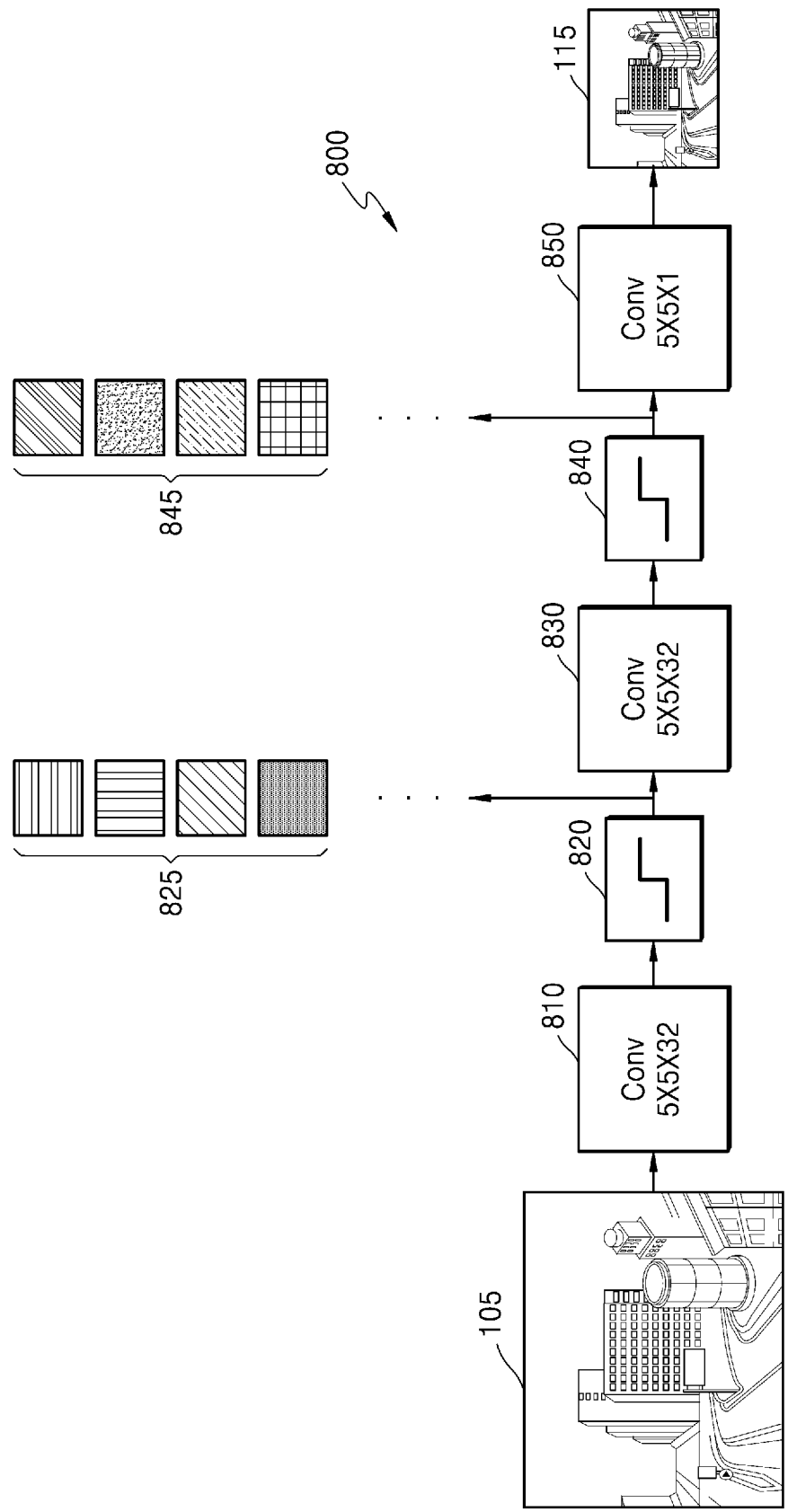
FIG. 8 is a diagram showing a first DNN for performing AI downscaling on an original image according to an embodiment.

FIG. 8 is a diagram showing the first DNN 800 for performing AI downscaling on the original image 105 according to an embodiment.

As shown in FIG. 8, the original image 105 is input to a first convolution layer 810. The first convolution layer 810 performs a convolution process on the original image 105 by using 32 filter kernels having a size of 5×5. 32 feature maps generated as a result of the convolution process are input to a first activation layer 820.

The first activation layer 820 may assign a non-linear feature to the 32 feature maps.

The first activation layer 820 determines whether to transmit sample values of the feature maps output from the first convolution layer 810 to a second convolution layer 830. For example, some of the sample values of the feature maps are activated by the first activation layer 820 and transmitted to the second convolution layer 830, and some of the sample values are deactivated by the first activation layer 820 and not transmitted to the second convolution layer 830. Information represented by the feature maps output from the first convolution layer 810 is emphasized by the first activation layer 820.

An output 825 of the first activation layer 820 is input to a second convolution layer 830. The second convolution layer 830 performs a convolution process on input data by using 32 filter kernels having a size of 5×5. 32 feature maps output as a result of the convolution process are input to a second activation layer 840, and the second activation layer 840 may assign a non-linear feature to the 32 feature maps.

An output 845 of the second activation layer 840 is input to a third convolution layer 850. The third convolution layer 850 performs a convolution process on input data by using one filter kernel having a size of 5×5. As a result of the convolution process, one image may be output from the third convolution layer 850. The third convolution layer 850 is a layer for outputting a final image, and obtains one output by using one filter kernel. According to an embodiment, the third convolution layer 850 may output the first image 115 as a result of a convolution operation.

There may be a plurality of pieces of DNN setting information indicating the numbers of filter kernels of the first, second, and third convolution layers 810, 830, and 850 of the first DNN 800, parameters of the filter kernels of the first, second, and third convolution layers 810, 830, and 850 of the first DNN 800, and the like, and the plurality of pieces of DNN setting information are connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 800 includes three convolution layers, namely, the first, second, and third convolution layers 810, 830, and 850, and two activation layers, namely, the first and second activation layers 820 and 840, but this is only an example, and the numbers of convolution layers and activation layers may vary according to an embodiment. Also, according to an embodiment, the first DNN 800 may be implemented as an RNN. In this case, a CNN structure of the first DNN 800 according to an embodiment is changed to an RNN structure.

According to an embodiment, the AI down-scaler 712 may include at least one ALU for the convolution operation and the operation of the activation layer. The ALU may be implemented as a processor. For the convolution operation, the ALU may include a multiplier that performs multiplication between sample values of the original image 105 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Referring back to FIG. 7, the AI setter 718 transmits AI data to the data processor 716. The AI data includes pieces of information enabling the AI up-scaler 236 to perform AI upscaling on the second image 135 to an upscaling target corresponding to a downscaling target of a first DNN.

Upon receiving the first image 115 from the AI down-scaler 712, the first encoder 714 may reduce an information amount of the first image 115 by performing first encoding on the first image 115 according to an image compression method based on frequency transformation. Image data is obtained as a result of the first encoding via a predetermined codec (for example, MPEG-2, H.264 AVC, MPEG-4, HEVC, VC-1, VP8, VP9, AV1, etc.). The image data is generated according to the rule, namely, the syntax, of the predetermined codec. For example, the image data may include residual data that is a difference between the first image 115 and prediction data of the first image 115, and prediction mode information, motion information, and quantization parameter information used to perform the first encoding on the first image 115.

The image data obtained as a result of the first encoding by the first encoder 714 is provided to the data processor 716.

The data processor 716 generates AI encoding data including the image data received from the first encoder 714 and the AI data received from the AI setter 718.

According to an embodiment, the data processor 716 may generate AI encoding data including the image data and the AI data separate from each other. For example, the AI data may be included in a VSIF within an HDMI stream.

According to another embodiment, the data processor 716 may include AI data within the image data obtained as a result of the first encoding by the first encoder 714, and may generate AI encoding data including the image data. For example, the data processor 716 may combine a bitstream corresponding to the image data with a bitstream corresponding to the AI data to generate image data in a form of one bitstream. To this end, the data processor 716 may express the AI data in a form of bits each having a value of 0 or 1, namely, a bitstream. According to an embodiment, the data processor 716 may include the bitstream corresponding to the AI data in supplemental enhancement information (SEI) that is an additional information region of a bitstream obtained as a result of the first encoding.

The AI encoding data is transmitted to the transmitter 730. The transmitter 730 transmits the AI encoding data obtained as the result of AI encoding through a network.

According to an embodiment, the AI encoding data may be stored in a data storage medium including a magnetic medium (such as a hard disk, a floppy disk, or a magnetic tape), an optical recording medium (such as CD-ROM or DVD), or a magneto-optical medium (such as a floptical disk).

Figure 9:
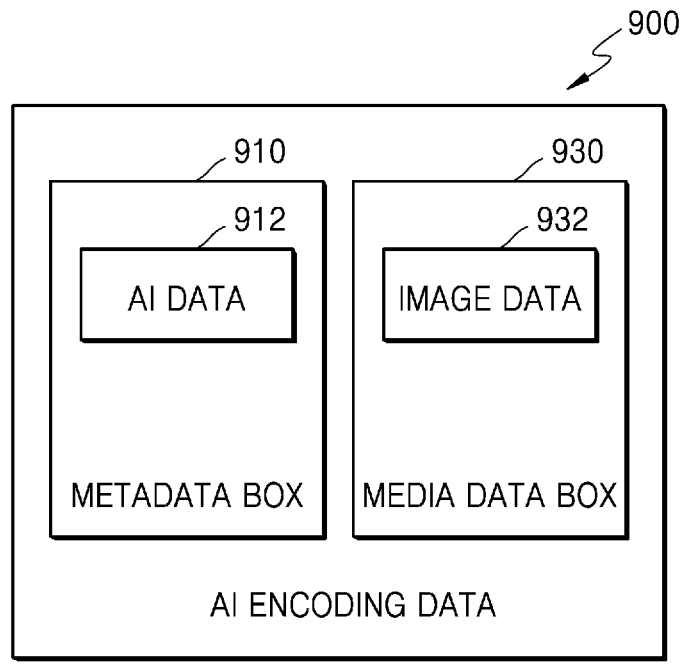
FIG. 9 is a block diagram of a configuration of AI encoding data according to an embodiment.

FIG. 9 is a block diagram of a configuration of AI encoding data 900 according to an embodiment.

As described above, the AI encoding data 900 may include AI data 912 and image data 932 separate from each other. The AI encoding data 900 may be a container format such as MP4, AVI, MKV, or FLV. The AI encoding data 900 may be configured with a metadata box 910 and a media data box 930.

The metadata box 910 includes information about the image data 932 included in the media data box 930. For example, the metadata box 910 may include information about at least one of the type of the first image 115, the type of a codec used to encode the first image 115, or a reproduction duration of the first image 115. The metadata box 910 may include the AI data 912. The AI data 912 may be encoded according to an encoding method provided in a certain container format and may be stored in the metadata box 910.

The media data box 930 may include the image data 932 generated according to the syntax of a certain image compression method.

Figure 10:
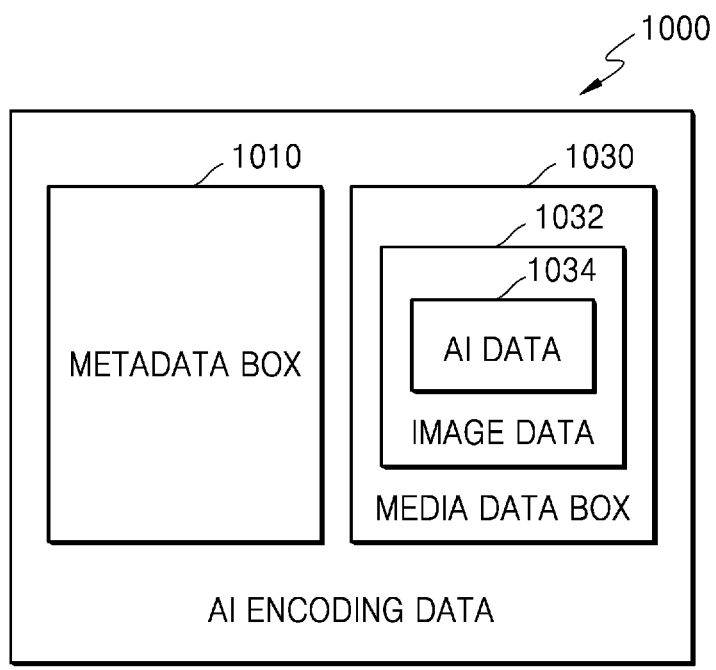
FIG. 10 is a block diagram of a configuration of AI encoding data according to another embodiment.

FIG. 10 is a block diagram of a configuration of AI encoding data 1000 according to another embodiment.

Referring to FIG. 10, AI data 1034 may be included in image data 1032. The AI encoding data 1000 may include a metadata box 1010 and a media data box 1030. When the AI data 1034 is included in the image data 1032, the metadata box 1010 may not include the AI data 1034.

The media data box 1030 may include the image data 1032 including the AI data 1034. For example, the AI data 1034 may be included in an additional information region of the image data 1032.

A method of jointly training the first DNN 800 and the second DNN 300 will now be described with reference to FIG. 11.

Figure 11:
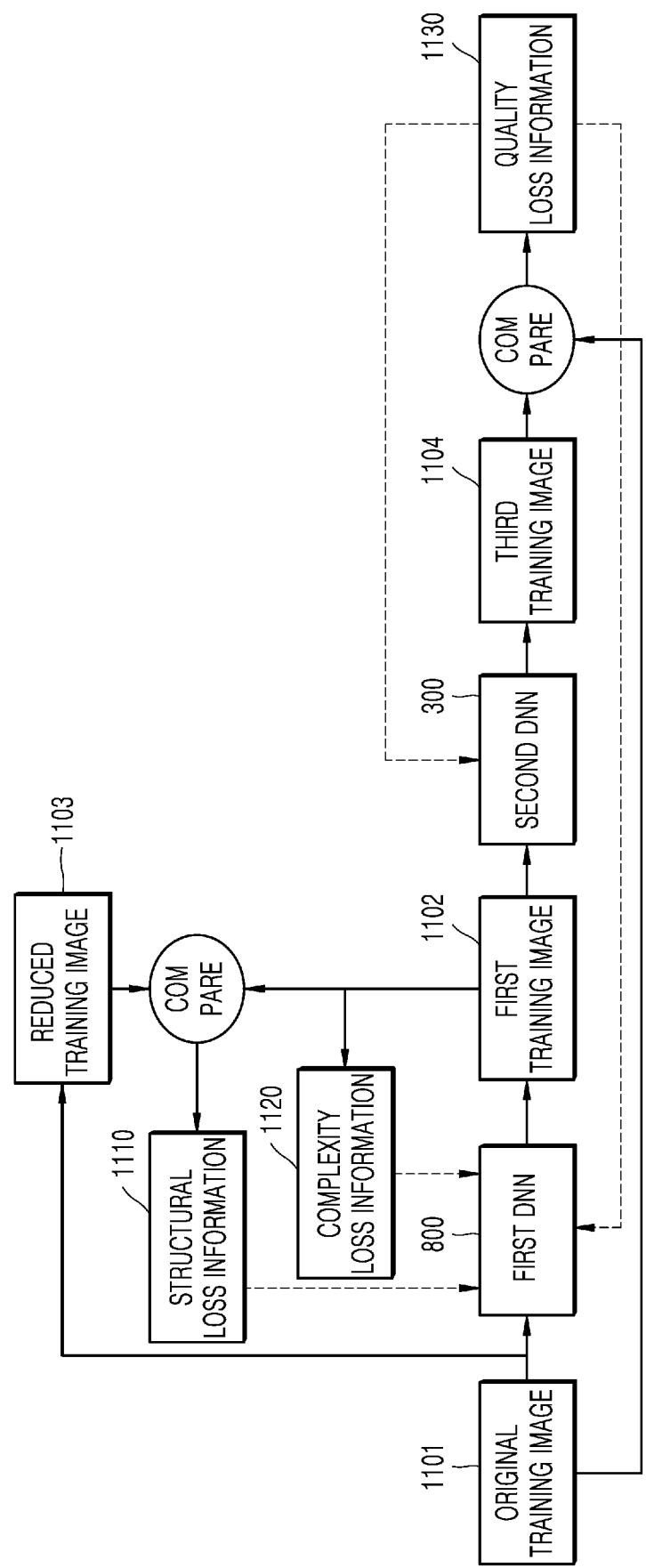
FIG. 11 is a diagram for describing a method of training a first DNN and a second DNN according to an embodiment.

FIG. 11 is a diagram for describing a method of training the first DNN 800 and the second DNN 300.

According to an embodiment, the original image 105 on which AI encoding is performed through an AI encoding process is reconstructed to the third image 145 via an AI decoding process, and, in order to maintain similarity between the third image 145 obtained as a result of AI decoding and the original image 105, connectivity between the AI encoding process and the AI decoding process is required. In other words, information lost in the AI encoding process is to be reconstructed during the AI decoding process, and, to this end, the first DNN 800 and the second DNN 300 are jointly trained.

For accurate AI decoding, ultimately, quality loss information 1130 corresponding to a result of comparing a third training image 1104 and an original training image 1101 shown in FIG. 11 is to be reduced. Accordingly, the quality loss information 1130 is used to train both of the first DNN 800 and the second DNN 300.

First, a training process shown in FIG. 11 will be described.

In FIG. 11, the original training image 1101 is an image on which AI downscaling is to be performed, and a first training image 1102 is an image obtained by performing AI downscaling on the original training image 1101. Also, the third training image 1104 is an image obtained by performing AI upscaling on the first training image 1102.

The original training image 1101 includes a still image or a moving image including a plurality of frames. According to an embodiment, the original training image 1101 may include a luminance image extracted from the still image or the moving image including the plurality of frames. According to an embodiment, the original training image 1101 may include a patch image extracted from the still image or the moving image including the plurality of frames. When the original training image 1101 includes the plurality of frames, the first training image 1102, a second training image, and the third training image 1104 also each include a plurality of frames. When the plurality of frames of the original training image 1101 are sequentially input to the first DNN 800, the plurality of frames of the first training image 1102, the second training image, and the third training image 1104 may be sequentially obtained through the first DNN 800 and the second DNN 300.

For joint training of the first DNN 800 and the second DNN 300, the original training image 1101 is input to the first DNN 800. The original training image 1101 input to the first DNN 800 is output as the first training image 1102 via the AI downscaling, and the first training image 1102 is input to the second DNN 300. The third training image 1104 is output as a result of performing the AI upscaling on the first training image 1102.

Referring to FIG. 11, the first training image 1102 is input to the second DNN 300. According to an embodiment, a second training image obtained as first encoding and first decoding are performed on the first training image 1102 may be input to the second DNN 300. In order to input the second training image to the second DNN 300, any one codec among MPEG-2, H.264, MPEG-4, HEVC, VC-1, VP8, VP9, AV1, etc., may be used. In detail, any one codec among MPEG-2, H.264, MPEG-4, HEVC, VC-1, VP8, VP9, AV1, etc., may be used to perform first encoding on the first training image 1102 and first decoding on image data corresponding to the first training image 1102.

Referring to FIG. 11, separate from the first training image 1102 being output through the first DNN 800, a reduced training image 1103 is obtained by performing legacy downscaling on the original training image 1101. Here, the legacy downscaling may include at least one of bilinear scaling, bicubic scaling, lanczos scaling, or stair step scaling.

In order to prevent a structural feature of the first image 115 from deviating greatly from a structural feature of the original image 105, the reduced training image 1103 is obtained to preserve the structural feature of the original training image 1101.

Before training is performed, the first DNN 800 and the second DNN 300 may be set with pre-determined DNN setting information. When the training is performed, structural loss information 1110, complexity loss information 1120, and the quality loss information 1130 may be determined.

The structural loss information 1110 may be determined based on a result of comparing the reduced training image 1103 and the first training image 1102. For example, the structural loss information 1110 may correspond to a difference between structural information of the reduced training image 1103 and structural information of the first training image 1102. Structural information may include various features extractable from an image, such as luminance, contrast, histogram, or the like of the image. The structural loss information 1110 indicates how much structural information of the original training image 1101 is maintained in the first training image 1102. When the structural loss information 1110 is small, the structural information of the first training image 1102 is similar to the structural information of the original training image 1101.

The complexity loss information 1120 may be determined based on spatial complexity of the first training image 1102. For example, a total variance value of the first training image 1102 may be used as the spatial complexity. The complexity loss information 1120 is related to a bitrate of image data obtained by performing first encoding on the first training image 1102. The bitrate of the image data is low when the complexity loss information 1120 is small.

The quality loss information 1130 may be determined based on a result of comparing the original training image 1101 with the third training image 1104. The quality loss information 1130 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 1101 and the third training image 1104. The quality loss information 1130 indicates how much the third training image 1104 is similar to the original training image 1101. The third training image 1104 is more similar to the original training image 1101 when the quality loss information 1130 is small.

Referring to FIG. 11, the structural loss information 1110, the complexity loss information 1120, and the quality loss information 1130 are used to train the first DNN 800, and the quality loss information 1130 is used to train the second DNN 300. In other words, the quality loss information 1130 is used to train both the first DNN 800 and the second DNN 300.

The first DNN 800 may update a parameter such that final loss information determined based on the structural loss information 1110, the complexity loss information 1120, and the quality loss information 1130 is reduced or minimized. Also, the second DNN 300 may update a parameter such that the quality loss information 1130 is reduced or minimized.

The final loss information for training the first DNN 800 and the second DNN 300 may be determined as Equation 1 below.

[Equation 1]

$$LossDS = a*\text{Structural loss information} + b*\text{Complexity loss information} + c*\text{Quality loss information} \quad LossUS = d*\text{Quality loss information}$$

In Equation 1, LossDS indicates final loss information to be reduced or minimized to train the first DNN 800, and LossUS indicates final loss information to be reduced or minimized to train the second DNN 300. Also, a, b, c and d may correspond to pre-determined certain weights.

In other words, the first DNN 800 updates parameters in a direction where LossDS of Equation 1 is reduced, and the second DNN 300 updates parameters in a direction where LossUS is reduced. When the parameters of the first DNN 800 are updated according to LossDS derived during the training, the first training image 1102 obtained based on the updated parameters becomes different from a previous first training image 1102 obtained during previous training, and accordingly, the third training image 1104 also becomes different from a previous third training image 1104 obtained during the previous training. When the third training image 1104 becomes different from the previous third training image 1104, the quality loss information 1130 is also newly determined, and the second DNN 300 updates the parameters accordingly. When the quality loss information 1130 is newly determined, LossDS is also newly determined, and the first DNN 800 updates the parameters according to the newly determined LossDS. In other words, updating of the parameters of the first DNN 800 leads to updating of the parameters of the second DNN 300, and the updating of the parameters of the second DNN 300 leads to updating of the parameters of the first DNN 800. Thus, because the first DNN 800 and the second DNN 300 are jointly trained by sharing the quality loss information 1130, the parameters of the first DNN 800 and the parameters of the second DNN 300 may be jointly optimized.

Referring to Equation 1, it is verified that LossUS is determined according to the quality loss information 1130, but this is only an example. LossUS may be determined based on at least one of the structural loss information 1110 or the complexity loss information 1120, and the quality loss information 1130.

It has been described above that the AI setter 238 of the AI decoding apparatus 200 and the AI setter 718 of the AI encoding apparatus 700 store the plurality of pieces of DNN setting information. Methods of training each of the plurality of pieces of DNN setting information stored in the AI setter 238 and the AI setter 718 will now be described.

As described with reference to Equation 1, the first DNN 800 updates the parameters considering the similarity (the structural loss information 1110) between the structural information of the first training image 1102 and the structural information of the original training image 1101, the bitrate (the complexity loss information 1120) of the image data obtained as a result of performing first encoding on the first training image 1102, and the difference (the quality loss information 1130) between the third training image 1104 and the original training image 1101.

In detail, the parameters of the first DNN 800 may be updated such that the first training image 1102 having similar structural information as the original training image 1101 is obtained and the image data having a small bitrate is obtained when first encoding is performed on the first training image 1102 and at the same time, the second DNN 300 performing AI upscaling on the first training image 1102 may obtain the third training image 1104 similar to the original training image 1101.

A direction in which the parameters of the first DNN 800 are optimized varies by adjusting the weights a, b, and c of Equation 1. For example, when the weight b is determined to be high, the parameters of the first DNN 800 may be updated by prioritizing a low bitrate over the high quality of the third training image 1104. Also, when the weight c is determined to be high, the parameters of the first DNN 800 may be updated by prioritizing high quality of the third training image 1104 over a high bitrate or maintenance of the structural information of the original training image 1101.

Also, the direction in which the parameters of the first DNN 800 are optimized may vary according to a type of codec used to perform first encoding on the first training image 1102. This is because the second training image to be input to the second DNN 300 may vary according to the type of codec.

In other words, the parameters of the first DNN 800 and the parameters of the second DNN 300 may be jointly updated based on the weights a, b, and c, and the type of codec for performing first encoding on the first training image 1102. Accordingly, when the first DNN 800 and the second DNN 300 are trained after determining the weights a, b, and c each to be a certain value and determining the type of codec to be a certain type, the parameters of the first DNN 800 and the parameters of the second DNN 300 connected and optimized to each other may be determined.

Also, when the first DNN 800 and the second DNN 300 are trained after changing the weights a, b, and c, and the type of codec, the parameters of the first DNN 800 and the parameters of the second DNN 300 connected and optimized to each other may be determined. In other words, the plurality of pieces of DNN setting information jointly trained with each other may be determined in the first DNN 800 and the second DNN 300 when the first DNN 800 and the second DNN 300 are trained while changing values of the weights a, b, and c, and the value of each type of codec.

As described above with reference to FIG. 5, the plurality of pieces of DNN setting information of the first DNN 800 and the second DNN 300 may be mapped to pieces of information related to a first image. To set such a mapping relationship, first encoding may be performed on the first training image 1102 output from the first DNN 800 via a certain codec according to a certain bitrate and the second training image obtained by performing first decoding on a bitstream obtained as a result of performing the first encoding may be input to the second DNN 300. In other words, by training the first DNN 800 and the second DNN 300 after setting an environment such that the first encoding is performed on the first training image 1102 of a certain resolution via the certain codec according to the certain bitrate, a DNN setting information pair mapped to the resolution of the first training image 1102, a type of the codec used to perform the first encoding on the first training image 1102, and the bitrate of the bitstream obtained as a result of performing the first encoding on the first training image 1102 may be determined. By variously changing the resolution of the first training image 1102, the type of codec used to perform the first encoding on the first training image 1102, and the bitrate of the bitstream obtained according to the first encoding of the first training image 1102, the mapping relationships between the plurality of pieces of DNN setting information of the first DNN 800 and the second DNN 300 and the pieces of information related to the first image may be determined.

Figure 12:
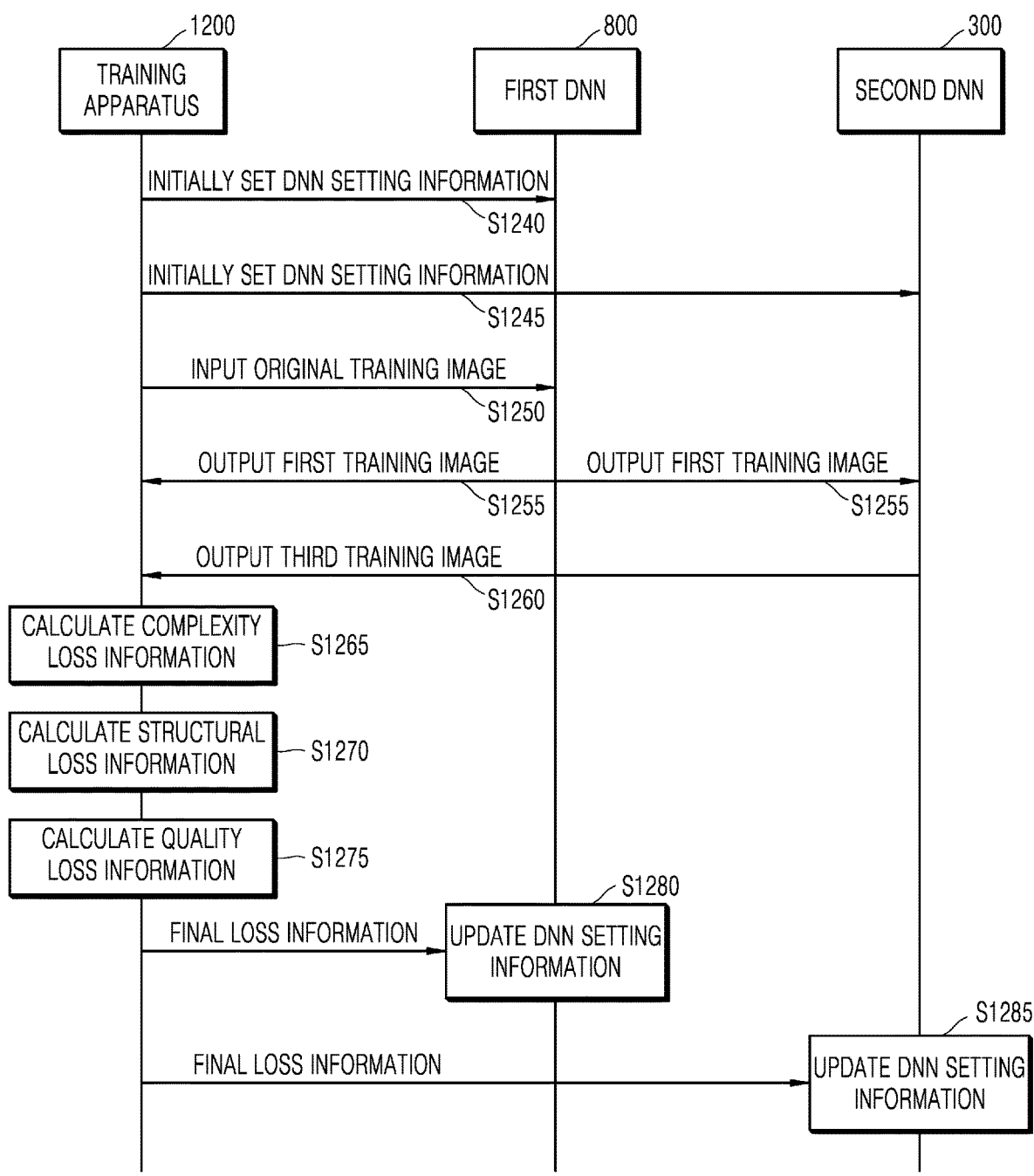
FIG. 12 is a diagram for describing training processes of a first DNN and a second DNN by a training apparatus according to an embodiment.

FIG. 12 is a diagram for describing training processes of the first DNN 800 and the second DNN 300 by a training apparatus 1200 according to an embodiment.

The training of the first DNN 800 and the second DNN 300 described above with reference to FIG. 11 may be performed by the training apparatus 1200. The training apparatus 1200 includes the first DNN 800 and the second DNN 300. The training apparatus 1200 may be, for example, the AI encoding apparatus 700 or a separate server. The pieces of DNN setting information of the second DNN 300 obtained as the training result are stored in the AI decoding apparatus 200.

Referring to FIG. 12, the training apparatus 1200 initially sets DNN setting information of the first DNN 800 and the second DNN 300, in operations S1240 and S1245. Accordingly, the first DNN 800 and the second DNN 300 may operate according to pre-determined DNN setting information. The DNN setting information may include information about at least one of the number of convolution layers included in the first DNN 800 and the second DNN 300, the number of filter kernels for each convolution layer, the size of a filter kernel for each convolution layer, or a parameter of each filter kernel.

The training apparatus 1200 inputs the original training image 1101 into the first DNN 800, in operation S1250. The original training image 1101 may include a still image or at least one frame included in a moving image.

The first DNN 800 processes the original training image 1101 according to the initially-set DNN setting information and outputs the first training image 1102 obtained by performing AI downscaling on the original training image 1101, in operation S1255. In FIG. 12, the first training image 1102 output from the first DNN 800 is directly input to the second DNN 300. However, the first training image 1102 output from the first DNN 800 may be input to the second DNN 300 by the training apparatus 1200. Also, the training apparatus 1200 may perform first encoding and first decoding on the first training image 1102 via a certain codec, and then input the second training image to the second DNN 300.

The second DNN 300 processes the first training image 1102 or the second training image according to the initially set DNN setting information and outputs the third training image 1104 obtained by performing AI upscaling on the first training image 1102 or the second training image, in operation S1260.

The training apparatus 1200 calculates the complexity loss information 1120, based on the first training image 1102, in operation S1265.

The training apparatus 1200 calculates the structural loss information 1110 by comparing the reduced training image 1103 and the first training image 1102, in operation S1270.

The training apparatus 1200 calculates the quality loss information 1130 by comparing the original training image 1101 and the third training image 1104, in operation S1275.

The first DNN 800 updates the initially set DNN setting information via a back propagation process based on final loss information, in operation S1280. The training apparatus 1200 may calculate the final loss information for training the first DNN 800, based on the complexity loss information 1120, the structural loss information 1110, and the quality loss information 1130.

The second DNN 300 updates the initially set DNN setting information via a back propagation process based on the quality loss information 1130 or the final loss information, in operation S1285. The training apparatus 1200 may calculate the final loss information for training the second DNN 300, based on the quality loss information 1130.

Then, the training apparatus 1200, the first DNN 800, and the second DNN 300 repeat operations S1250 through S1285 until pieces of final loss information are minimized, to update the DNN setting information. At this time, during each repetition, the first DNN 800 and the second DNN 300 operate according to the DNN setting information updated in the previous operation.

Table 1 below shows effects when AI encoding and AI decoding are performed on the original image 105 according to an embodiment and when encoding and decoding are performed on the original image 105 via HEVC.

TABLE 1

| Content | Resolution | Number of frames | Information amount (Bitrate) (Mbps) | | Subjective image quality score (VMAF) | |
|---|---|---|---|---|---|---|
| | | | HEVC | AI encoding/ AI decoding | HEVC | AI encoding/ AI decoding |
| Content_01 | 8 K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, even when a subjective image quality when AI encoding and AI decoding are performed on content including 300 frames of 8 K resolution according to an embodiment is higher than a subjective image quality when encoding and decoding are performed via HEVC, a bitrate is reduced by at least 50%.

Methods, performed by an AI encoding apparatus and an AI decoding apparatus according to an embodiment, of processing AI data through a first encoder (and a data processor) and a first decoder (and a parser, respectively, will now be described with reference to FIGS. 13A, 13B, 14A, 14B, 15A, 15B, 16A, 16B, 17 through 19, 20A through 20C, and 21 through 27.

Figure 13A:
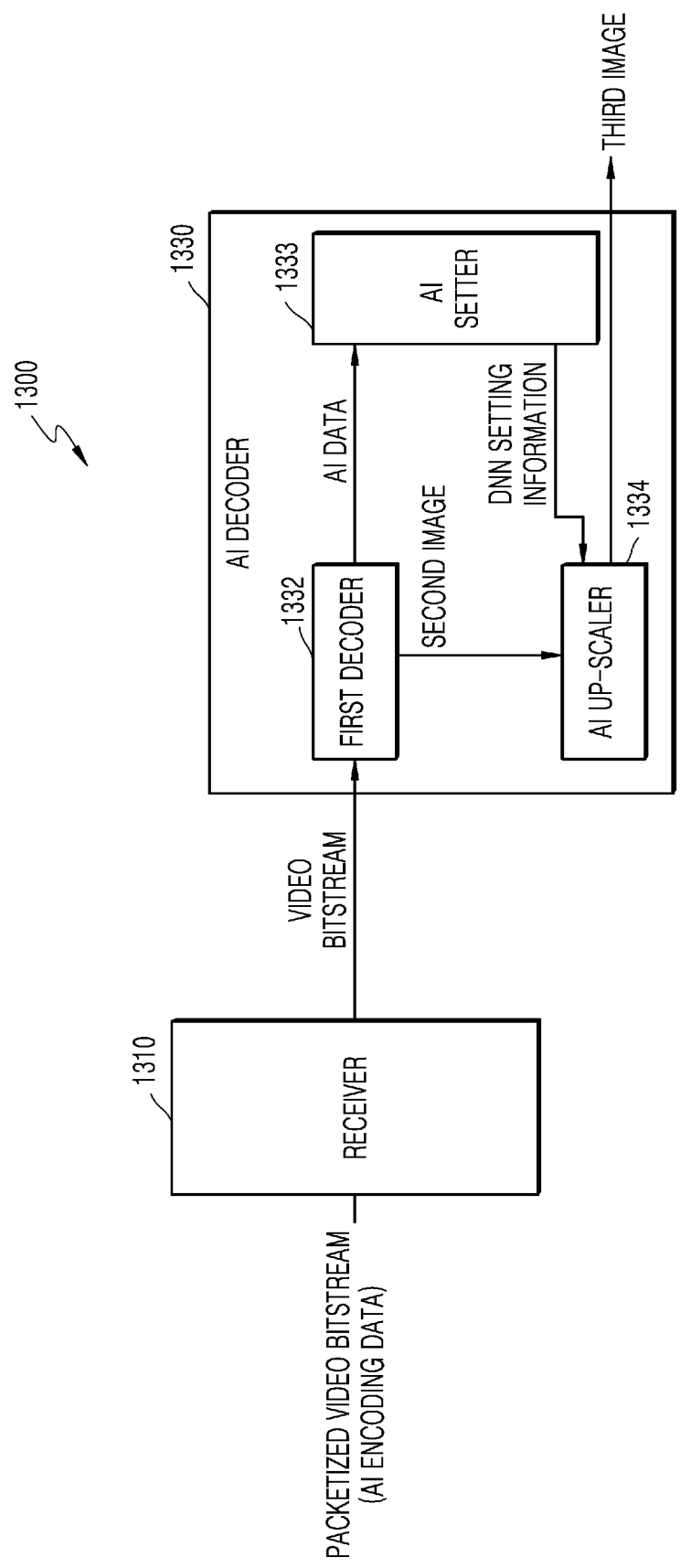
FIG. 13A is a block diagram of a configuration of an AI decoding apparatus according to an embodiment.

FIG. 13A is a block diagram of a configuration of an AI decoding apparatus 1300 according to an embodiment.

Referring to FIG. 13A, the AI decoding apparatus 1300 may include a receiver 1310 and an AI decoder 1330. The AI decoder 1330 may include a first decoder 1332, an AI setter 1333, and an AI up-scaler 1334.

The receiver 1310 and the AI decoder 1330 are illustrated as individual devices in FIG. 13A, but may be implemented through one processor. In this case, the receiver 1310 and the AI decoder 1330 may be implemented through a dedicated processor or through a combination of software and a general-purpose processor such as an AP, a CPU or a GPU. The dedicated processor may be implemented by including a memory for implementing an embodiment (e.g., for storing instructions executable by the processor to perform a method according to an embodiment) or by including a memory processor for using an external memory.

Also, the receiver 1310 and the AI decoder 1330 may be configured by a plurality of processors. In this case, the receiver 1310 and the AI decoder 1330 may be implemented through a combination of dedicated processors or through a combination of software and a plurality of general-purpose processors such as an AP, a CPU, or a GPU. It is understood that this is just an example, and one or more other embodiments may implement the various components via any combination of one or more processors Similarly, the AI up-scaler 1334, the AI setter 1333, and the first decoder 1332 may be implemented as different processors, or various combinations of plural processors.

The receiver 1310 may correspond to the receiver 210 described above with reference to FIG. 2. In other words, the receiver 1310 may perform at least a portion of an operation of the receiver 210. It is understood, however, that embodiments are not limited thereto, and the receiver 1310 may perform a different operation from the operation of the receiver 210.

The receiver 1310 receives a packetized video bitstream, obtains a video bitstream, and outputs the video stream to the AI decoder 1330. The packetized video bitstream may be obtained through packetization based on various network protocols such as a Real-Time Transport Protocol (RTP).

In detail, the receiver 1310 receives the packetized video bitstream through a network. The packetized video bitstream may include AI encoding data generated as a result of AI encoding. For example, the packetized video bitstream may include a main bitstream including image data and a sub-bitstream including AI data.

The main bitstream may be included in a main bitstream region within a video bitstream, which is defined in a predetermined codec. The main bitstream region may be a space defined generally in the predetermined codec to include the image data generated by encoding the original image 105. For example, when the predetermined codec is an H.264 codec, an HEVC codec, or a versatile video coding (WC) codec, the main bitstream region may be a NAL unit region of a Video Parameter Set (VPS), a Sequence Parameter Set (SPS), a Picture Parameter Set (PPS), or an I/P/B slice.

A sub-bitstream region may be a space defined generally in the predetermined codec to include supplemental data except for the image data generated by encoding the original image 105.

For example, when the predetermined codec is a H.264, an HEVC, or a VVC codec, the sub-bitstream region may be a Supplemental Enhancement Information (SEI) message region. An SEI message may include an SEI message including user data registered by a predetermined standard, and an SEI message including user data that is identified by a Universally Unique Identifier (UUID) and not registered.

For example, when the predetermined codec is an AV1 codec, a predetermined sub-bitstream may be a metadata open bitstream unit (OBU).

The packet of the packetized video bitstream may include a single NAL unit packet, a fragmentation unit packet, or an aggregation packet. A plurality of fragmentation unit packets may include the data of a single NAL unit, and one aggregation packet may include the data of a plurality of NAL units.

The receiver 1310 may read the header of data to obtain a video bitstream from the data. For example, the receiver 1310 may obtain, from the packetized video bitstream, a video bitstream included in a payload except for an Ethernet header, an IP header, a UDP/TCP header, and an RTP header.

The video bitstream may include at least one NAL unit, and the NAL unit may include a Video Coded Layer (VCL) NAL unit and a non-VCL NAL unit. Because the VCL NAL unit refers to a portion including image data obtained by encoding an actual image, and the non-VCL NAL unit is a portion including metadata of an image and may include image parameter information commonly used in at least one frame such as a VPS an SPS, or a PPS or may include supplemental data necessary for image encoding.

The receiver 1310 may output the video bitstream to the first decoder 1332 by arranging the plurality of NAL units in order. In this case, the receiver 1310 may output the video bitstream to the first decoder 1332 by arranging the plurality of NAL units in an order of an SPS, a PPS, an I slice, a P slice, and a B slice.

At this time, it may be verified that the image data included in the AI encoding data is image data generated via a predetermined codec (for example, MPEG-2, H.264 AVC, MPEG-4, HEVC, VC-1, VP8, VP9, AV1, etc.). In this case, codec type information may be transmitted to the first decoder 1332 through the receiver 1310 such that the image data is processed via the verified codec.

According to an embodiment, data obtained by the receiver 1310 may be obtained from a data storage medium including a magnetic medium (such as a hard disk, a floppy disk, or a magnetic tape), an optical recording medium (such as CD-ROM or DVD), or a magneto-optical medium (such as a floptical disk). For example, the receiver 1310 may obtain a video bitstream including the AI encoding data (for example, obtain a video bitstream through demuxing) from a video file having a file format such as mp4 or mov recorded in a data storage medium.

The first decoder 1332 may correspond to the first decoder 234 described above with reference to FIG. 2. The first decoder 1332 may further include the parser 232 of FIG. 2. However, embodiments are not limited thereto, and a parser may be included separate from the first decoder 1332. The parser may correspond to the parser 232.

The first decoder 1332 may obtain the sub-bitstream including the AI data and the main bitstream including the image data generated as a result of first encoding on the first image 115 by parsing the video bitstream. The first decoder 1332 may reconstruct the second image 135 corresponding to the first image 115, based on the image data. For example, the first decoder 1332 reconstructs the second image 135 corresponding to the first image 115, based on the image data included in the main bitstream.

The first decoder 1332 may obtain the AI data from the sub-bitstream including the AI data, and may output the AI data to the AI setter 1333. The AI data may include an AI upscaling activation (enable) flag and AI sub-data.

The AI setter 1333 may correspond to the AI setter 238 described above with reference to FIG. 2. The AI setter 1333 may determine, for example, whether to perform upscaling or not, and an upscaling target, based on the AI data.

The AI setter 1333 determines whether to perform AI upscaling on the second image 135, based on AI upscaling activation flag information, and, when it is determined (or based on determining) to perform AI upscaling on the second image 135, controls the first decoder 1332 to provide the second image 135 to the AI up-scaler 1334.

When the AI decoder 1330 determines that AI upscaling is performed on the second image 135, the AI decoder 1330 may provide mode information (for example, prediction mode information or motion information), quantization parameter information, and AI data included in the image data from the first decoder 1332 to the AI setter 1333.

When the AI decoder 1330 determines that AI upscaling is not performed on the second image 135, the second image 135 generated based on the image data may be output by the AI decoder 1330. At this time, the AI setter 1333 may control whether the second image 135 is to be provided to the AI up-scaler 1334 or to be output by the AI decoder 1330.

In response to the AI sub-data, the AI setter 1333 provides DNN setting information to the AI up-scaler 1334 so as to perform AI upscaling on the second image 135, based on the AI sub-data. According to an embodiment, the AI setter 1334 may obtain the DNN setting information by further using first decoding related information, such as the mode information, the quantization parameter information, and the like included in the image data, and may provide the DNN setting information to the AI up-scaler 1334.

The AI sub-data provided to the AI setter 1333 includes pieces of information enabling the second image 135 to undergo AI upscaling. Here, the upscaling target should correspond to a downscaling target of a first DNN. Accordingly, the AI sub-data should include information for verifying the downscaling target of the first DNN.

The AI sub-data may include difference information between resolution of the original image 105 and resolution of the first image 115. The AI sub-data may also include information related to the first image 115. The AI sub-data may also include resolution information of the third image 145 (or the original image 105) that the AI decoding apparatus 1300 is to generate.

The difference information may be expressed as information on a resolution conversion degree of the first image 115 relative to the original image 105 (for example, resolution conversion rate information), or may be expressed as ratio (or multiple) information of the first image 115 relative to the original image 105. For example, the ratio information of the first image 115 relative to the original image 105 may be flag information or index information representing that a ratio of the first image 115 to the original image 105 is 1.5 times or two times. Also, because the resolution of the first image 115 is ascertained through the resolution of the reconstructed second image 135 and the resolution conversion degree is verified accordingly, the difference information may be expressed only as resolution information of the original image 105. Here, the resolution information may be expressed as vertical/horizontal sizes or as a ratio (e.g., 16:9, 4:3, or the like) and a size of one axis. Also, when there is pre-set resolution information, the resolution information may be expressed in a form of an index or flag.

The information related to the first image 115 may include information about at least one of a bitrate of the image data generated as the result of performing first encoding on the first image 115 or a codec type used during the first encoding of the first image 115.

The AI setter 1333 may determine the upscaling target of the second image 135, based on at least one of the difference information, the information related to the first image 115, or resolution information of the third image 145, which are included in the AI data. The upscaling target may indicate, for example, to what degree resolution is to perform AI upscaling on the second image 135.

When the upscaling target is determined, the AI setter 1333 transmits the DNN setting information to the AI up-scaler 1334 so that AI upscaling is performed on the second image 135 through a second DNN to generate the third image 145 corresponding to the upscaling target.

According to an embodiment, the AI setter 1333 may obtain the DNN setting information by further inputting an average value of quantization parameters used in the first encoding on the first image 115 included in the AI sub-data in order to verify a second DNN for performing AI upscaling on the second image 135.

According to an embodiment, the AI setter 1333 may obtain the DNN setting information by further inputting quantization parameter indicator information of at least a portion of the first image 115 included in the AI sub-data in order to verify the second DNN for performing AI upscaling on the second image 135.

According to an embodiment, the AI setter 1333 may obtain the DNN setting information by further inputting information representing the genre of the first image 115 included in the AI sub-data in order to verify the second DNN for performing AI upscaling on the second image 135.

According to an embodiment, the AI setter 1333 may obtain the DNN setting information by further inputting additional metadata related to AI upscaling in order to verify the second DNN for performing AI upscaling on the second image 135. The additional metadata may be further input for effective AI upscaling on the second image 135.

Figure 13B:
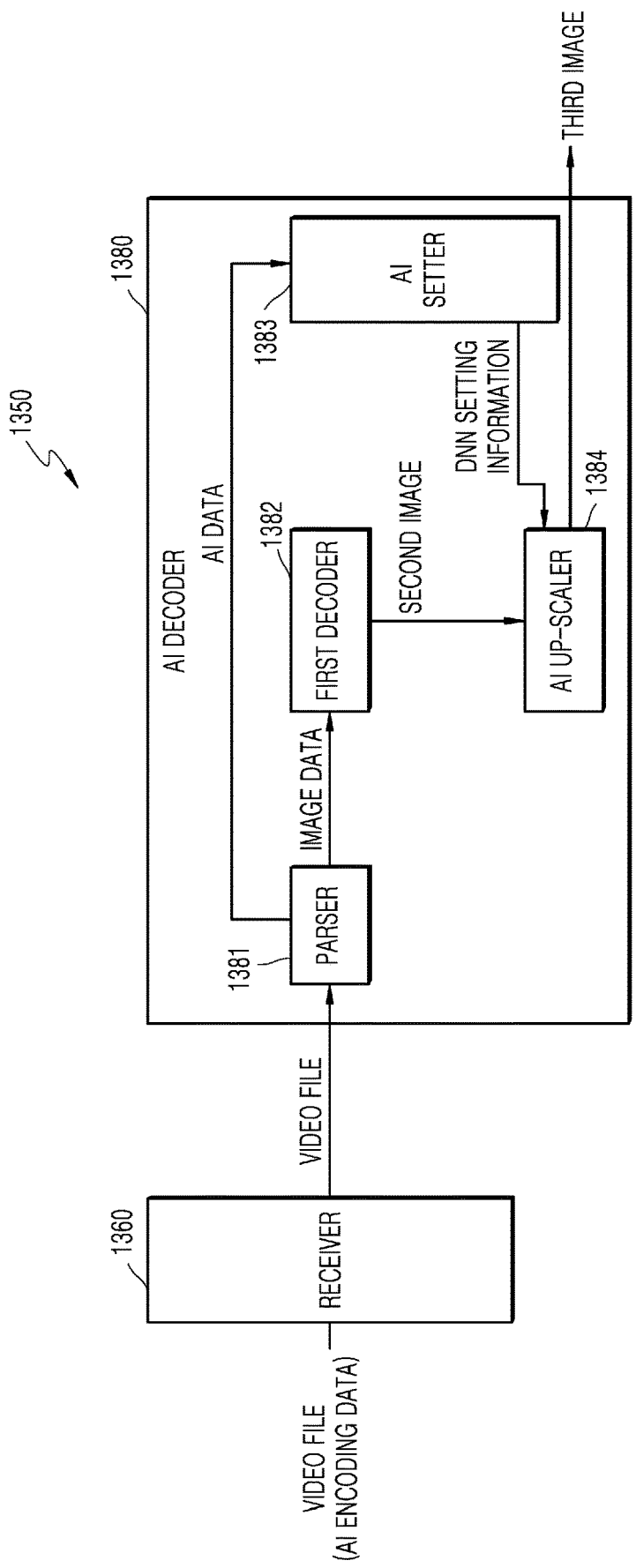
FIG. 13B is a block diagram of a configuration of an AI decoding apparatus according to another embodiment.

FIG. 13B is a block diagram of a configuration of an AI decoding apparatus 1350 according to another embodiment.

Referring to FIG. 13B, the AI decoding apparatus 1350 may have a similar configuration to the configuration of FIG. 13A except that a parser 1381 is separately included.

The parser 1381 may obtain a metadata box including AI data and a media data box including image data from a video file including AI encoding data, may transmit the image data included in the media data box to a first decoder 1382, and may transmit the AI data included in the metadata box to an AI setter 1383. Because the other operations of the AI decoding apparatus 1350 are similar to those of the AI decoding apparatus 1300, detailed descriptions thereof are not repeated below.

An AI encoding apparatus 1400 for performing AI encoding on the original image 105 will now be described with reference to FIG. 14A.

Figure 14A:
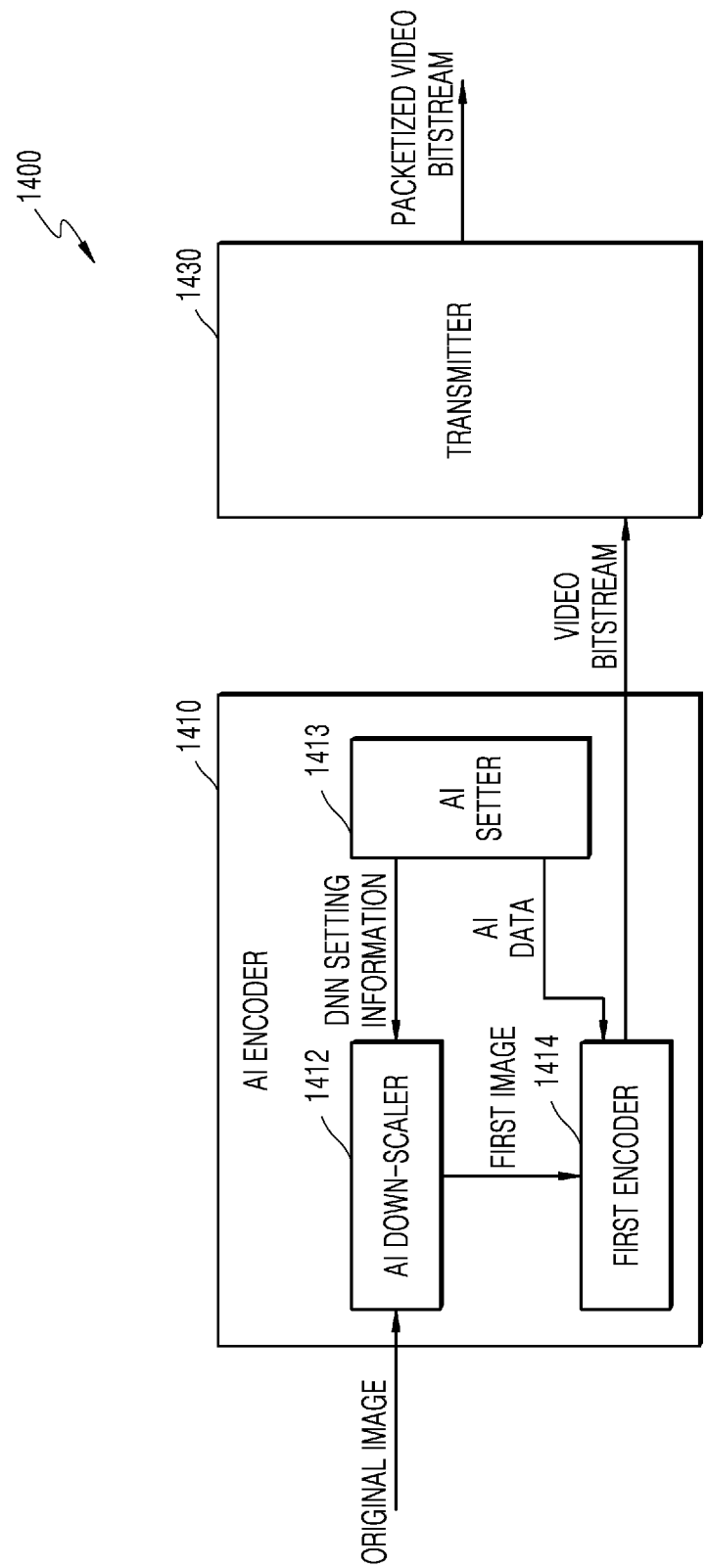
FIG. 14A is a block diagram of a configuration of an AI encoding apparatus according to an embodiment.

FIG. 14A is a block diagram of a configuration of the AI encoding apparatus 1400 according to an embodiment.

Referring to FIG. 14A, the AI encoding apparatus 1400 may include an AI encoder 1410 and a transmitter 1430. The AI encoder 1410 may include an AI down-scaler 1412, an AI setter 1413, and a first encoder 1414.

In FIG. 14A, the AI encoder 1410 and the transmitter 1430 are illustrated as separate devices, though it is understood that the AI encoder 1410 and the transmitter 1430 may be implemented through one processor. In this case, the AI encoder 1410 and the transmitter 1430 may be implemented through a dedicated processor or through a combination of software and a general-purpose processor such as an AP, a CPU, or a GPU. The dedicated processor may be implemented by including a memory for implementing an embodiment (e.g., for storing instructions executable by the processor to perform a method according to an embodiment) or by including a memory processor for using an external memory.

Also, the AI encoder 1410 and the transmitter 1430 may be configured by a plurality of processors. In this case, the AI encoder 1410 and the transmitter 1430 may be implemented through a combination of dedicated processors or through a combination of software and a plurality of general-purpose processors such as an AP, a CPU, or a GPU. Similarly, the AI down-scaler 1412 and the first encoder 1414 may be implemented through different processors. It is understood that this is just an example, and one or more other embodiments may implement the various components via any combination of one or more processors The AI encoder 1410 performs AI downscaling on the original image 105 and first encoding on the first image 115, and transmits a video bitstream including a sub-bitstream including AI data and a main bitstream including image data to the transmitter 1430.

The image data includes data obtained as a result of performing the first encoding on the first image 115. The image data may include data generated based on pixel values in the first image 115, for example, residual data that is a difference between the first image 115 and prediction data of the first image 115. Also, the image data includes information used during a first encoding process of the first image 115. For example, the image data may include mode information (e.g., prediction mode information and motion information) used to perform the first encoding on the first image 115, and quantization parameter information used to perform the first encoding on the first image 115, for example. The image data may include parameter information commonly used in at least one frame.

The AI data may include AI upscaling activation flag information and AI sub-data. The AI upscaling activation flag information may be flag information representing whether AI upscaling is performed. In other words, the AI data may include flag information representing whether an image to undergo first encoding is an AI down-scaled image.

The AI sub-data includes pieces of information enabling the AI up-scaler 1334 of the AI decoding apparatus 1300 to perform AI upscaling on the second image 135 to an upscaling target corresponding to a downscaling target of a first DNN. According to an embodiment, the AI sub-data may include difference information between the original image 105 and the first image 115. The AI sub-data may also include information related to the first image 115. The information related to the first image 115 may include information about at least one of resolution of the first image 115, a bitrate of the image data generated as the result of performing first encoding on the first image 115 or a codec type used during the first encoding of the first image 115. The AI sub-data may also include an average value of quantization parameters used in the first encoding on the first image. The AI sub-data may also include quantization parameter indicator information of at least a portion of the first image. The AI sub-data may also include genre information of the first image.

The AI data may also include resolution information of the third image 145 (or the original image 105) that is to be generated through AI upscaling. The AI data may further include additional metadata information for AI upscaling of the second image 135.

The AI setter 1413 determines whether the AI down-scaler 1412 is to perform AI downscaling on the original image 105 through the first DNN.

The AI setter 1413 may determine whether to perform AI downscaling, based on at least one of resolution of the original image 105, the type of the original image 105 (for example, the type of file), or the type of subject included in the original image 105, for example. For example, when the resolution of the original image 105 is less than certain resolution (for example, HD), the AI setter 1413 may determine that AI downscaling is not performed.

When the AI setter 1413 determines that AI downscaling is to be performed on the original image 105 through the first DNN, the AI setter 1413 may provide DNN setting information to the AI down-scaler 1412 to generate the first image 115 as a result of AI-downscaling the original image 105 through the first DNN.

The AI setter 1413 may obtain the DNN setting information by further inputting an average value of quantization parameters used in first encoding on the first image to identify the first DNN for AI downscaling of the original image 105, and may provide the DNN setting information to the AI down-scaler 1412.

The AI setter 1413 may obtain the DNN setting information by further inputting a quantization parameter indicator information of at least a portion of the first image to identify the first DNN for AI downscaling of the original image 105, and may provide the DNN setting information to the AI down-scaler 1412.

The AI setter 1413 may obtain the DNN setting information by further inputting information representing the genre of the first image 115 to identify the first DNN for AI downscaling of the original image 105, and may provide the DNN setting information to the AI down-scaler 1412.

The AI setter 1413 may obtain the DNN setting information by further inputting additional metadata information to identify the first DNN for AI downscaling of the original image 105, and may provide the DNN setting information to the AI down-scaler 1412.

The AI setter 1413 may determine the downscaling target of the original image 105, based on a pre-determined standard.

In order to generate the first image 115 matching the downscaling target, the AI setter 1413 may store a plurality of pieces of DNN setting information settable in the first DNN. The AI setter 1413 may obtain DNN setting information corresponding to the downscaling target from among the plurality of pieces of DNN setting information, and provide the obtained DNN setting information to the AI down-scaler 1412. The AI down-scaler 1412 performs AI downscaling on the original image 105 through the first DNN set with the obtained DNN setting information.

Each of the plurality of pieces of DNN setting information may be trained to generate the first image 115 of pre-determined resolution and/or pre-determined quality. For example, any one piece of DNN setting information among the plurality of pieces of DNN setting information may include pieces of information for generating the first image 115 of resolution that is half the resolution of the original image 105, for example, the first image 115 of 2K (2048×1080) that is half of 4K (4096×2160) of the original image 105, and another piece of DNN setting information may include information for obtaining the first image 115 of resolution that is a quarter of the resolution of the original image 105, for example, the first image 115 of 2K (2048×1080) that is a quarter of 8K (8192×4320) of the original image 105.

The AI down-scaler 1412 may generate the first image 115 of certain resolution and/or certain quality through the first DNN by setting the first DNN with the DNN setting information obtained to perform the AI downscaling on the original image 105. When the DNN setting information for performing the AI downscaling on the original image 105 is obtained from the plurality of pieces of DNN setting information, each layer in the first DNN may process input data based on pieces of information included in the DNN setting information.

According to an embodiment, in order to generate the first image 115 matching the downscaling target, the AI downscaler 1412 may determine the first DNN for AI-downscaling the original image 105 from among a plurality of pre-stored first DNNs, based on the DNN setting information obtained by the AI setter 1413, and may AI-downscale the original image 105 through the determined first DNN. The plurality of pre-stored first DNNs may have different layer structures or may have different pre-set parameters.

The AI setter 1413 may select the first DNN for AI-downscaling the original image 105 from among a plurality of pre-stored first DNNs, based on a pre-determined criterion (for example, a criterion determined based on at least one of a compression rate, a compression quality, compression history information, or a type of the original image 105), and may transmit DNN setting information related to the selected first DNN to the AI down-scaler 1412.

A method, performed by the AI setter 1413, of determining the downscaling target will now be described. The downscaling target may indicate, for example, by how much resolution is decreased from the original image 105 to generate the first image 115.

According to an embodiment, the AI setter 1413 may determine the downscaling target, based on at least one of a compression ratio, a compression quality, compression history information, or a type of the original image 105.

For example, the AI setter 1413 may determine the downscaling target, based on the compression ratio, the compression quality, or the like, which is pre-set or received from a user.

As another example, the AI setter 1413 may determine the downscaling target by using the compression history information stored in the AI encoding apparatus 1400. For example, according to the compression history information usable by the AI encoding apparatus 1400, an encoding quality, a compression ratio, or the like preferred or selected by the user may be determined, and the downscaling target may be determined according to the encoding quality determined based on the compression history information. For example, the resolution, quality, or the like of the first image 115 may be determined according to the encoding quality that has been used most often according to the compression history information.

As another example, the AI down-scaler 1413 may determine the downscaling target based on the encoding quality that has been used more frequently than a certain (e.g., predetermined) threshold value (for example, an average quality of the encoding quality that has been used more frequently than the certain threshold value), according to the compression history information.

As another example, the AI setter 1413 may determine the downscaling target, based on at least one of the resolution, type (for example, a file format), or the like of the original image 105.

According to an embodiment, when the original image 105 includes a plurality of frames, the AI down-scaler 1413 may independently determine a downscaling target in units of a certain number of frames, or may determine a common downscaling target for all of the plurality of frames.

According to an embodiment, the AI down-scaler 1413 may divide the frames included in the original image 105 into a certain number of groups, and independently determine the downscaling target for each group. The same or different downscaling targets may be determined for each group. The numbers of frames included in the groups may be the same or different according to each group.

According to another embodiment, the AI down-scaler 1413 may independently determine a downscaling target for each frame included in the original image 105. The same or different downscaling targets may be determined for each frame. The AI down-scaler 1432 and the AI setter 1433 may correspond to the AI down-scaler 712 and the AI setter 718.

The first encoder 1414 may correspond to the first encoder 714. The first encoder 1414 may further include the data processor 716. It is understood, however, that embodiments of are not limited thereto, and a data processor may be included separate from the first encoder 1414. The data processor may correspond to the data processor 716.

The first encoder 1414 may obtain the AI data from the AI setter 1413. The first encoder 1414 may obtain the image data by performing first encoding on the first image 115, and may transmit AI encoding data including the image data and the AI data to the transmitter 1430. The first encoder 1414 may transmit, to the transmitter 1430, the video bitstream including the sub-bitstream including the AI data and the main bitstream including the image data.

The transmitter 1430 may generate a packetized bitstream by packetizing the video stream. The video bitstream includes at least one NAL unit. In this case, respective NAL units of a parameter set commonly used in at least one frame, an I slice, a P slice, and a B slice may be sequentially arranged and received by the transmitter 1430.

The transmitter 1430 may generate the packetized video bitstream by including, in the payload of a packet, at least one NAL unit included in the video bitstream, and adding a header such as an Ethernet header, an IP header, a UDP/TCP header, and an RTP header. The transmitter 1430 and may transmit the packetized video bitstream to the outside through a network.

Figure 14B:
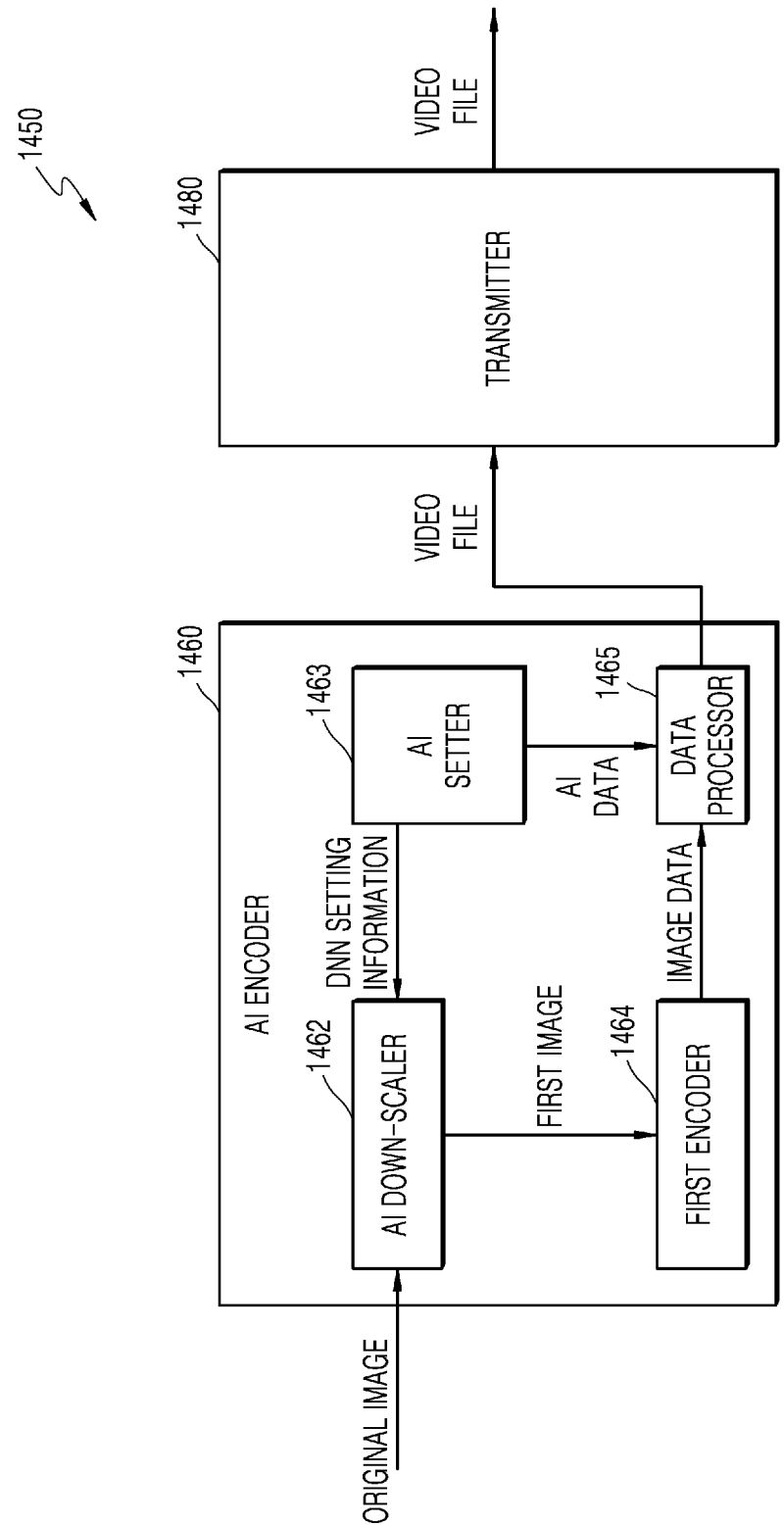
FIG. 14B is a block diagram of a configuration of an AI encoding apparatus according to another embodiment.

FIG. 14B is a block diagram of a configuration of an AI encoding apparatus 1450 according to another embodiment.

Referring to FIG. 14B, the AI encoding apparatus 1450 may have a similar configuration to the configuration of FIG. 14A except that a data processor 1465 is separately included.

The data processor 1465 may obtain AI data from an AI setter 1463. The data processor 1465 may obtain image data from a first encoder 1464. The data processor 1465 may generate a video file including the AI data and the image data. The data processor 1465 may transmit the generated video file to a transmitter 1480. A metadata box of the video file may include the AI data, and a media data box of the video file may include the image data. Because the other operations of the AI encoding apparatus 1450 are similar to those of the AI encoding apparatus 1400, detailed descriptions thereof are not repeated below.

Figure 15A:
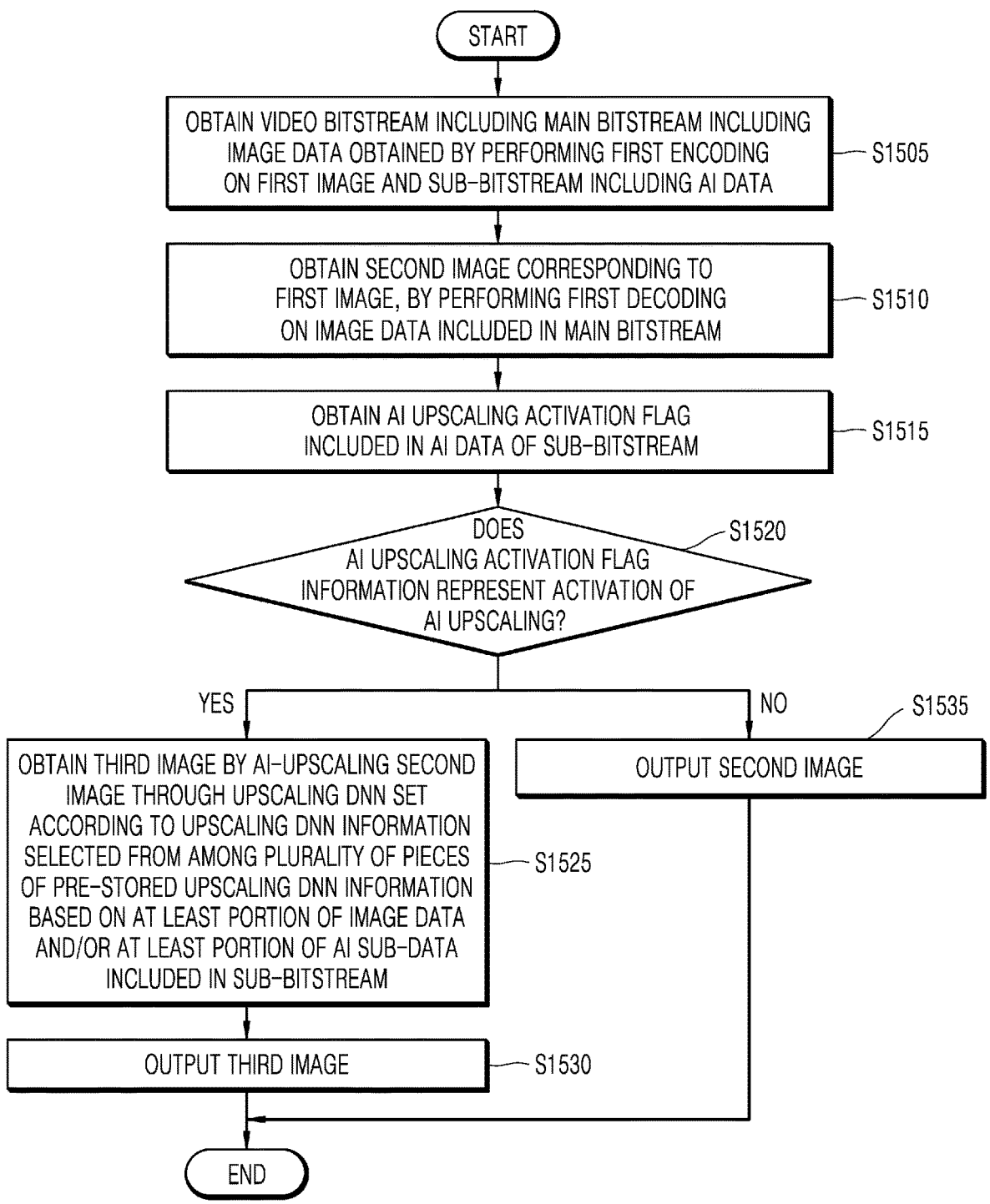
FIG. 15A is a flowchart of an AI decoding method according to an embodiment.

FIG. 15A is a flowchart of an AI decoding method according to an embodiment.

In operation S1505, the AI decoding apparatus 1300 may obtain a video bitstream including a main bitstream including image data obtained by performing first encoding on a first image and a sub-bitstream including AI data.

The main bitstream may be included in a predetermined main bitstream region within a video bitstream defined for image encoding information in a predetermined codec, and the sub-bitstream may be included in a predetermined sub-bitstream region within a video bitstream defined for supplemental data in the predetermined codec. The sub-bitstream may be a supplemental enhancement information (SEI) message of an MPEG video codec. The SEI message may be an SEI message including user data registered by a predetermined standard or including unregistered user data that is identified by a Universally Unique Identifier (UUID). When the predetermined codec is an AV1 codec, a VP9 codec, or the like, the sub-bitstream may be a metadata open bitstream unit (OBU). The metadata OBU may include the user data registered by the predetermined standard.

The AI sub-data included in the sub-bitstream may include at least one of image genre information representing the genre of an image, average quantization parameter information representing an average quantization value of the first image, quantization parameter indicator information representing a quantization degree of at least a portion of the first image, image resolution information representing resolution of at least one of an original image or the first image, image ratio information representing a ratio between the original image and the first image, codec information representing a codec used during encoding of the first image, metadata flag information representing whether AI-upscaling related additional data is included, or AI-upscaling related additional metadata information. The quantization parameter indicator information may be index information representing one of a plurality of pre-determined quantization parameter groups.

The quantization parameter indicator information may be index information representing a quantization parameter group including a representative value of the quantization parameter of at least one of a sub-group within a frame, the frame, a frame group, or a video sequence.

The video sequence is a data unit including all consecutive frames of the image data. The frame group is a data unit composed of one or more consecutive frames that share parameter information of a frame group parameter set. The frame group may be a GOP or a CVS. The frame group includes an IDR frame or an IRAP frame encoded without reference to other frames. All the remaining frames in the frame group are encoded with reference to the IDR frame (or IRAP frame). Each frame represents one still image included in a video. The sub-group within a frame is a data unit composed of at least one bock included in the frame.

In operation S1510, the AI decoding apparatus 1300 may obtain a second image corresponding to the first image, by performing first decoding on the image data included in the main bitstream.

In operation S1515, the AI decoding apparatus 1300 may obtain an AI upscaling activation flag included in the AI data of the sub-bitstream.

In operation S1520, the AI decoding apparatus 1300 may determine whether AI upscaling activation flag information represents activation of AI upscaling.

In operation S1525, when the AI upscaling activation flag information represents activation of AI upscaling, the AI decoding apparatus 1300 may obtain a third image by performing AI upscaling, through an upscaling DNN set according to upscaling DNN information selected from among a plurality of pieces of pre-stored upscaling DNN information based on at least a portion of the image data and/or at least a portion of AI sub-data included in the sub-bitstream.

The AI decoding apparatus 1300 may set the upscaling DNN according to the upscaling DNN information selected from among the plurality of pieces of pre-stored upscaling DNN information based on at least one of quantization parameter information obtained from the image data of the main bitstream and/or the image genre information, the average quantization parameter information, the quantization parameter indicator information, the image resolution information, the image ratio information, or the AI-upscaling related additional metadata information included in the AI sub-data.

The AI decoding apparatus 1300 may set the upscaling DNN according to upscaling DNN information corresponding to a quantization group indicated by the index information of the quantization parameter indicator information from among the plurality of pieces of upscaling DNN information.

In operation S1530, the AI decoding apparatus 1300 may output the third image.

In operation S1535, when (or based on) the AI upscaling activation flag information represents that AI upscaling is not activated, the AI decoding apparatus 1300 may output the second image.

Figure 15B:
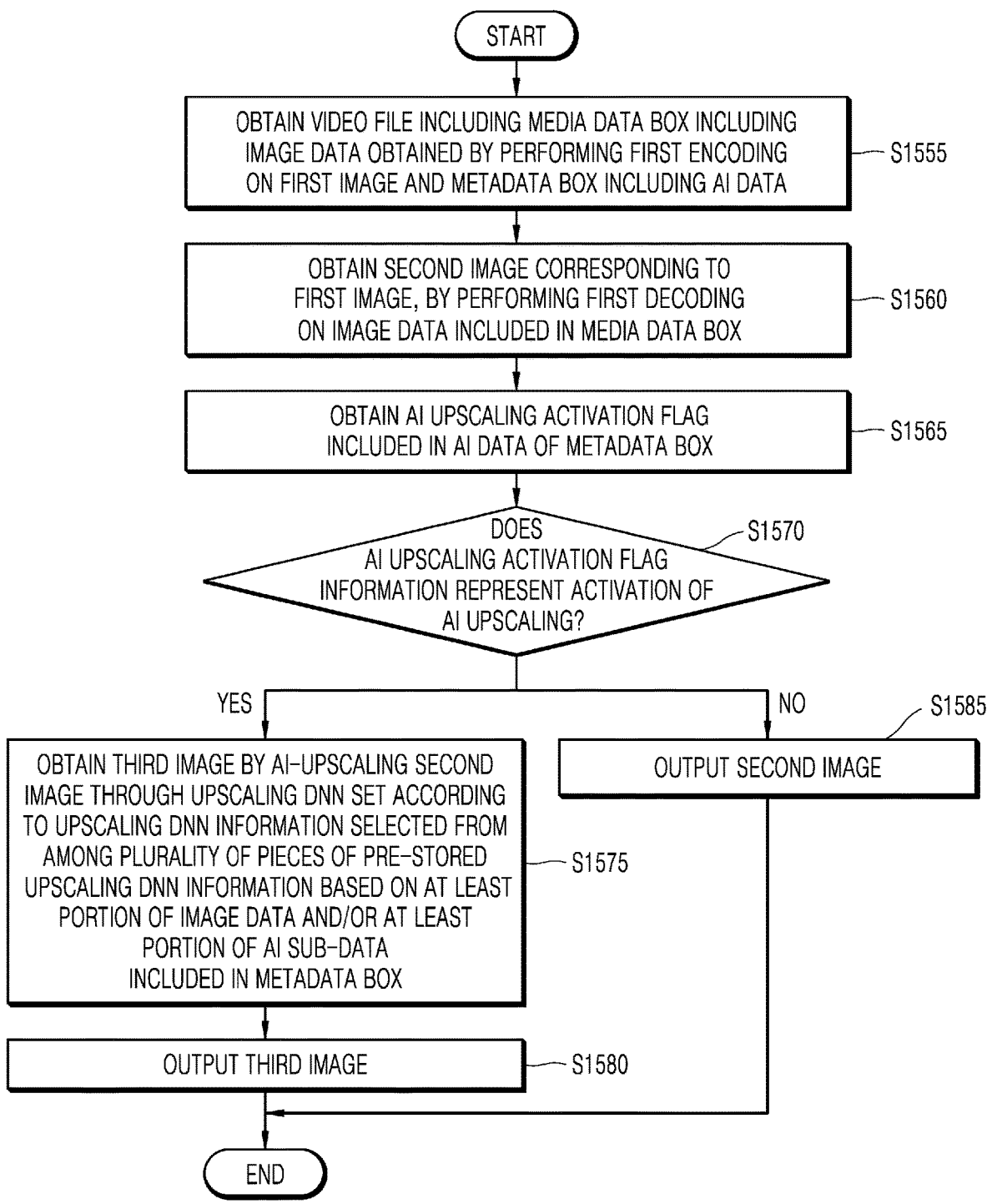
FIG. 15B is a flowchart of an AI decoding method according to another embodiment.

FIG. 15B is a flowchart of an AI decoding method according to another embodiment.

In operation S1555, the AI decoding apparatus 1350 may obtain a video file including a media data box including image data obtained by performing first encoding on a first image and a metadata box including AI data.

In operation S1560, the AI decoding apparatus 1350 may obtain a second image corresponding to the first image, by performing first decoding on the image data included in the media data box.

In operation S1565, the AI decoding apparatus 1350 may obtain an AI upscaling activation flag included in the AI data of the metadata box.

In operation S1570, the AI decoding apparatus 1350 may determine whether AI upscaling activation flag information represents activation of AI upscaling.

In operation S1575, when the AI upscaling activation flag information represents activation of AI upscaling, the AI decoding apparatus 1350 may obtain an AI-upscaled third image through an upscaling DNN set according to upscaling DNN information selected from among a plurality of pieces of pre-stored upscaling DNN information based on at least a portion of the image data and/or at least a portion of AI sub-data included in the metadata box.

In operation S1580, when the AI upscaling activation flag information represents that AI upscaling is not activated, the AI decoding apparatus 1350 may output the second image.

Figure 16A:
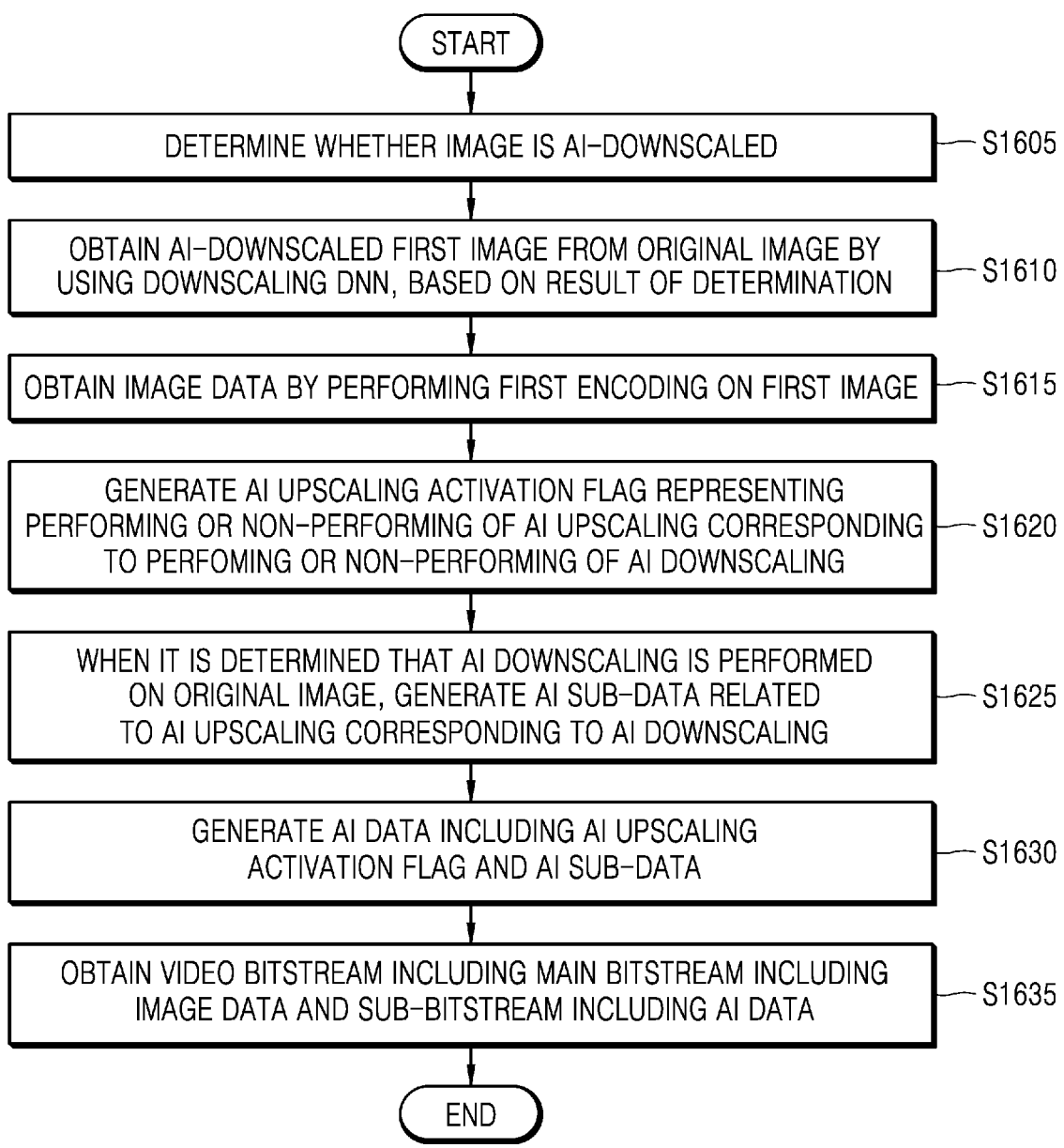
FIG. 16A is a flowchart of an AI encoding method according to an embodiment.

FIG. 16A is a flowchart of an AI encoding method according to an embodiment.

In operation S1605, the AI encoding apparatus 1400 may determine whether an image is AI-downscaled.

In operation S1610, the AI encoding apparatus 1400 may obtain an AI-downscaled first image from an original image by using a downscaling DNN, based on a result of the determination.

The AI encoding apparatus 1400 may set the downscaling DNN according to downscaling DNN information selected from among a plurality of pieces of downscaling DNN information based on at least one of quantization parameter information obtained from the image data of the main bitstream and/or the image genre information, the average quantization parameter information, the quantization parameter indicator information, the image resolution information, the image ratio information, or the AI-upscaling related additional metadata information included in the AI sub-data.

The AI encoding apparatus 1400 may set the downscaling DNN according to downscaling DNN information corresponding to a quantization group indicated by the index information of the quantization parameter indicator information from among the plurality of pieces of downscaling DNN information.

In operation S1615, the AI encoding apparatus 1400 may obtain image data by encoding the first image.

In operation S1620, the AI encoding apparatus 1400 may generate an AI upscaling activation flag representing performing or non-performing of AI upscaling corresponding to performing or non-performing of AI downscaling.

In operation S1625, when it is determined (or based on determining) that AI downscaling is performed on the original image, the AI encoding apparatus 1400 may generate AI sub-data related to AI upscaling corresponding to AI downscaling.

In operation S1630, the AI encoding apparatus 1400 may generate AI data including the AI upscaling activation flag and the AI sub-data.

In operation S1635, the AI encoding apparatus 1400 may obtain a video bitstream including the main bitstream including image data and a sub-bitstream including the AI data. The main bitstream may be included in a predetermined main bitstream region within a video bitstream defined for image encoding information in a predetermined codec, and the sub-bitstream may be included in a predetermined sub-bitstream region within a video bitstream defined for supplemental data in the predetermined codec. The sub-bitstream may be an SEI message of an MPEG video codec. The SEI message may be an SEI message including user data registered by a predetermined standard or including unregistered user data that is identified by a UUID. When the predetermined codec is an AV1 codec, a VP9 codec, or the like, the sub-bitstream may be a metadata OBU. The metadata OBU may include the user data registered by the predetermined standard.

The AI sub-data included in the sub-bitstream may include at least one of image genre information representing the genre of an image, average quantization parameter information representing an average quantization value of the first image, quantization parameter indicator information representing a quantization degree of at least a portion of the first image, image resolution information representing resolution of at least one of an original image and the first image, image ratio information representing a ratio between the original image and the first image, codec information representing a codec used during encoding of the first image, metadata flag information representing whether AI-upscaling related additional data is included, or AI-upscaling related additional metadata information. The quantization parameter indicator information may be index information representing one of a plurality of pre-determined quantization parameter groups.

The quantization parameter indicator information may be index information representing a quantization parameter group including a representative value of the quantization parameter of at least one of a sub-group within a frame, the frame, a frame group, or a video sequence.

Figure 16B:
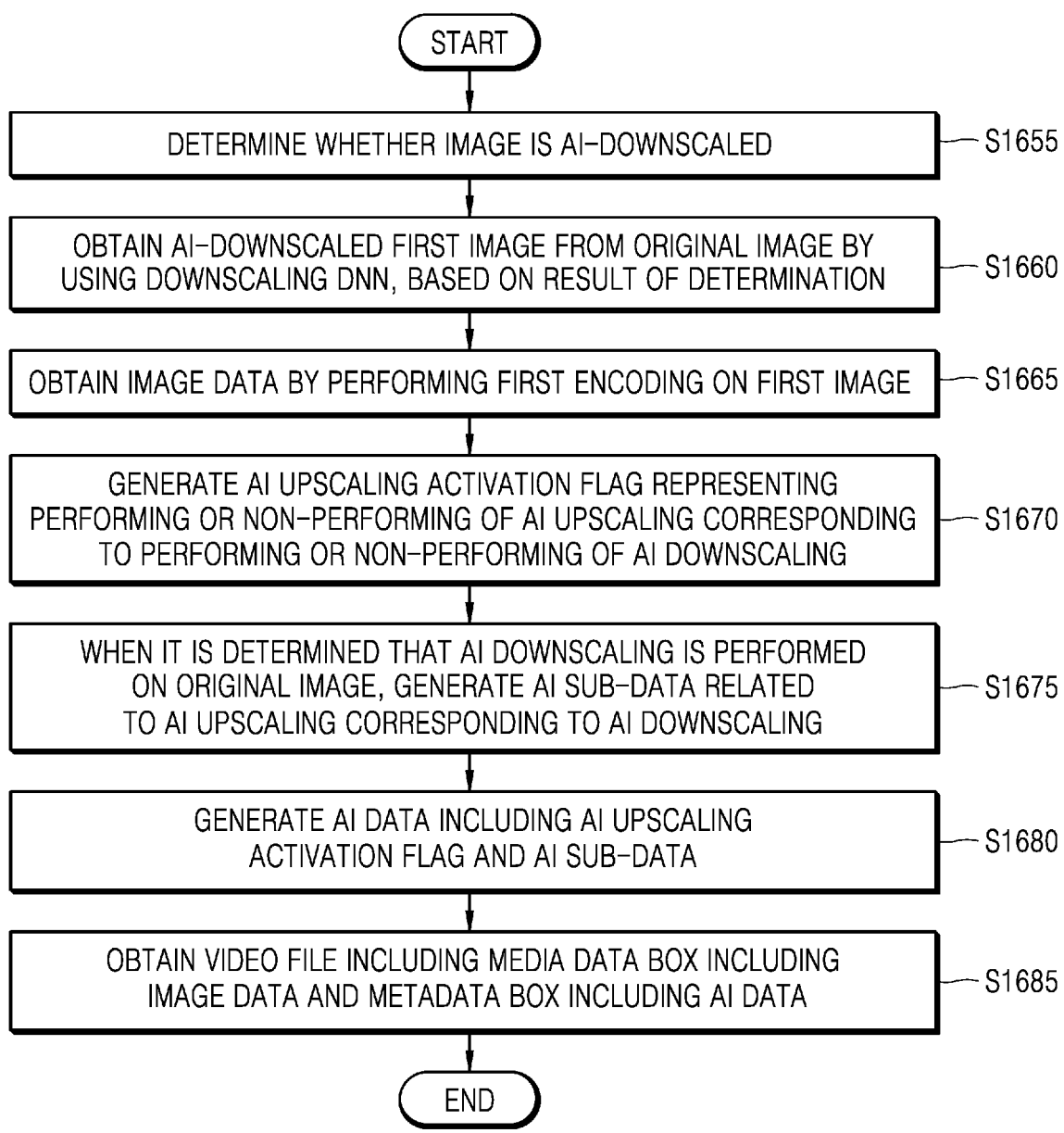
FIG. 16B is a flowchart of an AI encoding method according to another embodiment.

FIG. 16B is a flowchart of an AI encoding method according to another embodiment.

In operation S1655, the AI encoding apparatus 1450 may determine whether an image is AI-downscaled.

In operation S1660, the AI encoding apparatus 1450 may obtain an AI-downscaled first image from an original image by using a downscaling DNN, based on a result of the determination.

In operation S1665, the AI encoding apparatus 1450 may obtain image data by encoding the first image.

In operation S1670, the AI encoding apparatus 1450 may generate an AI upscaling activation flag representing performing or non-performing of AI upscaling corresponding to performing or non-performing of AI downscaling.

In operation S1675, when it is determined (or based on determining) that AI downscaling is performed on the original image, the AI encoding apparatus 1450 may generate AI sub-data related to AI upscaling corresponding to AI downscaling.

In operation S1680, the AI encoding apparatus 1450 may generate AI data including the AI upscaling activation flag and the AI sub-data.

In operation S1685, the AI encoding apparatus 1450 may generate a video bitstream including a media data box including the image data and a metadata box including the AI data.

Figure 17:
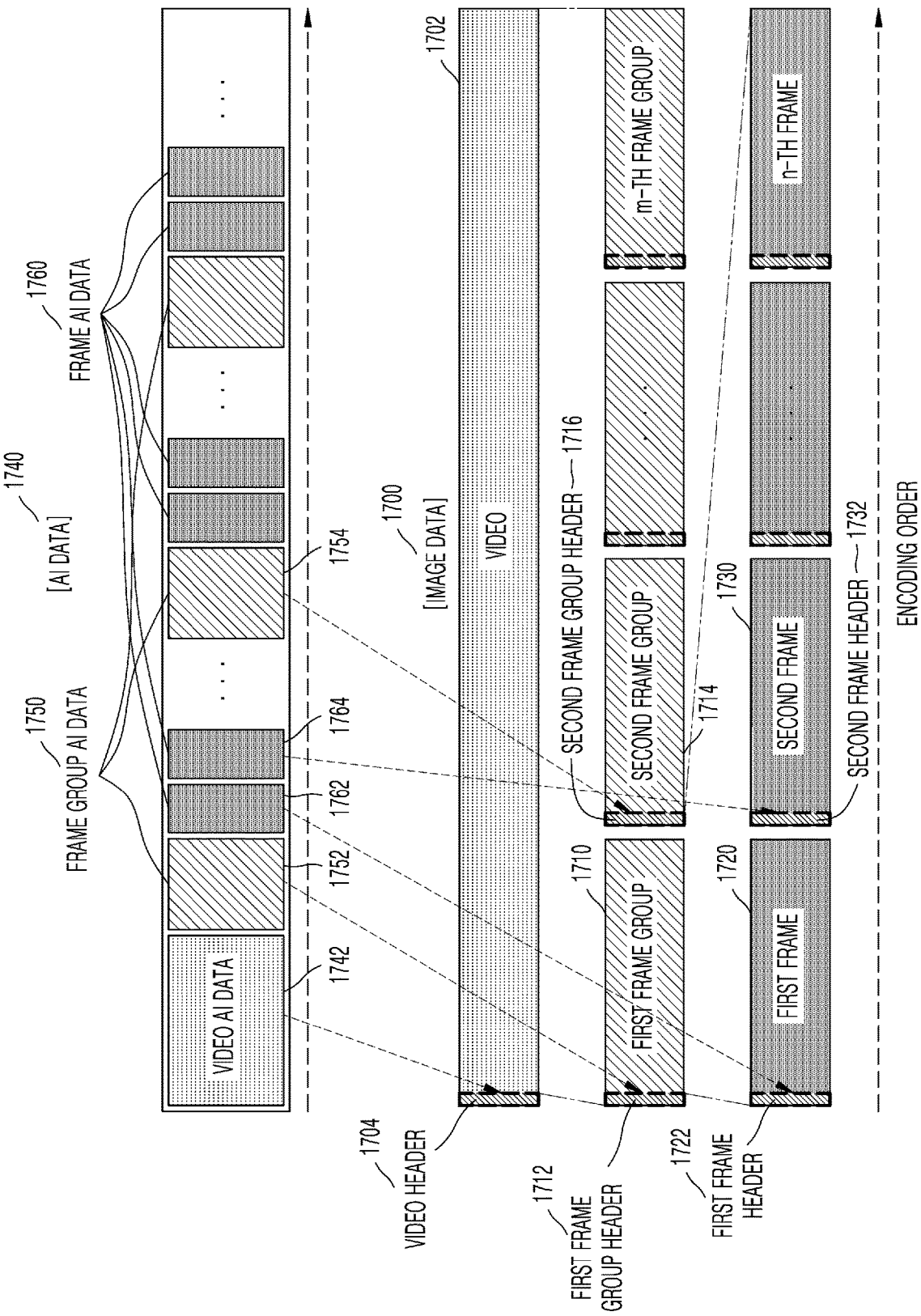
FIG. 17 illustrates structures of image data and AI data together with a corresponding relationship between the image data and the AI data according to an embodiment.

FIG. 17 illustrates structures of image data 1700 and AI data 1740 together with a corresponding relationship between the image data 1700 and the AI data 1740.

A video-frame group-frame hierarchical structure of image data 1700 is described with reference to FIG. 17. A video 1702 of FIG. 17 is a data unit including all consecutive frames of the image data 1700. Parameter information of a video parameter set may be applied to all frames included in the video 1702. The video parameter set is included in a video header 1704.

The video 1702 may include a plurality of frame groups. A frame group is a data unit composed of one or more consecutive frames that share parameter information of a frame group parameter set. The frame group may be a Group of Pictures (GOP) or a Coded Video Sequence (CVS). The frame group parameter set may be included in a frame group header. For example, a frame group parameter set of a first frame group 1710 may be included in a first frame group header 1712. A frame group parameter set of a second frame group 1714 may be included in a second frame group header 1716.

Each frame group is independently encoded without reference to other frame groups. Each frame group includes an instantaneous decoding refresh (IDR) frame or an intra random access point (IRAP) frame encoded without reference to other frames. All the remaining frames in the frame group are encoded with reference to the IDR frame (or IRAP frame). Thus, the first frame group 1710 is independently encoded without reference to other frame groups in the video 1702. A first frame 1720, which is a first encoded frame in the first frame group 1710, is an IDR frame (or IRAP frame). All the remaining frames in the first frame group 1710 including a second frame 1730 are encoded with reference to the first frame 1720.

Each frame represents one still image included in a video. A frame header of a frame may include a frame parameter set including parameter information applied to the frame. For example, a first frame header 1722 of the first frame 1720 may include a frame parameter set applied to the first frame 1720. Similarly, a second frame header 1732 of the second frame 1730 may include a frame parameter set applied to the second frame 1730.

A method of classifying AI data 1740 according to the above-described video-frame group-frame hierarchical structure is described with reference to FIG. 17. The AI data 1740 may be classified into video AI data 1742, frame group AI data 1750, and frame AI data 1760 according to the type of a data unit to which the AI data 1740 is applied. The video AI data 1742 refers to AI data applied commonly to all of the frame groups included in a video. The frame group AI data 1750 refers to AI data applied commonly to the frames included in a current frame group. The frame AI data 1760 refers to AI data applied to a current frame.

The video AI data 1742 corresponds to the video header 1704. Thus, the video AI data 1742 may be decoded in parallel with the video header 1704. Alternatively, the video AI data 1742 may be decoded immediately before decoding of the video header 1704, or the video AI data 1742 may be decoded immediately after decoding of the video header 1704.

The frame group AI data 1750 corresponds to a frame group header. Referring to FIG. 17, first frame group AI data 1752 corresponds to the first frame group header 1712. Second frame group AI data 1754 corresponds to the second frame group header 1716. The first frame group AI data 1752 and the second frame group AI data 1754 may be respectively decoded in parallel with the first and second frame group headers 1712 and 1716. Alternatively, the first frame group AI data 1752 and the second frame group AI data 1754 may be respectively decoded immediately before decoding of the first and second frame group headers 1712 and 1716, or the first frame group AI data 1752 and the second frame group AI data 1754 may be respectively decoded immediately after decoding of the first and second frame group headers 1712 and 1716.

The frame AI data 1760 corresponds to a frame header. Referring to FIG. 17, first frame AI data 1762 corresponds to the first frame header 1722. Second frame AI data 1764 corresponds to the second frame header 1732. The first frame AI data 1762 and the second frame AI data 1764 may be respectively decoded in parallel with the first and second frame headers 1722 and 1732. Alternatively, the first frame AI data 1762 and the second frame AI data 1764 may be respectively decoded immediately before decoding of the first and second frame headers 1722 and 1732, or the first frame AI data 1762 and the second frame AI data 1764 may be respectively decoded immediately after decoding of the first and second frame headers 1722 and 1732.

According to an embodiment, the data processor 716 of FIG. 7 may generate AI encoding data in the form of a single file including both the image data 1700 and the AI data 1740. Hereinbelow, a file refers to a collection of data stored in a memory. A video file is a collection of image data stored in the memory and the image data may be implemented in the form of a bitstream.

According to an embodiment, the AI data 1740 may not be embedded in the image data 1700 but be separated from the image data 1700 within the single file. Thus, because the AI encoding data is configured as a single file but the AI data 1740 is separated from the image data 1700, the AI data 1740 and/or the image data 1700 may contain information about synchronization of the AI data 1740 and the image data 1700. However, embodiments are not limited thereto.

Figure 18:
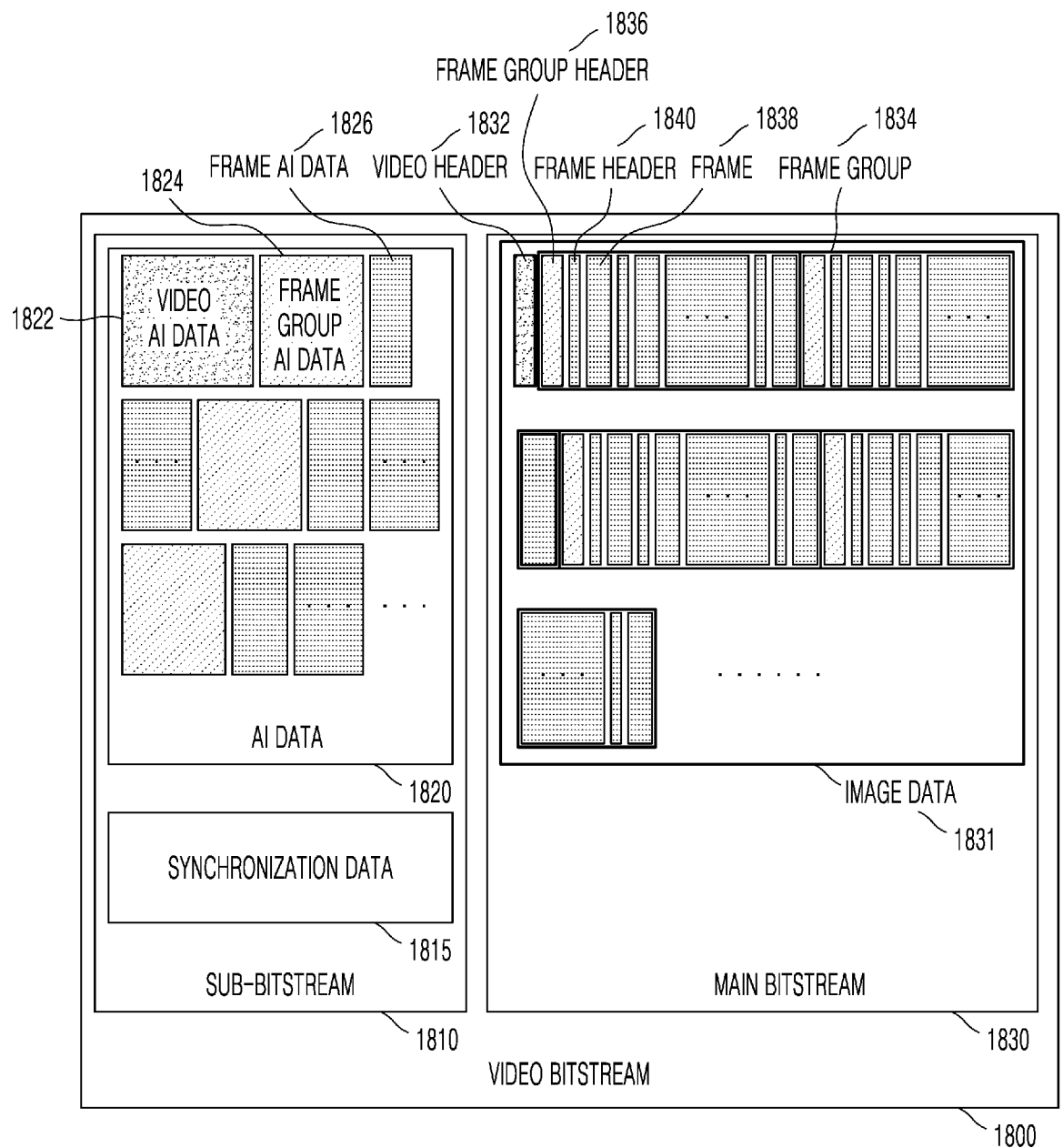
FIG. 18 illustrates a video bitstream including AI data and image data, according to an embodiment.

FIG. 18 illustrates a video bitstream 1800 including AI data 1820 and image data 1831, according to an embodiment.

The video bitstream 1800 is composed of a sub-bitstream 1810 and a main bitstream 1830. The sub-bitstream 1810 includes supplemental information about the image data 1831 included in the main bitstream 1830.

The sub-bitstream 1810 may include synchronization data 1815 and the AI data 1820.

The first decoder 1332 may extract the synchronization data 1815 and the AI data 1820 from the sub-bitstream 1810. The first decoder 1332 may also extract the image data 1831 from the main bitstream 1830. The first decoder 1332 may transmit the synchronization data 1815 to the AI up-scaler 1334 or transmit the synchronization data 1815 to the AI up-scaler 1334 through the AI setter 1333, and the AI up-scaler 1334 may synchronize the image data 1831 with the AI data 1820 according to the synchronization data 1815.

The AI data 1820 may include video AI data 1822, frame group AI data 1824, and frame AI data 1826. The video AI data 1822 is set to correspond to a video header 1832, the frame group AI data 1824 is set to correspond to a frame group header 1836, and the frame AI data 1826 is set to correspond to a frame header 1840.

According to an embodiment, when the same upscaling DNN information is used in all frames of a video, the frame group AI data 1824 and the frame AI data 1826 in the AI data 1820 may be omitted. Alternatively, when upscaling DNN information is adaptively obtained for each frame group and the same upscaling DNN information is used in all frames of each frame group, the frame AI data 1826 in the AI data 1820 may be omitted.

The synchronization data 1815 includes information about synchronization of the video AI data 1822, the frame group AI data 1824, and the frame AI data 1826 with the video header 1832, the frame group header 1836, and the frame header 1840. For example, the synchronization data 1815 may include reproduction sequence information or decoding sequence information of the image data 1831 of the main bitstream 1830. Accordingly, the AI setter 1333 may obtain upscaling DNN information used for AI-upscaling a low-resolution image, from AI data determined according to the reproduction sequence information or decoding sequence information of the synchronization data 1815.

For example, to AI-upscale a low-resolution image of a frame 1838, the AI setter 1333 may determine the frame group AI data 1824 corresponding to the frame group 1834 and the frame AI data 1826 corresponding to the frame 1838, based on the synchronization data 1815. In consideration of the video AI data 1822 applied to all frames, together with the frame group AI data 1824 and the frame AI data 1826, the AI setter 1333 may obtain the upscaling DNN information for AI-upscaling the low-resolution image of the frame 1838.

The AI data 1820 of the sub-bitstream 1810 may be decoded before the image data 1831 of the main bitstream 1830. Accordingly, the AI setter 1333 may obtain the upscaling DNN information before decoding of the image data 1831, according to the AI data 1820. The upscaling DNN information may be applied to the entire video.

Alternatively, different pieces of upscaling DNN information may be obtained for different frame groups in order to achieve adaptive AI upscaling on each frame group, or different pieces of upscaling DNN information may be previously obtained for different frames in order to achieve adaptive AI upscaling on each frame.

The AI setter 1333 may decode the AI data 1820 of the sub-bitstream 1810 according to a decoding order of the image data 1831 of the main bitstream 1830.

Alternatively, the video AI data 1822 may be decoded immediately before or after decoding of the video header 1832, or the video AI data 1822 may be decoded in parallel with the video header 1832. The video AI data 1822 may be decoded according to a decoding order of the video header 1832 by referring to the synchronization data 1815.

Similarly, the AI setter 1333 may decode the frame group AI data 1824 immediately before or after decoding of the frame group header 1836 by the first decoder 1332. Alternatively, the AI setter 1333 may decode the frame group AI data 1824 in parallel with the decoding of the frame group header 1836 by the first decoder 1332. The frame group AI data 1824 may be decoded according to a decoding order of the frame group header 1836 by referring to the synchronization data 1815.

The AI setter 1333 may decode the frame AI data 1826 immediately before or after decoding of the frame header 1840 by the first decoder 1332. Alternatively, the AI setter 1333 may decode the frame AI data 1826 in parallel with the decoding of the frame header 1840 by the first decoder 1332. The frame AI data 1826 may be decoded according to a decoding order of the frame header 1840 by referring to the synchronization data 1815.

Figure 19:
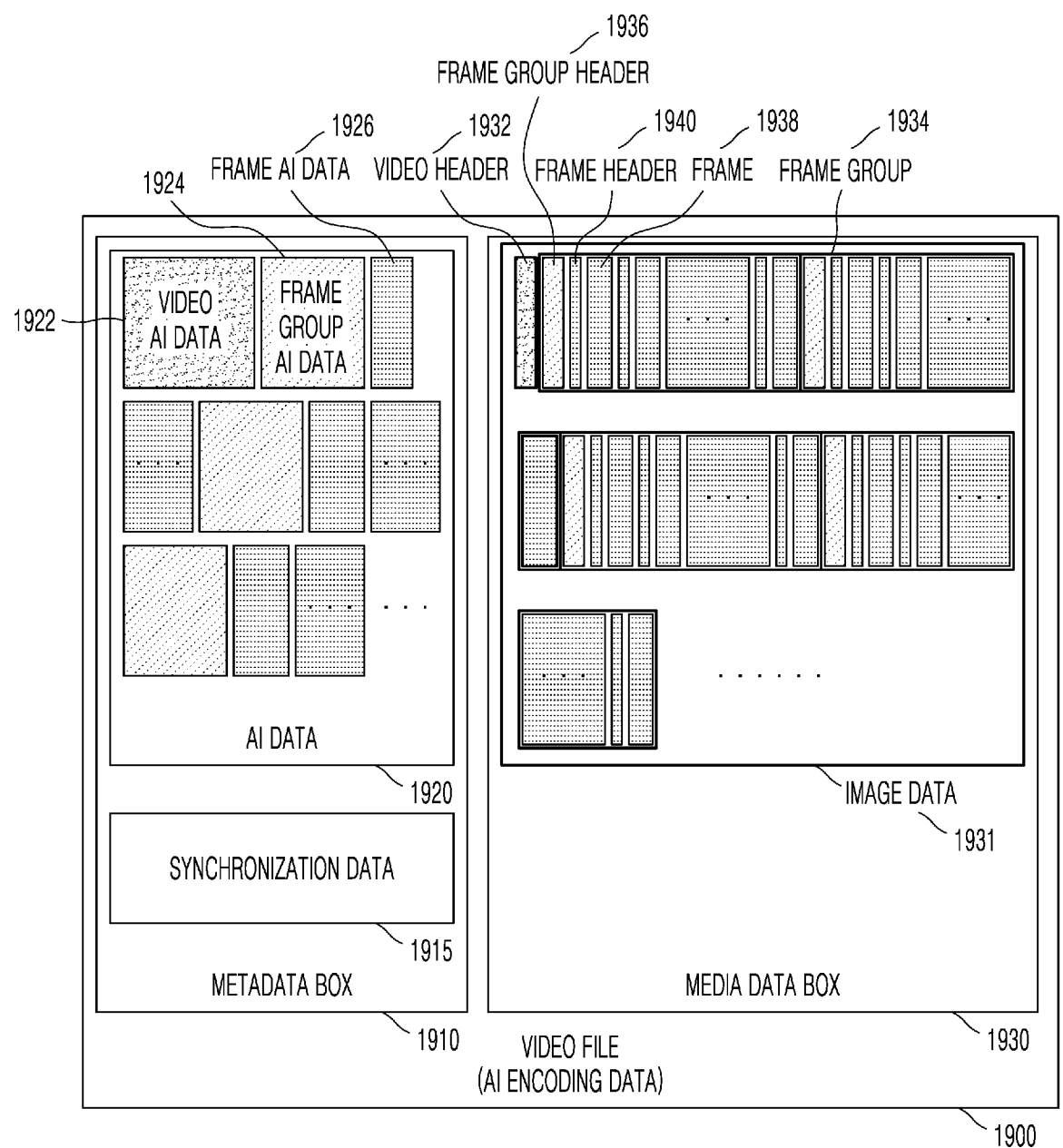
FIG. 19 illustrates AI encoding data when AI data is separated from image data within a single file, according to an embodiment.

FIG. 19 illustrates AI encoding data when AI data 1920 is separated from image data 1931 within a single file, according to an embodiment. Referring to FIG. 19, the AI encoding data is included in a video file 1900 in a certain container format. The certain container format may be MP4, Audio Video Interlaced (AVI), Matroska (MKV), Flash Video (FLV), or the like.

The video file 1900 is composed of a metadata box 1910 and a media data box 1930. The metadata box 1910 includes information about media data included in the media data box 1930. For example, the metadata box 1910 may include pieces of information about a type of media data, a type of a codec used to encode the media data, and a playback time for a media.

The metadata box 1910 may include synchronization data 1915 and the AI data 1920. The synchronization data 1915 and the AI data 1920 may be encoded according to an encoding method provided in the certain container format and may be stored in the metadata box 1910.

The parser 1381 may extract the synchronization data 1915 and the AI data 1920 from the metadata box 1910. The parser 1381 may also extract the image data 1931 from the media data box 1930. The parser 1381 may transmit the image data 1931 to the first decoder 1332 and the AI data 1920 to the AI setter 1333, according to the synchronization data 1915. Alternatively, the parser 1381 may transmit the synchronization data 1915 directly to the AI up-scaler 1334 or to the AI up-scaler 1334 through the AI setter 1333, and the AI up-scaler 1334 may synchronize the image data 1931 with the AI data 1920 according to the synchronization data 1915.

The AI data 1920 may include video AI data 1922, frame group AI data 1924, and frame AI data 1926. The video AI data 1922 is set to correspond to a video header 1932, the frame group AI data 1924 is set to correspond to a frame group header 1936, and the frame AI data 1926 is set to correspond to a frame header 1940.

According to an embodiment, when the same upscaling DNN information is used in all frames of a video, the frame group AI data 1924 and the frame AI data 1926 in the AI data 1920 may be omitted. Alternatively, when upscaling DNN information is adaptively obtained for each frame group and the same upscaling DNN information is used in all frames of each frame group, the frame AI data 1926 in the AI data 1920 may be omitted.

The synchronization data 1915 includes information about synchronization of the video AI data 1922, the frame group AI data 1924, and the frame AI data 1926 with the video header 1932, the frame group header 1936, and the frame header 1940. For example, the synchronization data 1915 may include reproduction sequence information or decoding sequence information of the image data 1931 of the media data box 1930. Accordingly, the AI setter 1333 may obtain upscaling DNN information used for AI-upscaling a low-resolution image, from AI data determined according to the reproduction sequence information or decoding sequence information of the synchronization data 1915, and may transmit the obtained upscaling DNN information to the AI up-scaler 1334.

For example, to AI-upscale a low-resolution image of a frame 1938, the parser 1381 or the AI setter 1383 may determine the frame group AI data 1924 corresponding to the frame group 1934 and the frame AI data 1926 corresponding to the frame 1938, based on the synchronization data 1915. In consideration of the video AI data 1922 applied to all frames, together with the frame group AI data 1924 and the frame AI data 1926, the AI setter 1383 may obtain the upscaling DNN information for AI-upscaling the low-resolution image of the frame 1938.

The AI data 1920 in the metadata box 1910 may be decoded before the image data 1931 in the media data box 1930. Accordingly, the AI setter 1383 may obtain the upscaling DNN information before decoding of the image data 1931, according to the AI data 1920. The upscaling DNN information may be applied to the entire video. Alternatively, different pieces of upscaling DNN information may be obtained for different frame groups in order to achieve adaptive AI upscaling on each frame group, or different pieces of upscaling DNN information may be previously obtained for different frames in order to achieve adaptive AI upscaling on each frame.

The AI setter 1383 may decode the AI data 1920 of the meta data box 1910 according to a decoding order of the image data 1931 of the media data box 1930. Alternatively, the video AI data 1922 may be decoded immediately before or after decoding of the video header 1932, or the video AI data 1922 may be decoded in parallel with the video header 1932. The video AI data 1922 may be decoded according to a decoding order of the video header 1932 by referring to the synchronization data 1915.

Similarly, the AI setter 1383 may decode the frame group AI data 1924 immediately before or after decoding of the frame group header 1936 by the first decoder 1382. Alternatively, the AI setter 1383 may decode the frame group AI data 1924 in parallel with the decoding of the frame group header 1936 by the first decoder 1382. The frame group AI data 1924 may be decoded according to a decoding order of the frame group header 1936 by referring to the synchronization data 1915.

The AI setter 1383 may decode the frame AI data 1926 immediately before or after decoding of the frame header 1940 by the first decoder 1382. Alternatively, the AI setter 1383 may decode the frame AI data 1926 in parallel with the decoding of the frame group header 1940 by the first decoder 1382. The frame AI data 1926 may be decoded according to a decoding order of the frame header 1940 by referring to the synchronization data 1915.

In FIG. 19, for convenience of explanation, the video file 1900 includes the single metadata box 1910 and the single media data box 1930. However, the video file 1900 may include two or more metadata boxes and two or more media data boxes. Accordingly, two or more image data segments into which image data is split in units of a certain time may be stored in the two or more media data boxes. Information about the two or more image data segments stored in the two or more media data boxes may be included in the two or more metadata boxes. Each of the two or more metadata boxes may include AI data.

Figure 20A:
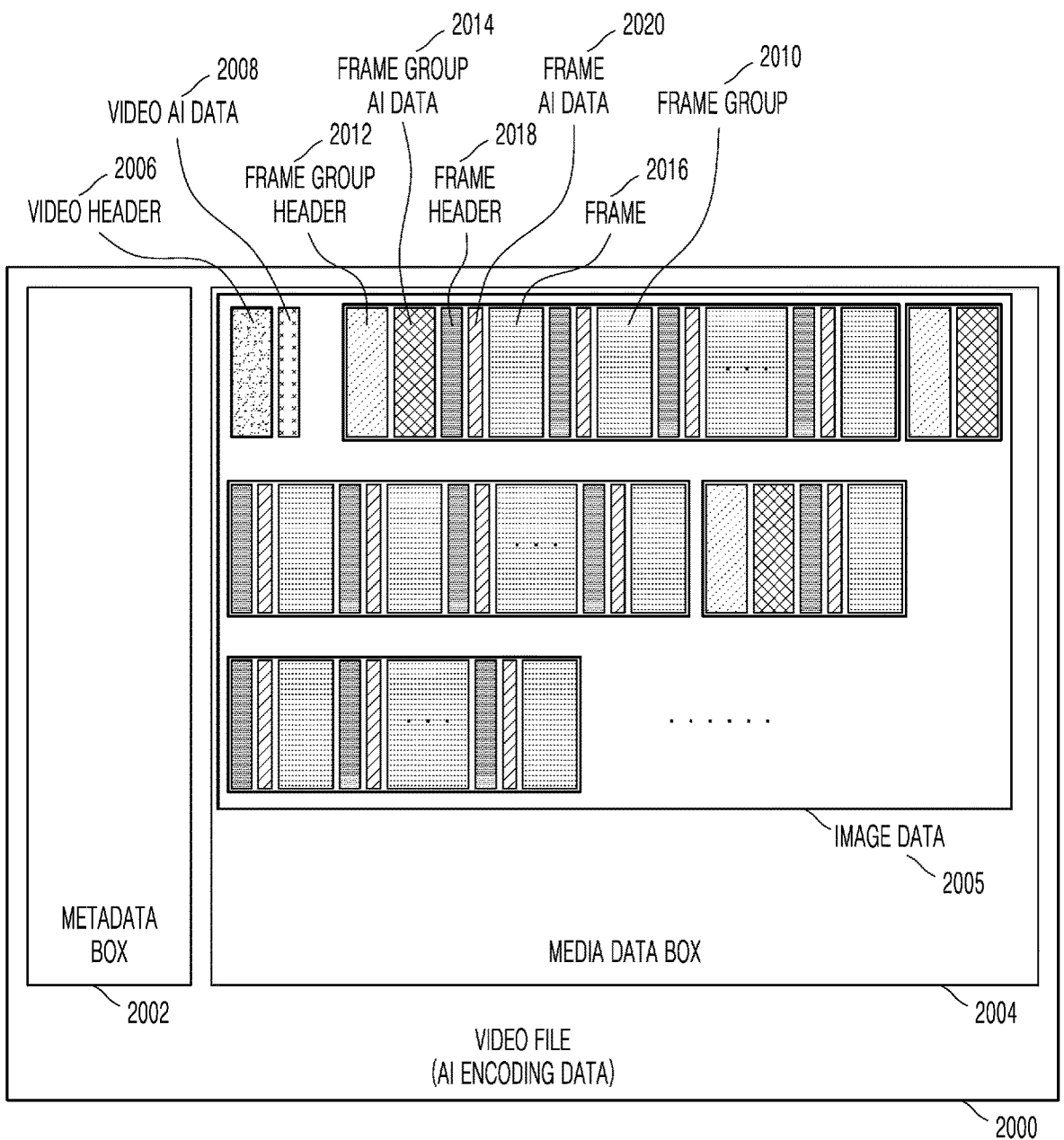
FIG. 20A illustrates AI encoding data when AI data is embedded in image data, according to an embodiment.

FIG. 20A illustrates AI encoding data when AI data is embedded in image data 2005, according to an embodiment.

Similar to the video file 1900 of FIG. 19, the video file 2000 includes a metadata box 2002 and a media data box 2004. Because AI data is embedded in image data, the metadata box 2002 includes no AI data. Instead, the image data in which the AI data is embedded is included in the media data box 2004. AI data may be encoded according to a video codec of the image data. For example, the video codec of the image data may be in accordance with H.264, HEVC, AVS2.0, Xvid, or the like.

Accordingly, the parser 232 extracts no AI data from the metadata box 2002. Instead, the first decoder 234 may extract AI data from the image data 2005 and may transmit the extracted AI data to the AI setter 238. Based on upscaling DNN information obtained by the AI data, the AI up-scaler 236 may AI-upscale a low-resolution image reconstructed by the first decoder 234.

In contrast with the video file 1900 of FIG. 19, because the AI data is embedded in the image data 2005 according to a decoding order of the image data 2005, the video file 2000 may include no synchronization data. Accordingly, the AI data is sequentially decoded as the image data 2005 is decoded.

Video AI data 2008 may be located immediately after a video header 2006 including parameter information of a video. Accordingly, the video AI data 2008 may be decoded after the video parameters included in the video header 2006 are decoded. According to an embodiment, unlike in FIG. 19, the video AI data 2008 may be located immediately before the video header 2006.

Frame group AI data 2014 may be located immediately after a frame group header 2012 including parameter information of a frame group 2010. Accordingly, the frame group AI data 2014 may be decoded after the frame group parameters included in the frame group header 2012 are decoded. According to an embodiment, unlike in FIG. 19, the frame group AI data 2014 may be located immediately before the frame group header 2012. A decoding order of frame group headers and frame group AI data of the remaining frame groups decoded after the frame group 2010 may be determined to be the same as that of the frame group header 2012 and the frame group AI data 2014.

Frame AI data 2020 may be located immediately after a frame header 2018 including parameter information of a frame 2016. Accordingly, the frame AI data 2020 may be decoded after the frame group parameters included in the frame header 2018 are decoded. According to an embodiment, unlike in FIG. 19, the frame AI data 2020 may be located immediately before the frame header 2018. A decoding order of frame headers and frame AI data of the remaining frames decoded after the frame 2016 may be determined to be the same as that of the frame header 2018 and the frame AI data 2020.

Figure 20B:
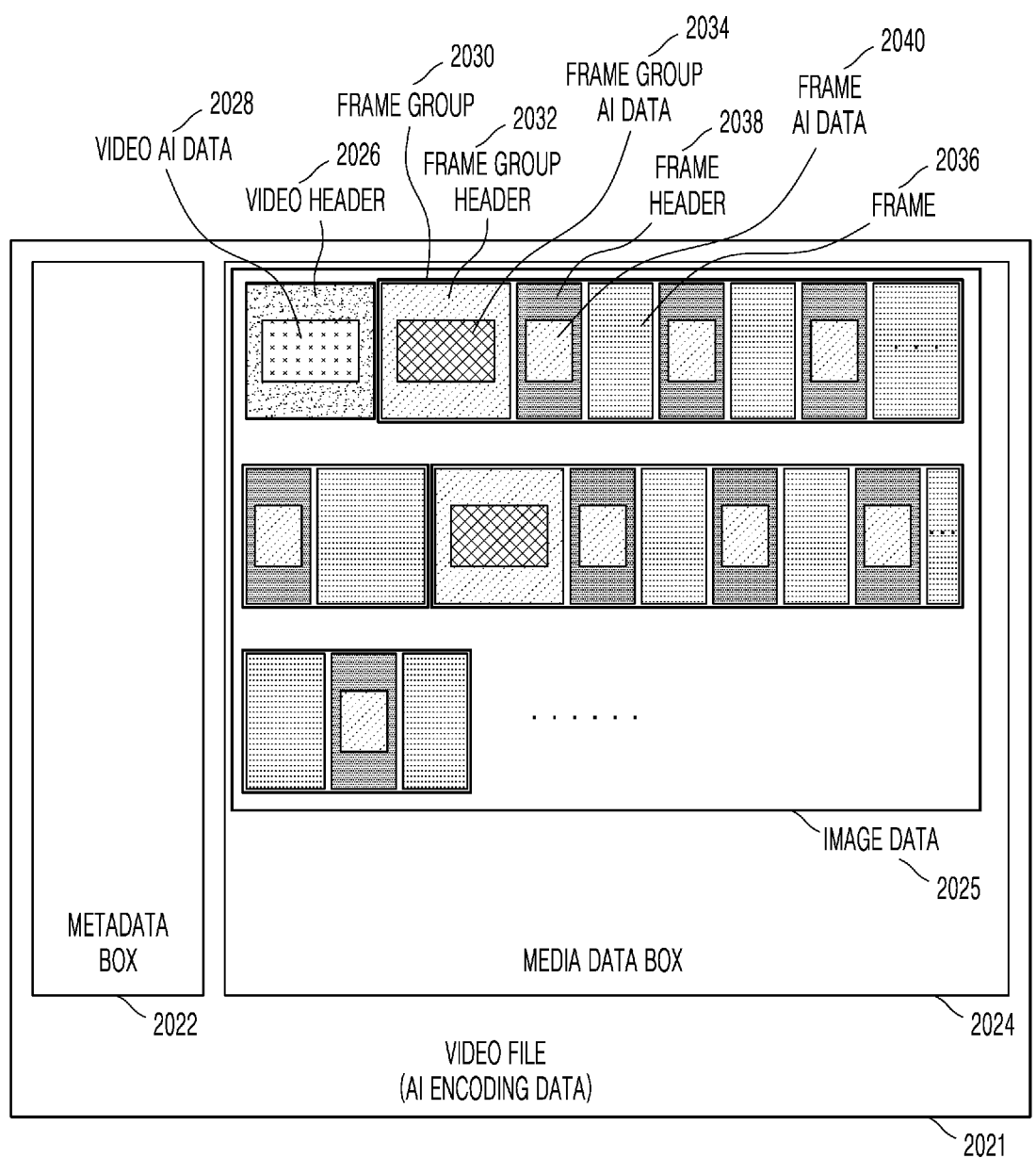
FIG. 20B illustrates AI encoding data when AI data is embedded in image data, according to another embodiment.

FIG. 20B illustrates AI encoding data when AI data is embedded in image data 2025, according to another embodiment.

Similar to the video file 2000 of FIG. 20A, a video file 2021 includes a metadata box 2022 and a media data box 2024. The metadata box 2022 does not include AI data, and instead the image data 2025 in which the AI data is embedded is included in the media data box 2024. However, in contrast with the video file 2000 of FIG. 20A, AI data in the video file 2021 is embedded in a data header corresponding to the AI data.

Video AI data 2028 may be included in a video header 2026 including parameter information of a video. Accordingly, the video AI data 2028 may be decoded together with the video parameters included in the video header 2026.

Frame group AI data 2034 may be included in a frame group header 2032 including parameter information of a frame group 2030. Accordingly, the frame group AI data 2034 may be decoded together with the frame group parameters included in the frame group header 2032. Frame group AI data of the remaining frame groups decoded after the frame group 2030 may be included in frame group headers respectively corresponding to the remaining frame groups.

Frame AI data 2040 may be included in a frame header 2038 including parameter information of a frame 2036. Accordingly, the frame AI data 2040 may be decoded together with the frame group parameters included in the frame header 2038.

Frame group AI data of the remaining frames decoded after the frame 2036 may be included in frame headers respectively corresponding to the remaining frames.

Figure 20C:
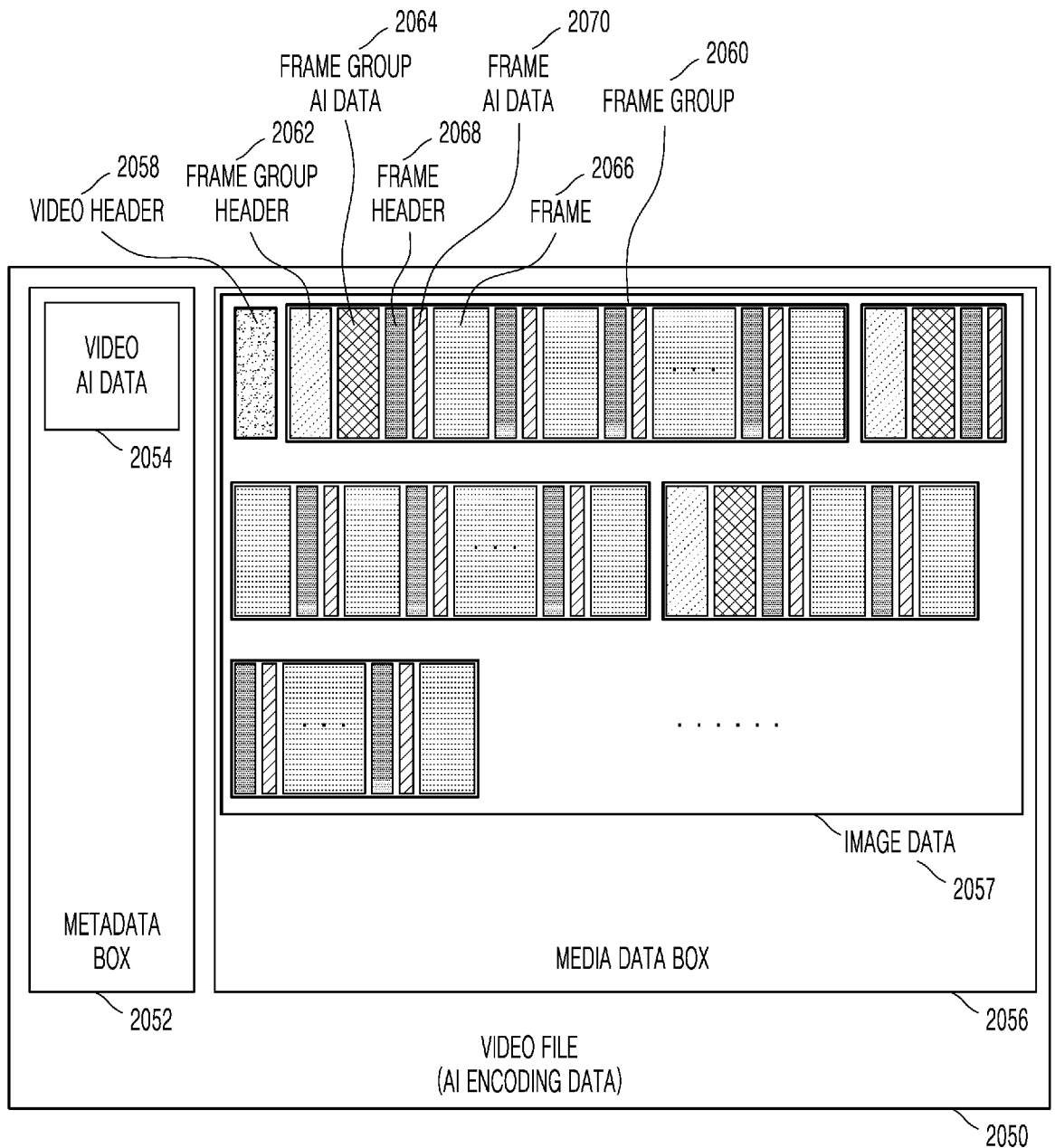
FIG. 20C illustrates AI encoding data when a portion of AI data is embedded in image data and the remaining AI data is separate from the image data, according to an embodiment.

FIG. 20C illustrates AI encoding data when a portion of AI data is embedded in image data 2057 and the remaining AI data is separate from the image data 2057, according to an embodiment.

Similar to the video file 2000 of FIG. 20A, a video file 2050 includes a metadata box 2052 and a media data box 2056. The metadata box 2052 includes video AI data 2054 applied to all of the frames of a video. Frame group AI data and frame AI data are included in the image data 2057 of the media data box 2056.

In contrast with the video AI data 2008 of FIG. 20A and the video AI data 2028 of FIG. 20B, the video AI data 2054 included in the metadata box 2052 may be decoded before decoding of the image data 2057. The frame group AI data and the frame AI data are sequentially decoded as the image data 2057 is decoded.

Accordingly, the parser 232 may extract the video AI data 2054 from the metadata box 2052. The parser 232 may transmit the video AI data 2054 to the AI setter 238. The parser 232 may also transmit the image data 2057 to the first decoder 234. The first decoder 234 may restore a low-resolution image by decoding the image data 2057, and may extract frame group AI data 2064 and frame AI data 2070. The first decoder 234 may transmit the frame group AI data 2064 and the frame AI data 2070 to the AI setter 238. The AI setter 238 may obtain upscaling DNN information for AI-upscaling the low-resolution image according to the video AI data 2054, the frame group AI data 2064, and the frame AI data 2070.

The frame group AI data 2064 may be located immediately after a frame group header 2062 including parameter information of a frame group 2060. According to another embodiment, the frame group AI data 2064 may be located immediately before the frame group header 2062. The frame group AI data 2064 may be included in the frame group header 2062.

The frame AI data 2070 may be located immediately after a frame header 2068 including parameter information of a frame 2066. However, according to an embodiment, the frame AI data 2070 may be located immediately before the frame header 2068. The frame AI data 2070 may be included in the frame header 2068.

In FIG. 20C, only the video AI data 2054 is included in the metadata box 2052. However, frame group AI data may be additionally included in the metadata box 2052. Alternatively, a portion of frame group AI data may be included in the metadata box 2052. Alternatively, a portion of frame AI data may be included in the metadata box 2052.

In FIGS. 20A and 20C, the frame group AI data 2014 and 2064 and the frame AI data 2020 and 2070 embedded in media data boxes may be in the form of an SEI message. The SEI message is a data unit including supplemental information about an image unnecessary for decoding an image. The SEI message may be transmitted in units of frame groups or in units of frames. The SEI message may be extracted by the parser 232 and transmitted to the AI setter 238.

Figure 21:
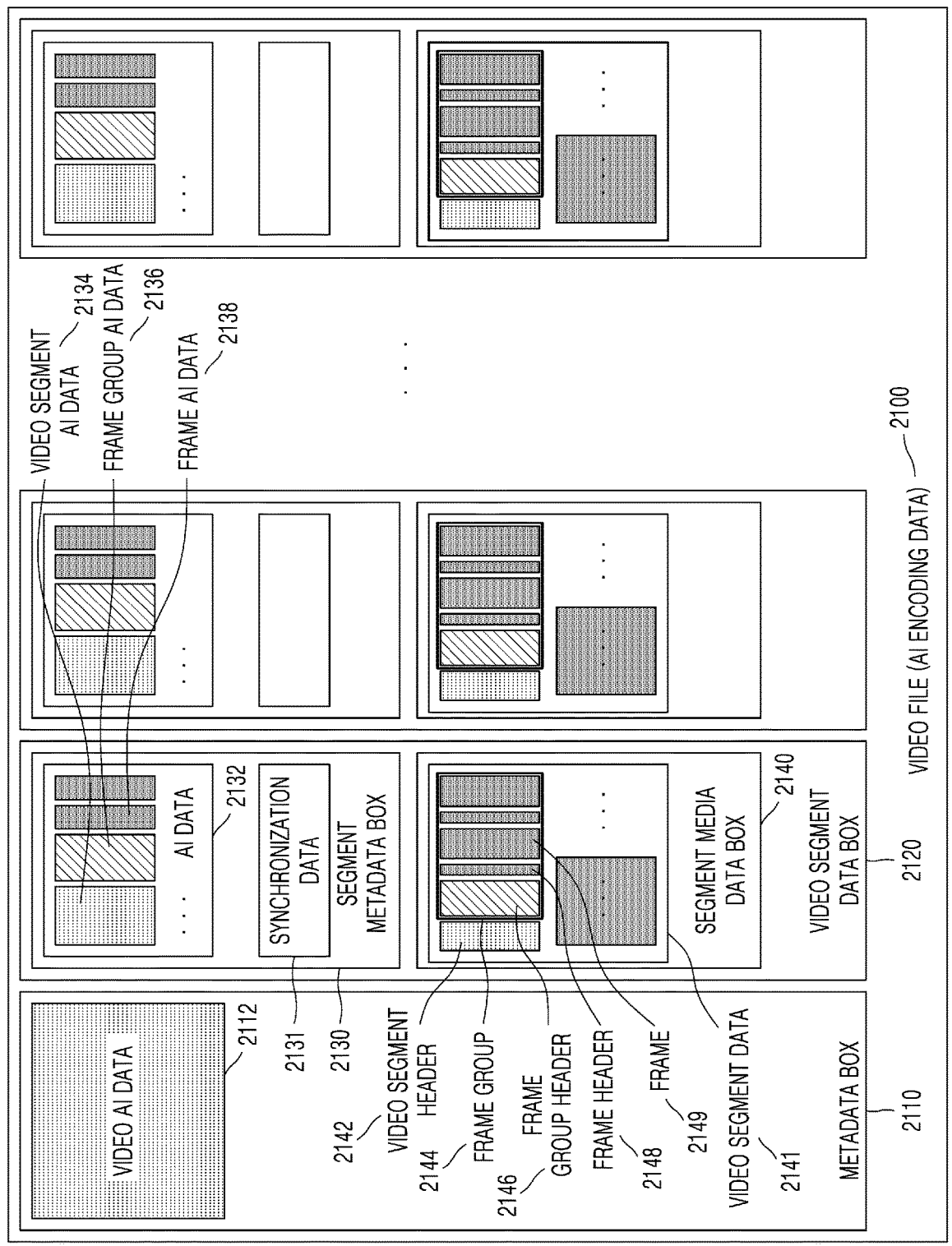
FIG. 21 illustrates AI encoding data split in units of video segments, when AI data is separated from image data, according to an embodiment.

FIG. 21 illustrates AI encoding data split in units of video segments, when AI data is separated from image data, according to an embodiment.

When metadata including the AI data has a large size or the image data is live-streamed through a communication channel, the AI encoding data may be split in units of video segments and stored in a video file 2100 in order to reduce an overhead for processing the metadata including the AI data. Each video segment, which is a portion of a video, includes a frame for a certain time period. For example, the video segment may include only one or more frame groups. When the video segment includes one frame group, the video file 2100 may include as many video segments as the number of frame groups of the image data.

The video segment may include a metadata box and a media data box. The metadata including the AI data is split into a plurality of video segments and stored. Accordingly, the AI data is split and stored in not only a metadata box 2110 for the entire image data but also metadata boxes for the video segments. Thus, when a low-resolution image of a specific portion of the image data is AI-upscaled, AI data for obtaining upscaling DNN information suitable for the specific portion may be quickly obtained when the AI data is distributed and stored in both the metadata box 2110 for the entire image data and the metadata boxes for the video segments, compared to when the entire AI data is stored in the metadata box 2110 for the entire image data.

For example, when reproduction is achieved from a current video segment, a low-resolution image of the current video segment is AI-upscaled by referring to only video AI data 2112 of the metadata box 2110 and AI data of a segment metadata box 2130 of a current video segment data box 2120. AI data of metadata boxes of the other video segments is not referred to. Thus, an overhead due to decoding of the AI data may be reduced.

When the image data is live-streamed, the AI data may not be transmitted all at once during initial reproduction but may be distributed and stored in units of video segments. Distribution and sequential transmission of the AI data may lead to a reduction in the overhead due to decoding of the AI data. Thus, it may be favorable to split and transmit the AI data in units of video segments.

In FIG. 21, the metadata box 2110 for the entire image data includes the video AI data 2112. The video AI data 2112 is applied to all of the video segments included in the video. The metadata box 2110 may be decoded before the current video segment data box 2120.

The current video segment data box 2120 includes the segment metadata box 2130 and a segment media data box 2140. The segment metadata box 2130 may include synchronization data 2131 and AI data 2132. The segment media data box 2140 includes video segment data 2141.

The AI data 2132 of the current video segment data box 2120 may include video segment AI data 2134, frame group AI data 2136, and frame AI data 2138. The video segment AI data 2134 is applied to all of the frame groups included in the current video segment. The frame group AI data 2136 is applied to all of the frames included in a current frame group. The frame AI data 2138 is applied to a current frame.

According to an embodiment, when the same upscaling DNN information is used in all of the frames of a video segment, the frame group AI data 2136 and the frame AI data 2138 in the AI data 2132 of the current video segment data box 2120 may be omitted. Alternatively, when upscaling DNN information is adaptively obtained for each frame group and the same upscaling DNN information is used in all of the frames of a frame group, the frame AI data 2138 in the AI data 2132 of the current video segment data box 2120 may be omitted.

According to an embodiment, when the video segment includes one frame group, the video segment AI data 2134 in the AI data 2132 of the current video segment data box 2120 may be omitted. The frame group AI data 2136 may play the role of the video segment AI data 2134. Alternatively, when the video segment includes one frame group and the same upscaling DNN information is used in all of the frames of the frame group, the video segment AI data 2134 and the frame AI data 2138 in the AI data 2132 of the current video segment data box 2120 may be omitted. AI upscaling may be applied to all of the frames of the video segment, based on upscaling DNN information for the frame group AI data 2136. The synchronization data 2131 includes information about synchronization of the video segment AI data 2134, the frame group AI data 2136, and the frame AI data 2138 with a video segment header 2142, a frame group header 2146, and a frame header 2148. The video segment header 2142 includes a video segment parameter commonly applied to the frames included in the video segment. For example, the synchronization data 2131 may include reproduction sequence information or decoding sequence information of the video segment data 2141 of the segment media data box 2140. Accordingly, the AI setter 238 may obtain upscaling DNN information used for AI-upscaling a low-resolution image, from AI data determined according to the synchronization data 2131.

For example, to AI-upscale a low-resolution image of a frame 2149, the parser 232 or the AI setter 238 may obtain the frame group AI data 2136 corresponding to the frame group 2144 and the frame AI data 2136 corresponding to the frame 2149, based on the synchronization data 2131. In consideration of the video segment AI data 2134 applied to all frames, together with the frame group AI data 2136 and the frame AI data 2138, the AI setter 238 may obtain the upscaling DNN information for AI-upscaling the low-resolution image of the frame 2149.

According to an embodiment, the AI data 2132 of the segment metadata box 2130 may be decoded before the video segment data 2141 of the segment media data box 2140. Accordingly, the AI setter 238 may obtain the upscaling DNN information before decoding of the video segment data 2141, according to the AI data 2132. The obtained upscaling DNN information may be applied to all of the video segments. Alternatively, different pieces of upscaling DNN information may be previously obtained for different frame groups in order to achieve adaptive AI upscaling on each frame group, or different pieces of upscaling DNN information may be previously obtained for different frames in order to achieve adaptive AI upscaling on each frame.

According to an embodiment, the AI setter 238 may decode the AI data 2132 of the segment metadata box 2130 according to a decoding order of the video segment data 2141 of the segment media data box 2140. For example, the AI setter 238 may decode the frame group AI data 2136 according to an order of decoding of the frame group header 2146 by the first decoder 234. The AI setter 238 may decode the frame AI data 2138 according to an order of decoding of the frame header 2148 by the first decoder 234. By referring to the synchronization data 2131, a decoding order of the video segment AI data 2134, the frame group AI data 2136, and the frame AI data 2138 may be synchronized with a decoding order of the video segment header 2142, the frame group header 2146, and the frame header 2148.

The remaining video segment data boxes after the current video segment data box 2120 may be sequentially decoded using the same method as a method for the current video segment data box 2120.

Figure 22:
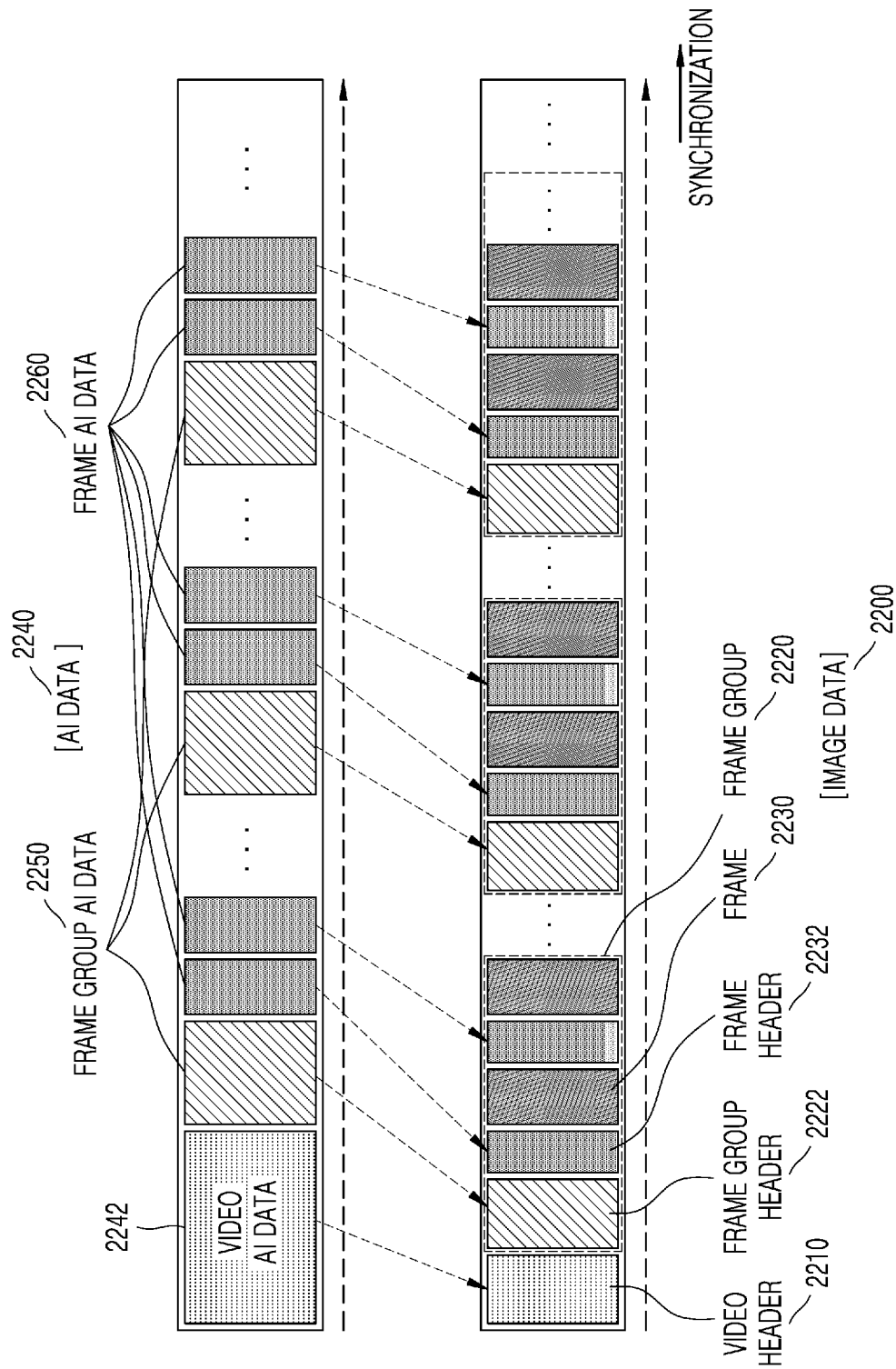
FIG. 22 illustrates AI data and image data that are transmitted in the form of two separate files according to an embodiment.

FIG. 22 illustrates AI data 2240 and image data 2200 that are transmitted in the form of two separate files.

When the AI data 2240 is not received by the receiver 210, a low-resolution image obtained from the image data 2200 is not AI-upscaled. On the other hand, when the AI data 2240 is received by the receiver 210, upscaling DNN information used for AI-upscaling the low-resolution image according to the AI data 2240 transmitted to the AI setter 238 is obtained.

The image data 2200 may include a video header 2210, a frame group header 2222 of a frame group 2220, and a frame header 2232 of a frame 2230. The AI data 2240 may include video AI data 2242, frame group AI data 2250, and frame AI data 2260. Because the image data 2200 and the AI data 2240 are transmitted in the form of separate files, the image data 2200 and/or the AI data 2240 may include synchronization data for synchronizing the image data 2200 with the AI data 2240. The synchronization data may represent a decoding order or reproduction order of the image data 2200.

The parser 232 and/or the AI setter 238 may set a reproduction sequence or a decoding sequence of the video AI data 2242, the frame group AI data 2250, and the frame AI data 2260 to conform to that of the video header 2210, the frame group header 2222, and the frame header 2232, according to the synchronization data. In FIG. 22, a dotted line between the video AI data 2242 and the video header 2210, a dotted line between the frame group AI data 2250 and the frame group header 2222, and a dotted line between the frame AI data 2260 and the frame header 2232 indicates synchronization between AI data and a data header.

The image data 2200 and the AI data 2240 may include identification numbers for matching the two data. For example, the AI data 2240 may include an identification number of the image data 2200 to which the AI data 2240 is applied. Alternatively, the image data 2200 may include an identification number of the AI data 2240 to which the image data 2200 is applied, or both of the image data 2200 and the AI data 2240 may include identification numbers. Accordingly, even when the image data 2200 and the AI data 2240 are not simultaneously transmitted, the image data 2200 and the AI data 2240 may match with each other according to the identification numbers.

According to an embodiment, when the upscaling DNN information is obtained in units of frame groups, the frame AI data 2260 in the AI data 2240 may be omitted. When the same upscaling DNN information is used in all frames of a video, the frame group AI data 2250 and the frame AI data 2260 in the AI data 2240 may be omitted.

Figure 23:
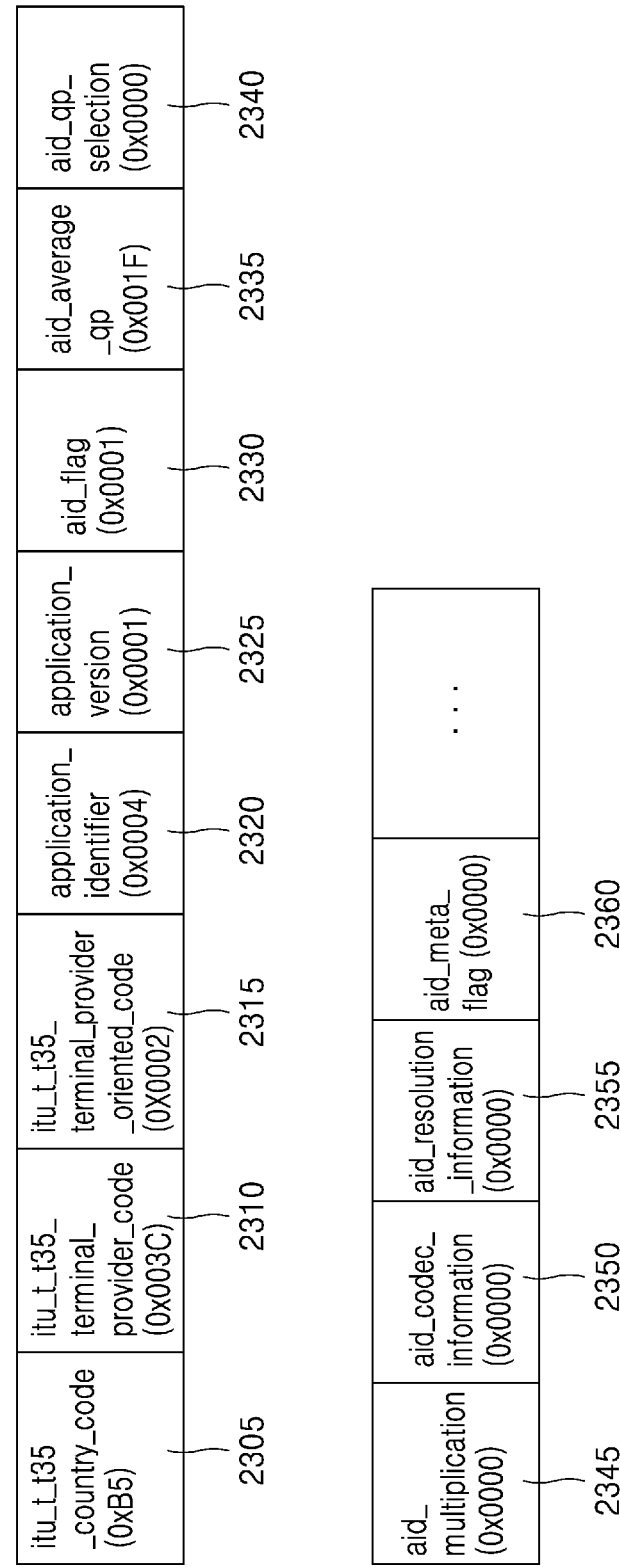
FIG. 23 is a diagram illustrating a structure of a supplemental enhancement information (SEI) message according to an embodiment.

FIG. 23 is a diagram illustrating a structure of an SEI message according to an embodiment.

Referring to FIG. 23, the SEI message may include itu_t_t35_country_code 2305. The itu_t_t35_country_code 2305 may refer to a byte specified to a country code by Annex A of the standard ITU-T T. 35. For example, the itu_t_t35_country_code 2305 may have a value of 0xB5, and the value of 0xB5 may be a US country code specified by Annex A of the standard ITU-T T. 35.

Next, the SEI message may include itu_t_t35_terminal_provider_code 2310. The itu_t_t35_terminal_provider_code 2310 may be a field of 16 bits (2 byte) specifying the code of a terminal provider or entity specified by Annex A of the standard ITU-T T. 35. For example, the itu_t_t35_ terminal_provider_code 2310 may have a value of 0x003C, and the value of 0x003C may be a code representing an S company.

Next, the SEI message may include itu_t_t35_ terminal_provider_oriented_code2315. The itu_t_t35_terminal_ provider_oriented_code2315 refers to a code defined by the terminal provider or entity specified by Annex A of the standard ITU-T T. 35. For example, the itu_t_t35_ terminal_provider_oriented_code2315 may have a value of 0x0002, and the value of 0x0002 may represent an AI codec defined by the S company.

Next, the SEI message may include application_identifier 2320. The application_identifier 2320 may be an identifier representing one application method from among various application methods of ST-2094, which is a standard that defines dynamic metadata of a high dynamic range (HDR). The application_identifier 2320 may have a value of 0x0004, and the value of 0x0004 may represent an S company application method according to the standard ST 2094-40.

Next, the SEI message may include AI data in the form of a certain syntax element. For example, the SEI message may include application_version 2325. The application_version 2325 may refer to as the genre of an image. For example, when the application_version 2325 has a value of 0x0001, this may indicate that the genre of the image is a general image.

Next, the SEI message may include aid_flag 2330. The aid_flag 2330 may represent whether AI downscaling has been applied to the image and whether to perform AI upscaling. For example, the aid_flag 2330 may have a value of 0λ0001, and the value of 0λ0001 may indicate that AI downscaling has been applied to the image and thus AI upscaling is performed.

Next, the SEI message may include aid_average_qp 2335. The aid_average_qp 2335 is an average of quantization parameters applied to the image (i.e., applied during first encoding of the original image), and may have a value of 0x001F. The value of 0x001F may indicate that the average of quantization parameters applied to the image is 31.

Next, the SEI message may include aid_qp_selection 2340. The aid_qp_selection 2340 is indicator information indicating a quantization degree (or level) of at least a portion of the image, and may have an index form. For example, the aid_qp_selection 2340 may have a value of 0x0000. The aid_qp_selection 2340 will be described in more detail below with reference to FIG. 21.

Next, the SEI message may include aid_multiplication 2345. The aid_multiplication 2345 is information representing a ratio (or multiple) between the original image and the first image, and may have a flag or index form indicating one of ratios (or multiples) between a plurality of original image and the first image. For example, the aid_multiplication 2345 may have a value of 0x0000, and the value of 0x0000 may indicate that the ratio between the original image and the first image is 2×.

Next, the SEI message may include aid_codec_information 2350. The aid_codec_information 2350 is information indicating a predetermined codec used in the first encoding of the image, and may have an index form. For example, the aid_codec_information 2350 may have a value of 0x0000, and the value of 0x0000 may represent the H. 264 codec.

Next, the SEI message may include aid_resolution_information 2355. The aid_resolution_information 2355 is information representing resolution of the original image (or the first image), and may have any of various forms. However, for example, the aid_resolution_information 2355 may have an index form indicating resolution of one of the plurality of original images (or the first image). For example, the aid_resolution_information 2355 may have a value of 0x0000, and the value of 0x0000 may indicate that the resolution of the first image is Full HD.

Next, the SEI message may include aid_meta_flag 2360. The aid_meta_flag 2360 may refer to a flag indicating whether AI data (the SEI message) includes AI-upscaling related additional metadata. For example, the aid_meta_flag 2360 may have a value of 0x0000, and the value of 0X0000 may indicate that AI data (the SEI message) includes no AI-upscaling related additional metadata.

According to an embodiment, a portion of the AI upscaling related additional metadata may be located in front of the aid_meta_flag 2360. In this case, the portion may not be treated as additional metadata. Alternatively, according to an embodiment, AI-upscaling related data may be located behind the aid_meta_flag 2360. In this case, the AI-upscaling related data may be treated as additional metadata.

Although various pieces of data included in the SEI message have been described above, this is merely an example. The SEI message may include some of the above-described various pieces of data or may further include other data, and the order of pieces of data may be changed as long as it is not contradictory.

It is understood, however, that embodiments are not limited thereto, and a data structure applicable to the aforementioned AI data may be similar to the structure of the aforementioned SEI message.

FIG. 24 is a syntax structure table including AI data, according to an embodiment.

Referring to FIG. 24, according to an aid_main syntax table 2400, syntax elements such as aid_flag, aid_average_qp, aid_qp_selection, aid_multiplication, aid_codec_information, aid_resolution_information, and aid_meta_flag may be parsed.

The aid_flag is an AI upscaling activation flag corresponding to the aid_flag of FIG. 23. When aid_flag indicates that AI upscaling is activated (if(aid_flag)), syntax elements corresponding to the AI sub-data may be parsed.

On the other hand, when aid_flag indicates that AI upscaling is not activated, the syntax elements corresponding to the AI sub-data are not parsed.

The syntax elements corresponding to the AI sub-data may include aid_average_qp, aid_qp_selection, aid_multiplication, aid_codec_information, aid_resolution_information, and aid_meta_flag, and may correspond to aid_average_qp, aid_qp_selection, aid_multiplication, aid_codec_information, aid_resolution_information, and aid_meta_flag of FIG. 23.

The aid_average_qp is a syntax element corresponding to aid_average_qp of FIG. 23, and may be information representing an average of quantization parameters applied to an image. The aid_qp_selection is a syntax element corresponding to aid_qp_selection of FIG. 23, and may be indicator information resenting a quantization degree (or level) of at least a portion of the image.

The aid_multiplication is a syntax element corresponding to aid_multiplication of FIG. 23, and may be information representing a ratio (or multiple) between the original image and the first image.

The aid_codec_information is a syntax element corresponding to aid_codec_information of FIG. 23, and may be information representing a predetermined codec used in the first encoding of the image.

The aid_resolution_information is a syntax element corresponding to aid_resolutaion_information of FIG. 23, and may be information representing resolution of the original image (or the first image).

The aid_meta_flag is a syntax element corresponding to aid_meta_flag of FIG. 23, and may refer to a flag indicating whether AI data includes AI-upscaling related additional metadata.

When the aid_meta_flag indicates that AI data includes AI-upscaling related additional metadata (if(aid_flag)), syntax elements corresponding to the AI-upscaling related additional metadata may be parsed.

Examples of obtained additional metadata may include hdr_max_luminance, hdr_color_gamut, hdr_pq_type, rate_control_type, and aid_target_bitrate. The hdr_max_luminance may represent an HDR maximum luminance applied to a high-resolution image, the hdr_color_gamut may represent an HDR gamut applied to the high-resolution image, the hdr_pq_type may represent HDR perceptual quantizer (PQ) applied to the high-resolution image, the rate_control_type may represent a rate control type applied to image data obtained via first encoding, and the aid_target_bitrate may represent a target bitrate. According to an embodiment, certain syntax elements from among the syntax elements corresponding to the additional metadata may be parsed.

The syntax structure table 2400 of FIG. 24 is merely an example, and syntax elements corresponding to some of the AI data shown in FIG. 23 may be included in the syntax structure table 2400. Syntax elements corresponding to AI data not shown in FIG. 23 may also be included in the syntax structure table 2400.

It has been described above with reference to FIG. 23 that the value of a syntax element is parsed in units of bytes. A payload portion including AI data is parsed in units of bytes in consideration of a byte alignment, and thus the value of each syntax element may be parsed in units of bytes. It is understood, however, that embodiments are not limited thereto, and each syntax element may be parsed in various units (for example, by a u(1) or ae(v) function), based on a defined syntax structure table.

Further, a syntax structure table applicable to the AI data may be similar to the syntax structure table including the AI data.

Figure 25:
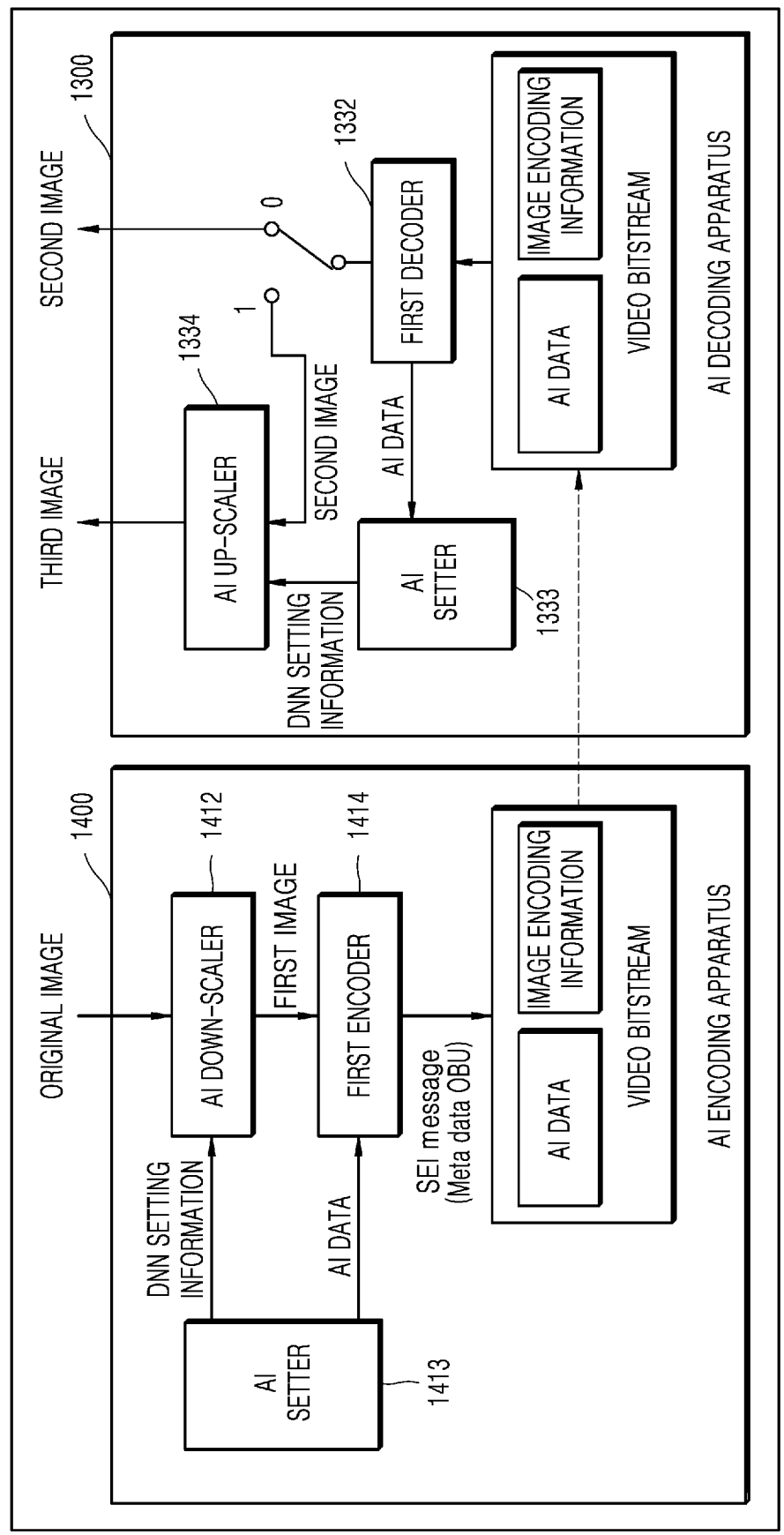
FIG. 25 is a block diagram for describing operations of an AI encoding apparatus and an AI decoding apparatus based on bitstreams, according to an embodiment.

FIG. 25 is a block diagram for describing operations of an AI encoding apparatus and an AI decoding apparatus based on bitstreams, according to an embodiment.

Referring to FIG. 25, the AI encoding apparatus 1400 may receive an original image as an input and output a video bitstream to the AI decoding apparatus 1300. For example, the AI encoding apparatus 1400 may determine whether to perform AI downscaling on the original image, and may generate a first image by performing AI downscaling on the original image according to a result of the determination. The AI downscaling may be performed by the AI downscaler 1412. When AI downscaling is not performed, the original image instead of the first image may be an input image of the first encoder 1414.

The first encoder 1414 may generate image encoding information by performing first encoding on the first image, based on a predetermined codec, and may express the image encoding information in the form of a bitstream. The image encoding information may be included in a main bitstream region of the bitstream that is defined by the predetermined codec and is capable of including the image encoding information. For example, when the predetermined codec is in accordance with H. 264, HEVC, or VVC of MPEG, the image encoding information may be included in a NAL unit having the type of VPS, SPS, PPS, I slice, B slice, or P slice. When the certain codec is an AV1 codec, the image encoding information may be included in an OBU of which type is a sequence header OBU, a frame header OBU, a frame OBU, or a tile group OBU.

The first encoder 1414 may express AI data in the form of a bitstream, based on the certain codec. The AI data may be included in a sub-bitstream region of the bitstream that is defined by the certain codec and is capable of including supplemental data.

The AI data may include an AI upscaling activation flag representing whether upscaling corresponding to AI downscaling is performed, and AI sub-data for selecting upscaling DNN information that is used in AI upscaling corresponding to AI downscaling. For example, when the predetermined codec is in accordance with H. 264, HEVC, or VVC of MPEG, the AI data may be included in the NAL unit of an SEI message. When the predetermined codec is AV1, the AI data may be included in a metadata OBU.

The first encoder 1414 may generate a video bitstream including the AI data and the image encoding information each expressed in the form of a bitstream.

The AI decoding apparatus 1300 receives the video bitstream from the AI encoding apparatus 1400. The first decoder 1332 may obtain a second image by performing first decoding on the image encoding information included in the video bitstream. When the predetermined codec is an MPEG codec, the first decoder 1332 may obtain encoding information of the SPS, the PPS, the I slice, the P slice, and the B slice, based on the NAL unit type of the image encoding information included in the NAL unit header of the video bitstream, and may perform first decoding on the obtained encoding information to obtain the second image.

The first decoder 1332 may obtain the AI data from the video bitstream. For example, when the predetermined codec is an MPEG codec, the first decoder 1332 may obtain the AI data, based on the NAL unit type of the AI data included in the NAL unit header of the video bitstream. In other words, when the NAL unit type is an SEI message, the first decoder 1232 may obtain the AI data from a corresponding NAL unit (SEI Message). The AI data may be included in an SEI message including user data registered by ITU-T T. 35 or including unregistered user data that is identified by a UUID.

When the predetermined codec is an AV1 codec, the first decoder 1332 may obtain the AI data from a metadata OBU from among OBUs. The AI data may be included in the metadata OBU including the user data registered by ITU-T T. 35.

The AI decoding apparatus 1300 may determine whether to perform AI upscaling, based on the AI upscaling activation flag included in the AI data.

When the AI upscaling activation flag represents that AI upscaling is not activated, the AI decoding apparatus 1300 may output the second image.

When the AI upscaling activation flag represents that AI upscaling is activated, the AI decoding apparatus 1300 may input the second image to the AI up-scaler 1334 and the AI data to the AI setter 1333.

The AI setter 1333 may select a piece of upscaling DNN information from among a plurality of pieces of upscaling DNN information, based on the AI data, and the AI up-scaler 1334 may perform AI upscaling on the second image, based on an upscaling DNN set based on the selected upscaling DNN information to output a third image.

FIG. 26 is a table showing a mapping relationship between several pieces of image-related information and several pieces of DNN setting information;

According to the present embodiment, AI encoding and AI decoding processes do not only consider a change of resolution. As shown in FIG. 26, DNN setting information may be selected considering at least one of resolution (such as standard definition (SD), high definition (HD), full HD, or 4K), a bitrate (such as 10 Mbps, 15 Mbps, 20 Mbps, or 25 Mbps), codec information (such as AV1, H.264, HEVC, or VVC), image genre information (such as Sports, Movie, or General), or QP level information, individually or collectively. The QP_level information may be a QP level indicated by the aid_qp_selection of FIG. 23 (or indicated by a QP indicator of FIG. 27), but embodiments are not limited thereto. The QP_level information may be the range of a QP value determined by at least one of the aid_qp_selection of FIG. 17, the aid_average_qp of FIG. 17, or a quantization parameter obtained when performing first decoding on image encoding information. An embodiment of selecting DNN setting information in consideration of the QP level (or the range of a QP value) will be described below with reference to FIG. 22.

Training in consideration of each element is jointly performed for encoding (e.g., a DNN for downscaling) and decoding (e.g., a DNN for upscaling) processes during an AI training process.

Accordingly, when a plurality of pieces of DNN setting information are provided based on image-related information including a codec type, resolution of an image, and the like, as shown in FIG. 26, according to training, an AI decoding apparatus may obtain DNN setting information for AI-upscaling the second image 135, based on the information related to the first image 115 or the original image 105 received during the AI decoding process. The information related to the first image 115 or the original image 105 may be obtained by performing first decoding on the image encoding information, or may be obtained from AI data.

In other words, the AI setter 1333 is capable of using DNN setting information according to image-related information by matching the image-related information at the left of a table of FIG. 26 with the DNN setting information at the right of the table.

As shown in FIG. 26, when it is verified, from the information related to the first image 115 or the original image 105, that the resolution of the first image 115 is SD, a bitrate of image data obtained as a result of performing first encoding on the first image 115 is 10 Mbps, a ratio between the first image 115 and the original image 105 is 1.5×, the first encoding is performed on the first image 115 via an AV1 codec, the genre of the first image 115 is Sports, and the QP level is 5, the AI setter 1333 may use A DNN setting information among a plurality of pieces of DNN setting information.

When it is verified (or based on verifying), from the information related to the first image 115 or the original image 105, that the resolution of the first image 115 is SD, the bitrate of image data obtained as a result of performing first encoding on the first image 115 is 10 Mbps, the first encoding is performed on the first image 115 via an AV1 codec, the genre of the first image 115 is Movie, and the QP level is 5, the AI setter 1333 may use B DNN setting information among the plurality of pieces of DNN setting information.

According to whether the genre of the first image 115 is Sports, Movie, or General, A DNN setting information or B DNN setting information is selected. Only the genre of an image may be different, while the other conditions are the same, and a first DNN and a second DNN may be jointly trained based on the genre of the image. Accordingly, the AI setter 1333 may obtain DNN setting information according to the genre of the second image 135.

When it is verified (or based on verifying), from the information related to the first image 115 or the original image 105, that the resolution of the first image 115 is SD, the bitrate of image data obtained as a result of performing first encoding on the first image 115 is 15 Mbps, the ratio between the first image 115 and the original image 105 is 1.5×, the first encoding is performed on the first image 115 via an AV1 codec, the genre of the first image 115 is Movie, and the QP level is 5, the AI setter 1333 may use C DNN setting information among the plurality of pieces of DNN setting information.

B DNN setting information or C DNN setting information is selected according to the bitrate of the image data. Only the bitrate of the image data may be different, while the other conditions are the same, and the first DNN and the second DNN may be jointly trained based on the bitrate of the image data. Accordingly, the AI setter 1333 may obtain DNN setting information according to the genre of the second image 135.

When it is verified (or based on verifying), from the information related to the first image 115 or the original image 105, that the resolution of the first image 115 is SD, the bitrate of image data obtained as a result of performing first encoding on the first image 115 is 10 Mbps, the ratio between the first image 115 and the original image 105 is 1.5×, the first encoding is performed on the first image 115 via an AV1 codec, the genre of the first image 115 is General, and the QP level is 5, the AI setter 1333 may use C DNN setting information among the plurality of pieces of DNN setting information.

When it is verified (or based on verifying), from the information related to the first image 115 or the original image 105, that the resolution of the first image 115 is SD, the bitrate of image data obtained as a result of performing first encoding on the first image 115 is 10 Mbps, the ratio between the first image 115 and the original image 105 is 2.0×, the first encoding is performed on the first image 115 via an AV1 codec, the genre of the first image 115 is Sports, and the QP level is 5, the AI setter 1333 may use D DNN setting information among the plurality of pieces of DNN setting information.

According to whether the ratio between the first image 115 and the original image 105 is 1.5× or 2.0×, C DNN setting information or D DNN setting information is selected. Only the ratio between the first image 115 and the original image 105 may be different, while the other conditions are the same, and the first DNN and the second DNN may be jointly trained based on the ratio between the first image 115 and the original image 105. Accordingly, the AI setter 1333 may obtain DNN setting information according to the ratio between the first image 115 and the original image 105.

When it is verified (or based on verifying), from the information related to the first image 115 or the original image 105, that the resolution of the first image 115 is SD, the bitrate of image data obtained as a result of performing first encoding on the first image 115 is 10 Mbps, the ratio between the first image 115 and the original image 105 is 2.0×, the first encoding is performed on the first image 115 via an AV1 codec, the genre of the first image 115 is Sports, and the QP level is 4, the AI setter 1333 may use E DNN setting information among the plurality of pieces of DNN setting information.

According to the QP level (or range), D DNN setting information or E DNN setting information is selected. Only the QP level may be different, while the other conditions are the same, and the first DNN and the second DNN may be jointly trained based on the QP level. Accordingly, the AI setter 1333 may obtain DNN setting information according to the QP level.

When it is verified (or based on verifying), from the information related to the first image 115 or the original image 105, that the resolution of the first image 115 is HD, the bitrate of image data obtained as a result of performing first encoding on the first image 115 is 15 Mbps, the ratio between the first image 115 and the original image 105 is 1.5×, the first encoding is performed on the first image 115 via an H.264 codec, the genre of the first image 115 is Sports, and the QP level is 3, the AI setter 1333 may use F DNN setting information among the plurality of pieces of DNN setting information.

When it is verified (or based on verifying), from the information related to the first image 115 or the original image 105, that the resolution of the first image 115 is HD, the bitrate of image data obtained as a result of performing first encoding on the first image 115 is 15 Mbps, the ratio between the first image 115 and the original image 105 is 1.5×, the first encoding is performed on the first image 115 via an AV1 codec, the genre of the first image 115 is General, and the QP level is 3, the AI setter 1333 may use G DNN setting information among the plurality of pieces of DNN setting information.

F DNN setting information or G DNN setting information is selected according to the type of codec. Only the type of codec may be different, while the other conditions are the same, and the first DNN and the second DNN may be jointly trained based on the QP level. Accordingly, the AI setter 1333 may obtain DNN setting information according to the type of codec.

When it is verified (or based on verifying), from the information related to the first image 115 or the original image 105, that the resolution of the first image 115 is Full HD, the bitrate of image data obtained as a result of performing first encoding on the first image 115 is 15 Mbps, the ratio between the first image 115 and the original image 105 is 1.5×, the first encoding is performed on the first image 115 via an AV1 codec, the genre of the first image 115 is General, and the QP level is 3, the AI setter 1333 may use H DNN setting information among the plurality of pieces of DNN setting information.

According to the resolution of the first image 115, G DNN setting information or H DNN setting information is selected. Only the resolution of the first image 115 may be different, while the other conditions are the same, and the first DNN and the second DNN may be jointly trained based on the ratio between the first image 115 and the original image 105. Accordingly, the AI setter 1333 may obtain DNN setting information according to the resolution of the first image 115.

When it is verified (or based on verifying), from the information related to the first image 115 or the original image 105, that the resolution of the first image 115 is Full HD, the bitrate of image data obtained as a result of performing first encoding on the first image 115 is 20 Mbps, the ratio between the first image 115 and the original image 105 is 1.5×, the first encoding is performed on the first image 115 via an HEVC codec, the genre of the first image 115 is Movie, and the QP level is 2, the AI setter 1333 may use I DNN setting information among the plurality of pieces of DNN setting information.

When it is verified (or based on verifying), from the information related to the first image 115 or the original image 105, that the resolution of the first image 115 is 4K, the bitrate of image data obtained as a result of performing first encoding on the first image 115 is 25 Mbps, the ratio between the first image 115 and the original image 105 is 1.5×, the first encoding is performed on the first image 115 via a VVC codec, the genre of the first image 115 is Sports, and the QP level is 2, the AI setter 1333 may use J DNN setting information among the plurality of pieces of DNN setting information.

When it is verified (or based on verifying), from the information related to the first image 115 or the original image 105, that the resolution of the first image 115 is 4K, the bitrate of image data obtained as a result of performing first encoding on the first image 115 is 25 Mbps, the ratio between the first image 115 and the original image 105 is 1.5×, the first encoding is performed on the first image 115 via a VVC codec, the genre of the first image 115 is Movie, and the QP level is 2, the AI setter 1333 may use K DNN setting information among the plurality of pieces of DNN setting information.

According to another embodiment, the AI setter 1333 may obtain the DNN setting information for performing AI upscaling on the second image 135 from among the plurality of pieces of DNN setting information considering both information (mode information, quantization parameter information, and the like) provided from the first decoder 1232 and the information related to the first image 115 included in the AI data. For example, the AI setter 1333 may receive quantization parameter information used during a first encoding process of the first image 115 from the first decoder 1232, verify the bitrate of image data obtained as an encoding result of the first image 115 from the AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the third image 135 may be obtained when prediction mode information, motion information, and/or a quantization parameter obtainable for each frame from the first decoder 1232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI upscaling is performed on the second image 135 to the upscaling target corresponding to the downscaling target of the first DNN. The AI setter 1333 may perform AI upscaling on the third image 135 by using the DNN setting information corresponding to the identifier of the DNN setting information, after obtaining the identifier of the DNN setting information included in the AI data.

Also, according to an embodiment, the AI data may include the DNN setting information. The AI up-scaler 1333 may perform AI upscaling on the third image 135 by using the DNN setting information included in the AI data, after obtaining the DNN setting information.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 1333 may obtain the DNN setting information by combining some values selected from the values in the lookup table, based on information included in the AI data, and the AI up-scaler 1334 may perform AI up-scaling on the second image 135 by using the obtained DNN setting information.

According to an embodiment, when a structure of a DNN corresponding to the upscaling target is determined, the AI setter 1333 may obtain the DNN setting information, for example, parameters of a filter kernel, corresponding to the determined structure of the DNN.

According to an embodiment, the AI setter 1333 may obtain the DNN setting information for AI-upscaling the second image 135 from among the plurality of pieces of DNN setting information, based on resolution information of the third image 145 included in the AI data.

The AI setter 1333 obtains the DNN setting information of the second DNN through the AI data including information related to the first DNN, and the AI up-scaler 1334 performs AI upscaling on the second image 135 through the second DNN set based on the obtained DNN setting information. In this case, memory usage and throughput may be reduced compared to when features of the second image 135 are directly analyzed for upscaling.

According to an embodiment, the AI setter 1333 may obtain the DNN setting information for AI-upscaling the second image 135 from among the plurality of pieces of DNN setting information, based on at least one of performance information of a display apparatus, a setting value pre-stored in the AI decoding apparatus 1300, or a setting value received from a user.

For example, the AI setter 1333 may obtain DNN setting information corresponding to the setting value pre-stored in the AI decoding apparatus 1300. For example, when a certain quality and/or certain resolution is pre-stored in the AI decoding apparatus 1300, the AI setter 1333 may obtain DNN setting information for generating the third image 145 having the pre-stored certain quality and/or resolution.

As another example, the AI setter 1333 may obtain DNN setting information corresponding to the setting value received from the user. For example, when a certain quality and/or certain resolution is received from the user, the AI setter 1333 may obtain DNN setting information for generating the third image 145 having the received certain quality and/or resolution.

As another example, the AI setter 1333 may obtain DNN setting information for generating the third image 145 having a certain quality and/or resolution, in consideration of performance information of a display apparatus which is to reproduce the third image 145 or a post-processed third image 145 (for example, resolution information of an image reproducible by the display apparatus and quality information of the image reproducible by the display apparatus). For example, when the display apparatus supports only Full HD (FHD) of 1920×1080, which is a maximum resolution, and the resolution of the second image 135 is 1280×720, the AI setter 1333 may obtain DNN setting information capable of increasing the resolution of the second image 135 by about two times.

According to an embodiment, when the second image 135 includes a plurality of frames, the AI setter 1333 may independently obtain DNN setting information in units of a certain number of frames, or may obtain common DNN setting information for all of the plurality of frames.

Figure 27:
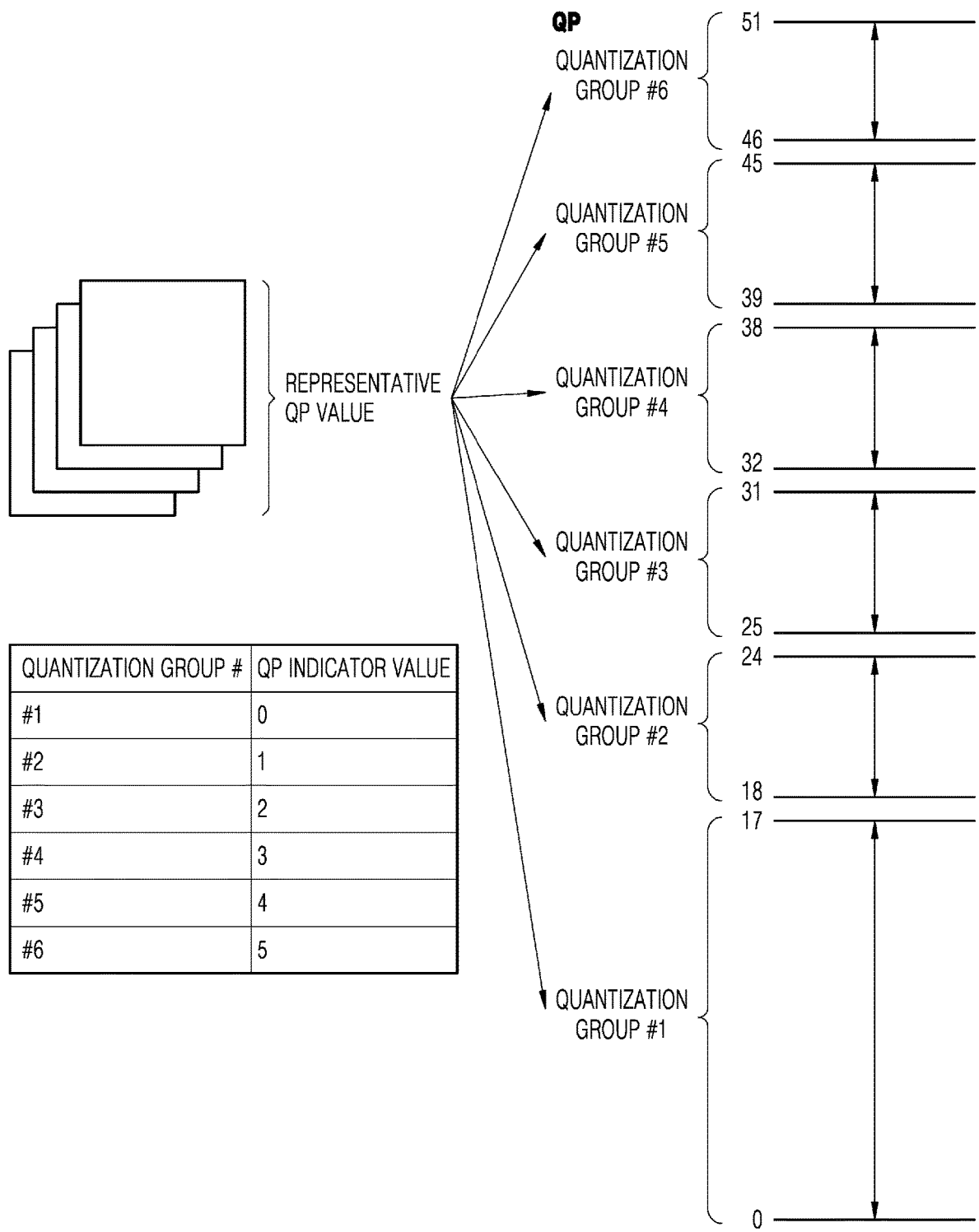
FIG. 27 is a diagram for describing determination of indicator (or level) information of a quantization parameter, based on a representative QP value of at least a portion of an image, according to an embodiment.

FIG. 27 is a diagram for describing determination of indicator (or level) information of a quantization parameter, based on a representative QP value of at least a portion of an image, according to an embodiment.

Referring to FIG. 27, an AI encoding apparatus/decoding apparatus may determine the representative QP value of at least a portion of an image. The representative QP value may be an important element that determines the quality of the image. The at least a portion of the image may refer to any of various image data units such as a frame sub-group (for example, a slice), a frame, a frame group, and a video sequence. The representative QP value is a QP value that is representative of the QP values of the at least a portion of the image, and thus may be generally a QP average value. However, embodiments are not limited thereto, and the representative QP value may be an intermediate value.

For example, the AI encoding apparatus/decoding apparatus may distinguishes cases where the representative QP value is 0~17, 18~24, 25~31, 32~38, 39~45, and 46~51, and may determine quantization groups #1 through #6 corresponding to ranges of QP values. In other words, the AI encoding apparatus/decoding apparatus may determine a plurality of groups by grouping the QP values.

For example, when the representative QP value is 30, the AI encoding apparatus 1400 may determine the quantization group #3, determine the value of a QP indicator corresponding to the quantization group #3 to be 3, and may transmit QP indicator information to the AI decoding apparatus 1300. The QP indicator may be used as an element for determining one piece of DNN setting information from among the plurality of pieces of pre-stored DNN setting information. A method of determining one piece of DNN setting information by using the QP indicator will be described below with reference to FIG. 28.

Although a case where the number of quantization groups is 6 has been described above with reference to FIG. 27, embodiments are not limited thereto. The number of quantization groups may vary. The range of QP values may differ for each quantization group. The QP indicator may determine a plurality of quantization groups (or levels) by grouping (leveling) the QP values without transmitting the QP values without changes, and may obtain DNN setting information more suitable for at least a portion of the second image 135 without greatly increasing the amount of information signaled by explicitly signaling information about the quantization groups.

FIG. 28 illustrates tables showing mapping relationships between QP values and several pieces of DNN setting information.

As illustrated in FIG. 28, according to a QP indicator value representing a quantization group of at least a portion of an image included in the AI data, the AI setter 1333 may determine one piece of DNN setting information from among a plurality of pieces of DNN setting information (for example, the pieces of A through G DNN setting information).

According to the range of QP values to which a QP average value of the image included in the AI data belongs, the AI setter 1333 may determine one piece of DNN setting information from among the plurality of pieces of DNN setting information with respect to the image. A QP representative value may be determined based on the quantization parameter of at least a portion of an image included in image encoding information, and, according to the range of QP values to which the QP representative value belongs, the AI setter 1333 may determine one piece of DNN setting information from among the plurality of pieces of DNN setting information with respect to the at least a portion of the image.

Although a method of determining one piece of DNN setting information from among the plurality of pieces of DNN setting information, based on the QP indicator value indicating the quantization group (or QP level) of the at least a portion of the image included in the AI data, the QP average value for the image included in the AI data, or the QP representative value determined based on the quantization parameter of the at least a portion of the image included in the image encoding information has been described above, embodiments are not limited thereto. One piece of DNN setting information may be determined from among the plurality of pieces of DNN setting information by combining the above-described QP-related values with one another. Alternatively, one piece of DNN setting information may be determined from among the plurality of pieces of DNN setting information by combining at least some of pieces of information related to a first image or an original image with at least some of the above-described QP-related values.

The above-described embodiments of the disclosure can be written as computer-executable programs, and the written computer-executable programs can be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the above-described DNN may be implemented by using a software module. When the DNN model is implemented by using a software module (for example, a program module including instructions), the DNN model may be stored in a computer-readable recording medium.

The DNN model may be a part of the above-described AI decoding apparatus 200 or the AI decoding apparatus 1300 by being integrated in the form of a hardware chip. For example, the DNN model may be manufactured in the form of an exclusive hardware chip for AI, or may be manufactured as a part of an existing general-purpose processor (for example, a CPU or an AP) or a graphic-exclusive processor (for example, a GPU).

The DNN model may be provided in the form of downloadable software. For example, a computer program product may include a product (e.g., a downloadable application) in the form of a software program that is electronically distributed through a manufacturer or an electronic market. For electronic distribution, at least a portion of the software program may be stored on a storage medium or may be created temporarily. In this case, the storage medium may be a server of the manufacturer or electronic market, or a storage medium of a relay server.

While one or more embodiments have been described with reference to the figures, it will be understood by those of ordinary skill in the art that various changes in form and details may be made therein without departing from the spirit and scope as defined by the following claims.

What is claimed is:

1. An artificial intelligence (AI) decoding apparatus comprising:
at least one processor configured to execute one or more instructions to:
obtain a bitstream comprising a main bitstream including image data obtained by performing first encoding on a first image, and a sub-bitstream including AI data;
obtain a second image corresponding to the first image by performing first decoding on the image data;
determine whether to perform AI upscaling on the second image, based on AI upscaling activation flag information included in the AI data;
based on determining that the AI upscaling is to be performed on the second image:
obtain a third image by performing the AI upscaling on the second image, through an upscaling deep neural network (DNN) set according to upscaling DNN information, the upscaling DNN information selected from among a plurality of pieces of pre-stored upscaling DNN information based on at least a portion of at least one of the image data or AI sub-data included in the sub-bitstream, and
output the obtained third image; and
based on determining that the AI upscaling is not to be performed on the second image, output the second image,
wherein the AI upscaling activation flag information represents whether to perform the AI upscaling on the second image.

2. The AI decoding apparatus of claim 1, wherein the AI sub-data comprises at least one of:
image genre information representing the genre of an image;
average quantization parameter information representing an average quantization value of the first image;
quantization parameter indicator information representing a quantization degree of at least a portion of the first image;
image resolution information representing resolution of at least one of an original image or the first image;
image ratio information representing a ratio between the original image and the first image;
codec information representing a codec used during encoding of the first image;
metadata flag information representing whether AI-upscaling related additional metadata is included; or
AI-upscaling related additional metadata information.

3. The AI decoding apparatus of claim 2, wherein the at least one processor is configured to execute the one or more instructions to set the upscaling DNN with upscaling DNN information from among a plurality of pieces of upscaling DNN information, based on at least one of the image genre information, the average quantization parameter information, the quantization parameter indicator information, the image resolution information, the image ratio information, or the AI-upscaling related additional metadata information.

4. The AI decoding apparatus of claim 3, wherein:
the quantization parameter indicator information is index information representing one of a plurality of pre-determined quantization parameter groups; and
the at least one processor is configured to execute the one or more instructions to set the upscaling DNN with upscaling DNN information corresponding to a quantization parameter group indicated by the index information from among the plurality of pieces of upscaling DNN information.

5. The AI decoding apparatus of claim 2, wherein the quantization parameter indicator information is index information representing a quantization parameter group including an average value of a quantization parameter of at least one of a sub-group within a frame, the frame, a frame group, or a video sequence.

6. The AI decoding apparatus of claim 1, wherein the at least one processor is configured to execute the one or more instructions to set the upscaling DNN with upscaling DNN information selected from among a plurality of pieces of upscaling DNN information, based on quantization parameter information obtained from the image data.

7. The AI decoding apparatus of claim 1, wherein the main bitstream is included in a predetermined main bitstream region within the bitstream defined in accordance with a predetermined codec, and the sub-bitstream is included in a predetermined sub-bitstream region within the bitstream defined in accordance with the predetermined codec.

8. The AI decoding apparatus of claim 7, wherein the sub-bitstream is a supplemental enhancement information (SEI) message.

9. The AI decoding apparatus of claim 8, wherein the SEI message is an SEI message including user data registered by a predetermined standard or including unregistered user data that is identified by a Universally Unique Identifier (UUID).

10. The AI decoding apparatus of claim 2, wherein the sub-bitstream is a metadata open bitstream unit (OBU).

11. A method of artificial intelligence (AI)-decoding an image, the method comprising:
obtaining a bitstream comprising a main bitstream including image data obtained by performing first encoding on a first image, and a sub-bitstream including AI data;
obtaining a second image corresponding to the first image by performing first decoding on the image data;
obtaining AI upscaling activation flag information included in the AI data;
determining whether to perform AI upscaling on the second image, based on the AI upscaling activation flag information;
based on determining that the AI upscaling is to be performed on the second image:
obtaining a third image by performing the AI upscaling on the second image, through an upscaling deep neural network (DNN) set according to upscaling DNN information, the upscaling DNN information selected from among a plurality of pieces of pre-stored upscaling DNN information based on at least a portion of at least one of the image data or AI sub-data included in the sub-bitstream, and
outputting the obtained third image; and
based on determining that the AI upscaling is not to be performed on the second image, outputting the second image,
wherein the AI upscaling activation flag information represents whether to perform AI upscaling on the second image.

12. The method of claim 11, wherein the AI sub-data comprises at least one of:
image genre information representing the genre of an image;

average quantization parameter information representing an average quantization value of the first image;

quantization parameter indicator information representing a quantization degree of at least a portion of the first image;

image resolution information representing resolution of at least one of an original image or the first image;

image ratio information representing a ratio between the original image and the first image;

codec information representing a codec used during encoding of the first image;

metadata flag information representing whether AI-upscaling related additional metadata is included; or AI-upscaling related additional metadata information.

13. The method of claim 12, wherein the obtaining the third image comprises setting the upscaling DNN with upscaling DNN information from among a plurality of pieces of upscaling DNN information, based on at least one of the image genre information, the average quantization parameter information, the quantization parameter indicator information, the image resolution information, the image ratio information, or the AI-upscaling related additional metadata information.

14. The method of claim 13, wherein:

the quantization parameter indicator information is index information representing one of a plurality of predetermined quantization parameter groups; and setting the upscaling DNN comprises setting the upscaling DNN with upscaling DNN information corresponding to a quantization parameter group indicated by the index information from among the plurality of pieces of upscaling DNN information.

15. The method of claim 12, wherein the quantization parameter indicator information is index information representing a quantization parameter group including an average value of a quantization parameter of at least one of a sub-group within a frame, the frame, a frame group, or a video sequence.

16. The method of claim 11, wherein the obtaining the third image comprises setting the upscaling DNN with upscaling DNN information selected from among a plurality of pieces of upscaling DNN information, based on quantization parameter information obtained from the image data.

17. The method of claim 11, wherein the main bitstream is included in a predetermined main bitstream region within the bitstream defined in accordance with a predetermined codec, and the sub-bitstream is included in a predetermined sub-bitstream region within the bitstream defined in accordance with the predetermined codec.

18. A non-transitory computer-readable recording medium having recorded thereon a computer program, which, when executed by a computer, performs the method of claim 11.

* * * * *